US011379885B2

(12) United States Patent
Penaflor

(10) Patent No.: US 11,379,885 B2
(45) Date of Patent: Jul. 5, 2022

(54) SYSTEM AND METHOD FOR IMMERSIVE DIGITAL ADVERTISING ALONG A PREDETERMINED PEDESTRIAN AD ROUTE USING AN ELECTRIC POD CARGO TRAILER

(71) Applicant: Ronaldo Green Penaflor, Fallbrook, CA (US)

(72) Inventor: Ronaldo Green Penaflor, Fallbrook, CA (US)

(73) Assignee: iP TECH PROS Inc., San Diego, CA (US)

( * ) Notice: Subject to any disclaimer, the term of this patent is extended or adjusted under 35 U.S.C. 154(b) by 0 days.

(21) Appl. No.: 17/090,043

(22) Filed: Nov. 5, 2020

(65) Prior Publication Data

US 2022/0138807 A1 May 5, 2022

(51) Int. Cl.
*G06Q 30/02* (2012.01)
*B62K 27/00* (2006.01)
*G09F 21/04* (2006.01)

(52) U.S. Cl.
CPC ....... *G06Q 30/0277* (2013.01); *B62K 27/003* (2013.01); *G06Q 30/0246* (2013.01); *G06Q 30/0266* (2013.01); *G09F 21/04* (2013.01)

(58) Field of Classification Search
CPC ........... G06Q 30/0277; G06Q 30/0246; G06Q 30/0266; B62K 27/003; G09F 21/04
See application file for complete search history.

(56) References Cited

U.S. PATENT DOCUMENTS

| | | | |
|---|---|---|---|
| 2014/0265555 A1* | 9/2014 | Hall | H02J 50/12 307/9.1 |
| 2018/0211349 A1* | 7/2018 | Knox | G01C 21/3476 |
| 2019/0217831 A1* | 7/2019 | Viele | B60T 8/1708 |

OTHER PUBLICATIONS http://promobikes.eu/digital-promobikes/, Apr. 2013.
https://www.pedicab.com/pedicabs/billboard-bike/, Oct. 2018.
https://www.youtube.com/watch?list=UU0dphD6xrsAxHpPNfiQENkg&v=8nVn_4Cygdg&feature=emb_title, Apr. 2014.

* cited by examiner

*Primary Examiner* — Scott C Anderson

(57) ABSTRACT

Embodiments of the present disclosure relate to a immersive digital advertising system and method thereof for providing one or more local merchants the ability to expand their advertising outreach to local and nearby consumers via digitally displayed advertisements, the system having an electric pod cargo trailer and an electric tow bicycle coupled to the electric pod cargo trailer for hauling the electric pod cargo trailer along a predetermined Ad pedestrian route.

15 Claims, 46 Drawing Sheets

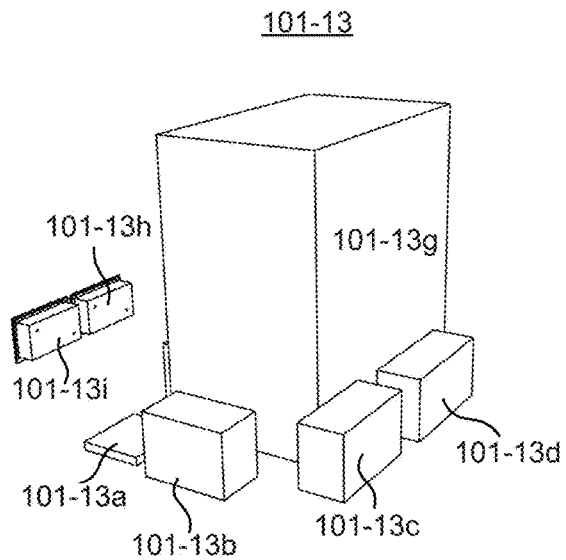
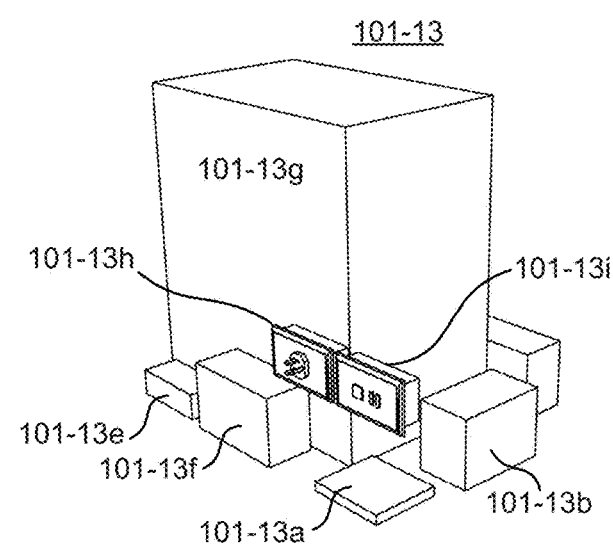
FIG. 21A     FIG. 21B
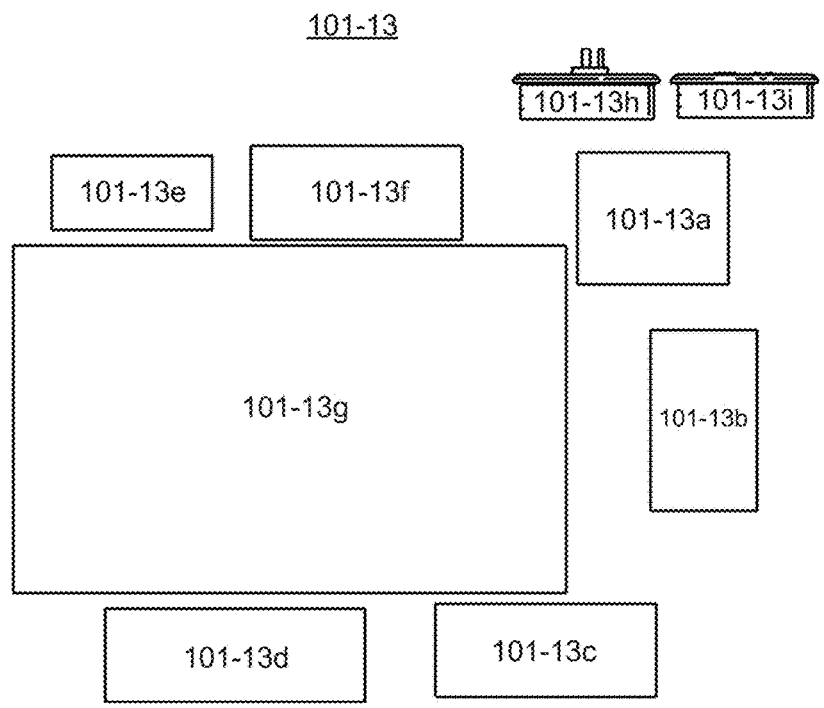
FIG. 21C

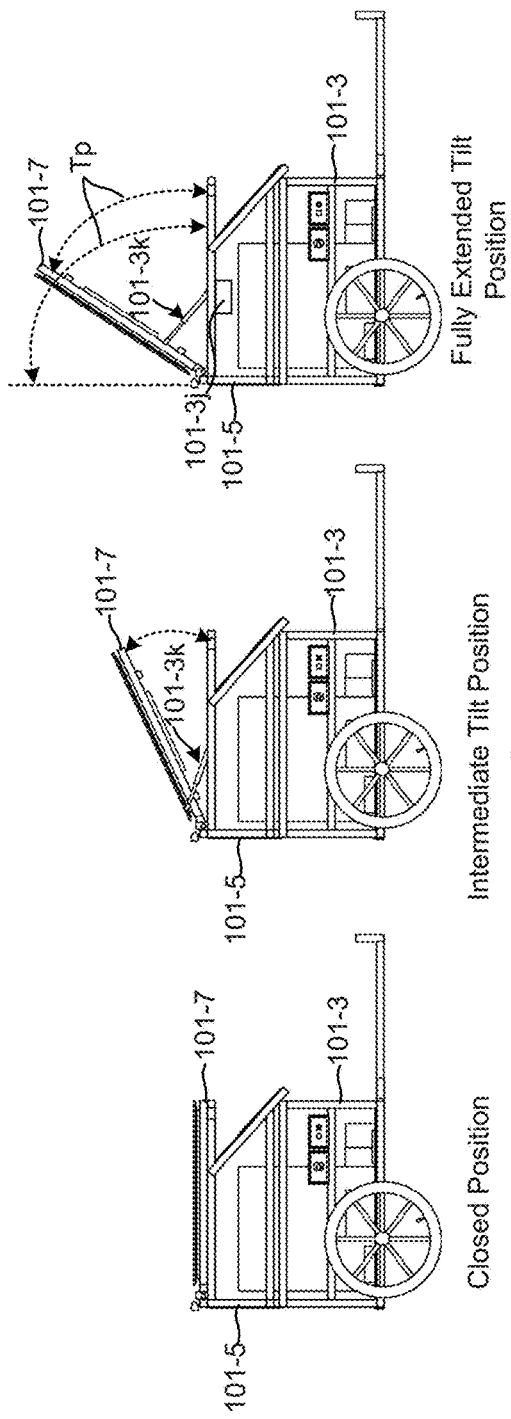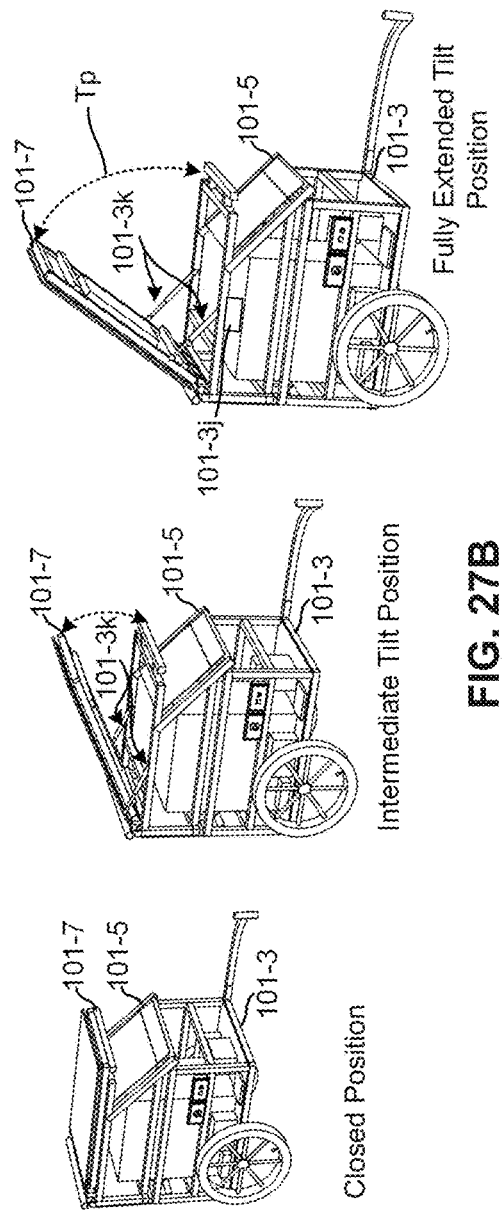

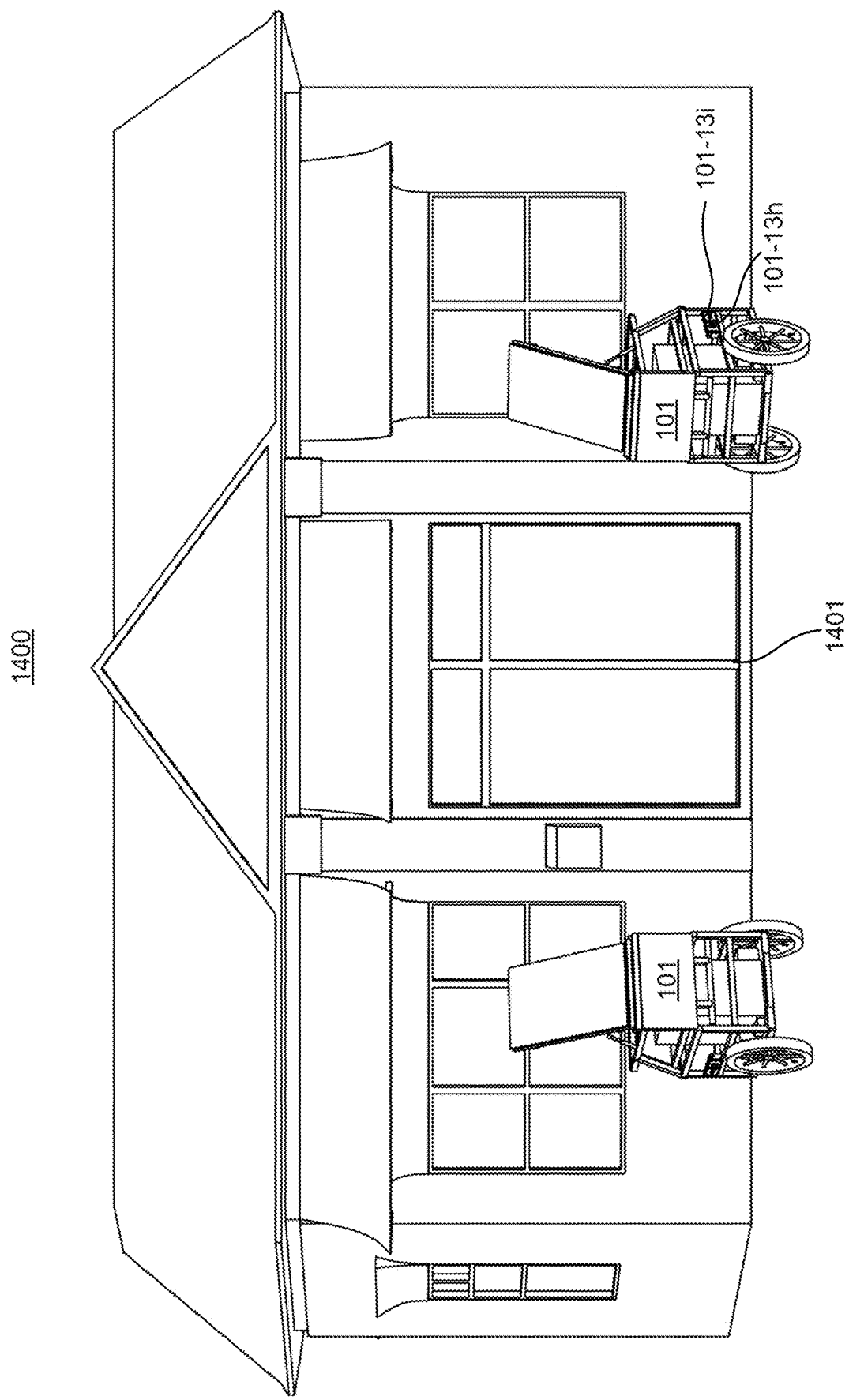

SYSTEM AND METHOD FOR IMMERSIVE DIGITAL ADVERTISING ALONG A PREDETERMINED PEDESTRIAN AD ROUTE USING AN ELECTRIC POD CARGO TRAILER

TECHNICAL FIELD

The present disclosure relates to a system and method for immersive digital advertising along a pedestrian Ad route using an electric pod cargo trailer. Particularly, the dynamic and immersive digital advertising system provides local brick-and-mortar merchants and shop owners the ability to expand their advertising outreach to local and nearby consumers and pedestrians via digital advertisements displayed on an industrial grade display monitor attached to the electric pod cargo trailer (EPCarT) and transported and hauled by an electric tow bicycle (ETow-Bike) along the pedestrian Ad route. The local merchants and shop owners also having private access and feedback to pedestrian Ad routes and digital image data captured by the EPCarT along the pedestrian Ad route, including "foot traffic images" and location data thereof of consumers to which the digital advertisements are displayed and presented and who are within a short distance and direct line of site of the EPCarT.

BACKGROUND

Many advertising and promotional systems and methods are available for local merchants and service providers to attract consumers to their brick and mortar stores. A list of some of these advertising and promotional systems and methods and their limitations are provided in Table 1.0 below.

TABLE 1.0

Examples of available advertising and promotional systems for local merchants

| Type of Mobile Adverting System | Description | Limitations |
| --- | --- | --- |
| Sign wavers | A mechanical device or human holding and waiving a sign, placard or small billboard on a street corner near the merchant's shop. | Usually Designated at a fixed location (street corner or store front); Tedious for human sign waivers, standing and holding sign for several hours; Ads printed on signs may be too difficult to see or read by fast moving cars; no easy feedback mechanism to track success or reach of consumers using this Ad technique; |
| Giant animated air puppets | Giant animated air-filled plastic puppets operated by a high powered blower, having custom billboards, logos, and company design printed or attached it. Typically large or tall in size ranging from 10-20 feet. Typically place on routes that people commonly travel in one direction of traffic and another to the other side of traffic. | Usually Designated at a fixed location (street corner or store front); too distracting to oncoming traffic and drivers which may cause road accidents; no easy feedback mechanism to track success or reach of consumers using this Ad technique; |
| Printed Flyers Distribution | Paper printed promotional advertisements which are distributed by mail or by people flyer distributors placing the ads on the windshield wipers of parked vehicles, | Tedious job for flyer distributors; Prone to paper littering for those not interested in the flyer; no easy feedback mechanism to track success or reach of consumers using this Ad technique; |
| Printed and Digital Fixed Billboards | Printed or digital based advertising signs placed on rented ad space such as a large billboard, a public bench, or building. | fixed location can be obstructed by people or other objects thereby reducing the effectiveness of the ad no easy feedback mechanism to track success or reach of consumers using this Ad technique; |

In addition to the above list, a trend in mobile digital billboard advertising has increased over the years, offering advertisers to the ability to expand their advertising reach using vehicles having digital LED/LCD screens fixed to the side of the vehicles displaying dynamic advertisements. Advantages of these advertising techniques include a decreased cost of advertisement media generation as well as easier deployment of ads since no printed materials are required. However, these mobile digital billboard advertising are often too big and heavy, requiring large trucks to carry and transport the electrical equipment to operate the digital billboard. In addition, these types of digital billboard trucks are restricted to operate in public roadways, parking lots, and streets. In some instance, digital billboard trucks have become eye-sores and have been regulated by cities and some local ordinances, limiting their operation and even banning their presence in selective areas. Another disadvantage of the use of digital billboard trucks as a form of advertising is its use of gasoline motors to power and operate these large vehicles, exposing nearby people to toxic substances (i.e., carbon monoxide CO).

The above aforementioned advertising systems may provide some benefits to promoting and advertising for local merchants. However, these systems also have many drawbacks and limitations relating to their effectiveness in reaching local consumers who are exposed to such advertising systems. Therefore, it would be advantageous to employ an advertisement system and method which offers local merchants a compelling advertising solution having a dynamic, safe, intimate, easy to use, environmentally clean, and effective advertisement system for targeting local consumers, including consumers who are with walking distance or a short drive distance from stores owned by the local merchants as well as providing quantitative ad feedback to the local merchants.

SUMMARY

It is an advantage of the present disclosure to provide an immersive digital advertising system for providing one or more local merchants the ability to expand their advertising outreach to local and nearby consumers and pedestrians via digitally displayed advertisements, the system having an electric pod cargo trailer having a storage compartment, a local advertisement server contained within the storage compartment for receiving, storing and processing digital media advertisement data provided by the one or more local merchants, a hinged lid coupled to the storage compartment by a lid hinge assembly, an advertisement display unit coupled to the local advertisement server for displaying the digital media advertisement data along a predetermined pedestrian Ad route, and a digital image and GPS capturing device for capturing and storing geotagged data along the predetermined pedestrian Ad route traveled by the electric pod cargo trailer; an electric tow bicycle coupled to the electric pod cargo trailer by a tow hitch for hauling the electric pod cargo trailer along the predetermined pedestrian Ad route; and a base station for receiving and processing the geotagged data and generating an interactive pedestrian Ad route map from the geotagged data, providing the one or more local merchants private access to a merchant Ad status viewer interface having Ad route data, Ad feedback information, and the interactive pedestrian Ad route map along the predetermined pedestrian Ad route.

It is another advantage of the present disclosure to provide a method for receiving an Ad file request from the local merchant including a predetermined pedestrian Ad route and digital media advertisement data. It may also provide a method for capturing geotagging data associated with the Ad file request by a digital image and GPS capturing device along the predetermined pedestrian Ad route on which the mobile digital advertising unit has traveled. The digital image and GPS capturing device may be coupled to the mobile digital advertising unit. It may also provide a method for displaying the Ad media content on an advertisement display unit along the predetermined pedestrian Ad route on which the mobile digital advertising unit has traveled. It also provides a method for transmitting to a base station the captured geotagging data. It may also provide a method for storing the captured geotagging data in a database managed by the base station. It may also provide a method for generating an interactive pedestrian Ad route map based partly on the captured geotagging data. It may also provide a method for providing the local merchant private access to a merchant Ad status viewer interface having Ad route data, Ad feedback information, and the interactive pedestrian Ad route map along the predetermined pedestrian Ad route.

It is yet another advantage of the present disclosure to provide a mobile digital advertising unit traveling along a predetermined pedestrian Ad route for visually promoting digitally displayed advertisements to consumers and pedestrians via digital media advertisement data provided by one or more local merchants, the mobile digital advertising unit having an electric tow bicycle, and an electric pod cargo trailer coupled to the electric tow bicycle by a tow hitch for hauling the electric pod cargo trailer along a predetermined pedestrian Ad route by the electric tow bicycle; the electric pod cargo trailer may include a storage compartment, a local advertisement server may be enclosed within the storage compartment for receiving, storing and processing the digital media advertisement data provided by the one or more local merchants, a hinged lid may be coupled to the storage compartment by a lid hinge assembly, an advertisement display unit may be coupled to the local advertisement server for displaying the digital media advertisement data along the predetermined pedestrian Ad route, and a digital image and GPS capturing device for capturing and storing geotagged data along the predetermined pedestrian Ad route traveled by the mobile digital advertising unit.

These and other objects, features and advantages of the present disclosure will become more apparent in light of the following detailed description of preferred embodiments thereof, as illustrated in the accompanying drawings.

BRIEF DESCRIPTION OF THE DRAWINGS

FIG. 21A-FIG. 21C illustrate a front-right side perspective view, a front-left side perspective, and top side view, respectively, of the internal electronic components contained within the EPCarT, according to an embodiment.

FIG. 27A-FIG. 27B illustrate a side and perspective views, respectively, of the EPCarT with the upper display panel rack at adjustable tilt position settings, according to an embodiment.

FIG. 46 illustrates two EPCarT units in a stand-alone mode, according to an embodiment.

Figure 1:
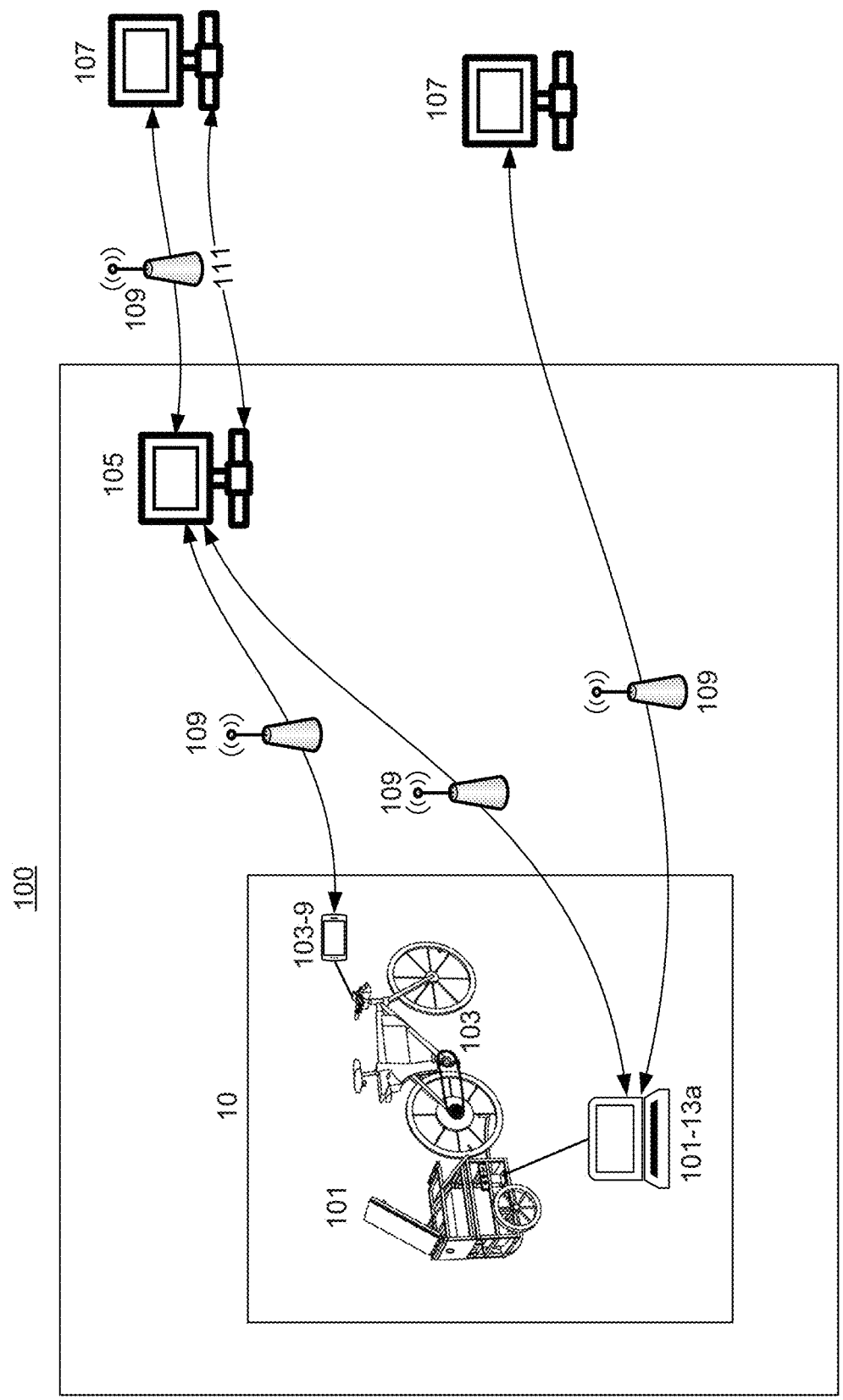
FIG. 1 illustrates an overview of an immersion digital advertising system, according to an embodiment.

In the appended figures, similar components and/or features may have the same reference numeral. Further, various components of the same type is distinguished by following the reference numeral by a dash and a second label that distinguishes among the similar components. If only the first reference numeral is used in the specification, the description is applicable to any one of the similar components having the same first reference numeral irrespective of the second reference numeral.

DETAILED DESCRIPTION

This disclosure is related to an immersion digital advertising system using an Electric Pod Cargo Trailer (EPCarT) allowing local merchants the ability to target and attract local consumers and pedestrians in close proximity to brick-and-mortar stores (physical stores) operated by local merchants. The immersion digital advertising system also benefits the local merchants by expanding the reach of advertisements (Ads) generated by the local merchants to attract local consumers and pedestrians to their physical location within user selectable zones and predetermined pedestrian routes. The immersion digital advertising system provides the local brick-and-mortar merchants a new, dynamic, and lower cost advertising solution having variable ad pricing to meet their advertising budgets. Finally, this disclosure provides advertisement feedback of merchant ads by providing the Merchant access to sampled "foot traffic images" and location data thereof of consumers to which their digital merchant ads are presented. Local merchants that may benefit from this system include specialty retail shops, hair boutiques, flower shops, barbers, family owned restaurants, real estate agents, dentists, doctors, auto body shops, dry cleaners, print shops, local hardware stores, camera shops, repair shops, as well as many other types of local merchants.

FIG. 1 illustrates an overview of an immersion digital advertising system 100, according to an embodiment. Components within the system 100 may include 1) a mobile digital advertising unit 10 having an Electric Pod Cargo Trailer (EPCarT) 101 coupled to a specialized Electric Tow Bicycle (ETow-Bike) 103 for hauling and transporting the EPCarT 101; and 2) a remote EPCarT Base Station 105 coupled to the mobile digital advertising unit 10 over a wireless network 109. The EPCarT 101 is equipped with a portable EPCarT Ad Server 101-13a having communication hardware that is capable of transmitting and receiving ad data and live content data to and from the remote EPCarT Base Station 105 or directly from one or more third party data service providers 107 via a wireless network 109. Similarly, the ETow-Bike 103 is equipped with an onboard dash computer 103-9 having communication hardware that is capable of receiving and transmitting status and messaging data to and from the remote EPCarT Base Station 105 via the wireless network 109. The EPCarT Base Station 105 may be communicatively coupled to the third party data service providers 107 via the wireless network 109 or a wired network 111. Examples of the wireless network 109 may include cell phone networks, wireless local area networks (WLANs), Wi-Fi, wireless sensor networks, satellite communication networks, and terrestrial microwave networks. Examples of the wired network 111 include telephone networks, cable television or internet access, and fiber-optic communication networks.

Figure 2A:
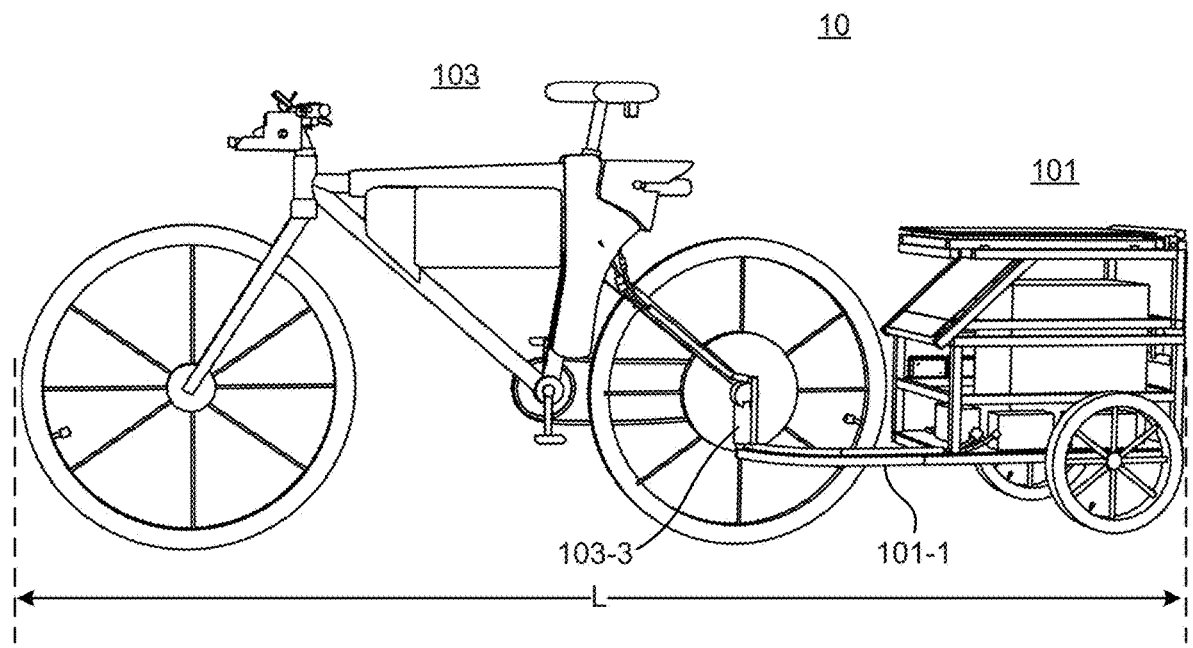
FIG. 2A and FIG. 2B illustrates a side view and a rear view, respectively, of the mobile digital advertising system, in accordance to an embodiment.
Figure 2B:
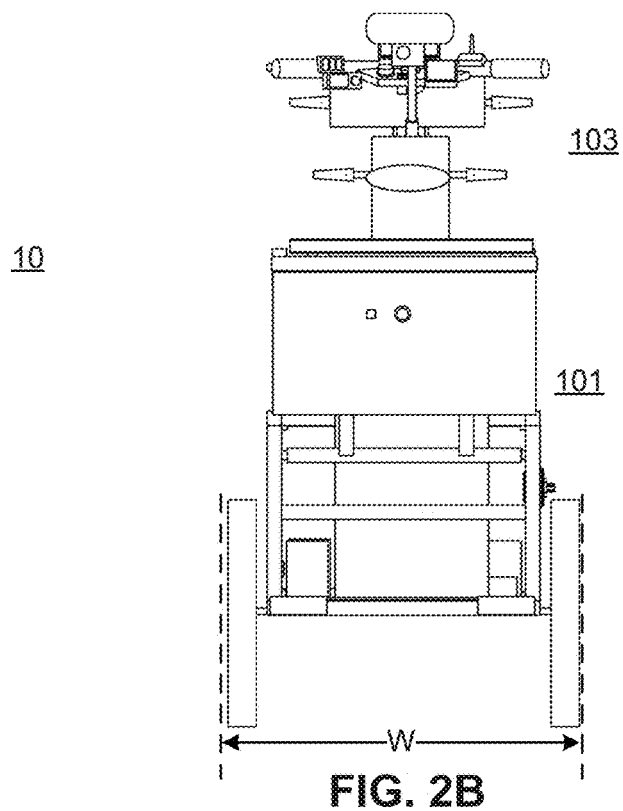

FIG. 2A and FIG. 2B illustrates a side view and a rear view, respectively, of the mobile digital advertising system 10, in accordance to an embodiment. The mobile digital advertising unit 10 includes the EPCarT 101 and the ETow-Bike 103 that are coupled by a trailer tongue (or trailer rail) 101-1 and a detachable tow hitch assembly 103-3, allowing the EPCarT 101 to be easily connected or disconnected from the ETow-Bike 103. When coupled together, the entire length (L) of the mobile digital advertising unit 10 is less than 8 feet while its maximum width W (measured between the two wheels of the EPCarT 101) spans less than 32 inches, having a narrow and slim design that allows the mobile digital advertising unit 10 to easily ride alongside pedestrians without causing interference or obstruction to other bikers and pedestrians.

Electric Tow Bicycle (ETow-Bike)

Figure 3:
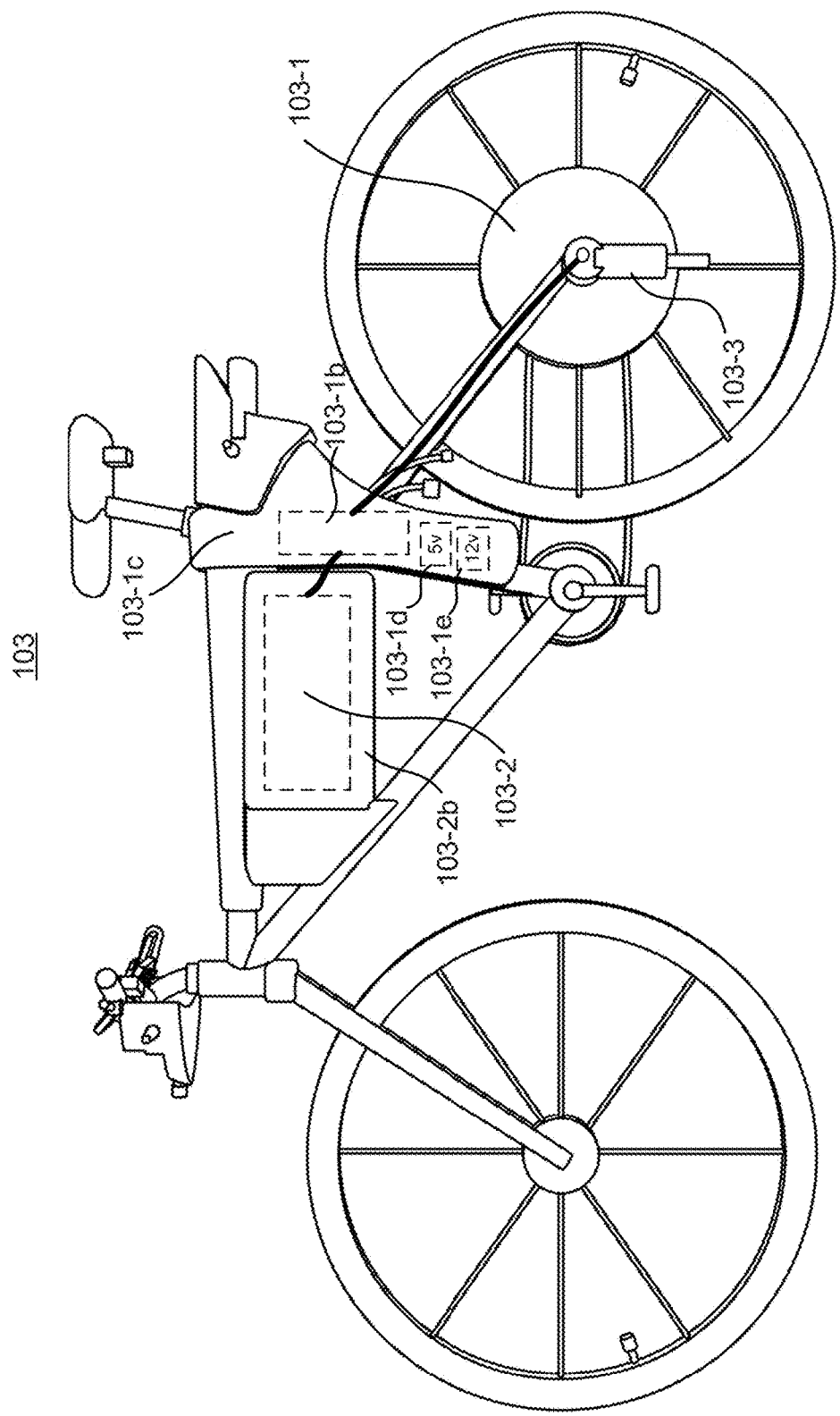
FIG. 3 illustrates a side view of the ETow-Bike, according to an embodiment

FIG. 3 illustrates a side view of the ETow-Bike 103, according to an embodiment. In this system 100, the ETow-Bike 103 is an advance and specialized electric bicycle that is equipped for hauling, safety, monitoring, and control of the EPCarT 101 while in tow. An electric bicycle is defined herein this system 100 as a mobile device with two wheels upon which a person may ride, propelled exclusively by human power through a belt, chain, or gears, being equipped with fully operable pedals and an electric motor. The use and application of gas-driven vehicles (automobiles, motorcycles, and scooters) to haul the EPCarT 101 are especially excluded and avoided in the system 100 due to toxic gas by-products produced by these types of vehicles, loud exhaust noise levels in excess of up to 95 decibels within 2 feet that are caused by these gas engines, and inability and restrictions of these types of vehicles to access walkways or paths where pedestrians are present. The use and application of electric vehicles such as electric cars, electric motorcycles, and electric scooters to haul the EPCarT 101 are also excluded and avoided in the system 100 due to their large sizes and heavier weights that prevent these electric vehicles from accessing and driving alongside pedestrians. Unlike the gas and electric driven vehicles, key advantages of the ETow-Bike 103 as used in this system 100 is its narrow size, low to zero sound levels, fully integrated control systems, and towing capabilities. In operation, the ETow-Bike 103 can easily maneuver alongside pedestrians at low speeds and do not emit harmful gases (carbon monoxide, smoke, etc). It makes virtually no sounds and can weigh up to only 90 pounds fully loaded. At 90 pounds or less, it can be loaded into and transported in a small truck or service vehicle. The ETow-Bike 103 generally has stronger frame and bicycle tubing made from strong metals such as Chromoly Steel for handling heavier loads.

The ETow-Bike 103 in this embodiment has three power modes of operation for towing the EPCarT 101, including 1) human peddling power mode for slow speeds while riding among and alongside of pedestrians; 2) pedal assisted power mode for towing the EPCarT 101 uphill or as required by the road conditions; and 3) full electric power mode for long distance hauling and transporting the EPCarT 101 to an EPCarT Depot.

Referring again to FIG. 3, the ETow-Bike 103 includes an electric motor wheel 103-1 which is coupled to a motor controller 103-1b that is contained within a controller housing 103-1c. The motor controller 103-1b may be electrically wired to the electric motor wheel 103-1, providing speed control via a throttle assembly. The motor controller 103-1b may have adjustable speed settings allowing it to switch between a standard speed mode and high speed mode while the electric motor wheel 103-1 may have a power rating of at least 36V and 750 W/1500 W or more, allowing it to easily tow the EPCarT 101 for long distances all on a single charge. The ETow-Bike 103 may also include a high voltage, high capacity, rechargeable battery 103-2 (preferably 15 aH or more) that is coupled to the electric motor wheel 103-1 via the motor controller 103-1b. Various rechargeable battery types are available on the market and may be applied to the ETow-Bike 103, such as Nickel Cadmium (NiCd), Nickel-Metal Hydride (NiMH), Lead Acid, Lithium Ion (Li-ion), or Lithium Ion Polymer (Li-ion polymer). However, Li-ion and Lithium Ion Polymer Li-ion polymer rechargeable batteries are preferred over the NiCd and NiHM batteries since they provide both a high energy density and light weight rechargeable battery storage solution not typically offered by NiCd and NiHM batteries.

A battery housing 103-2b is applied to the center frame of the ETow-Bike 103 for storing, securing, and protecting the battery 103-2 on the ETow-Bike 103. In operation, the ETow-Bike 103 is configured for power and distance, having a preferred range of 40 miles or more on direct power and unlimited range when coupled to an onboard gas generator. Output voltages of the battery 103-2 may be reduced to lower voltages through a DC/DC step down converter and regulator to accommodate 5V and 12V powered devices using a 5V step down converter 103-1d and a 12 V step down converter 103-1e, respectively. The ETow-Bike 103 may also include the detachable tow hitch assembly 103-3, which is attached to the rear wheel frame or onto the rear wheel bolt, for coupling to EPCarT 101 when in tow.

Figure 4:
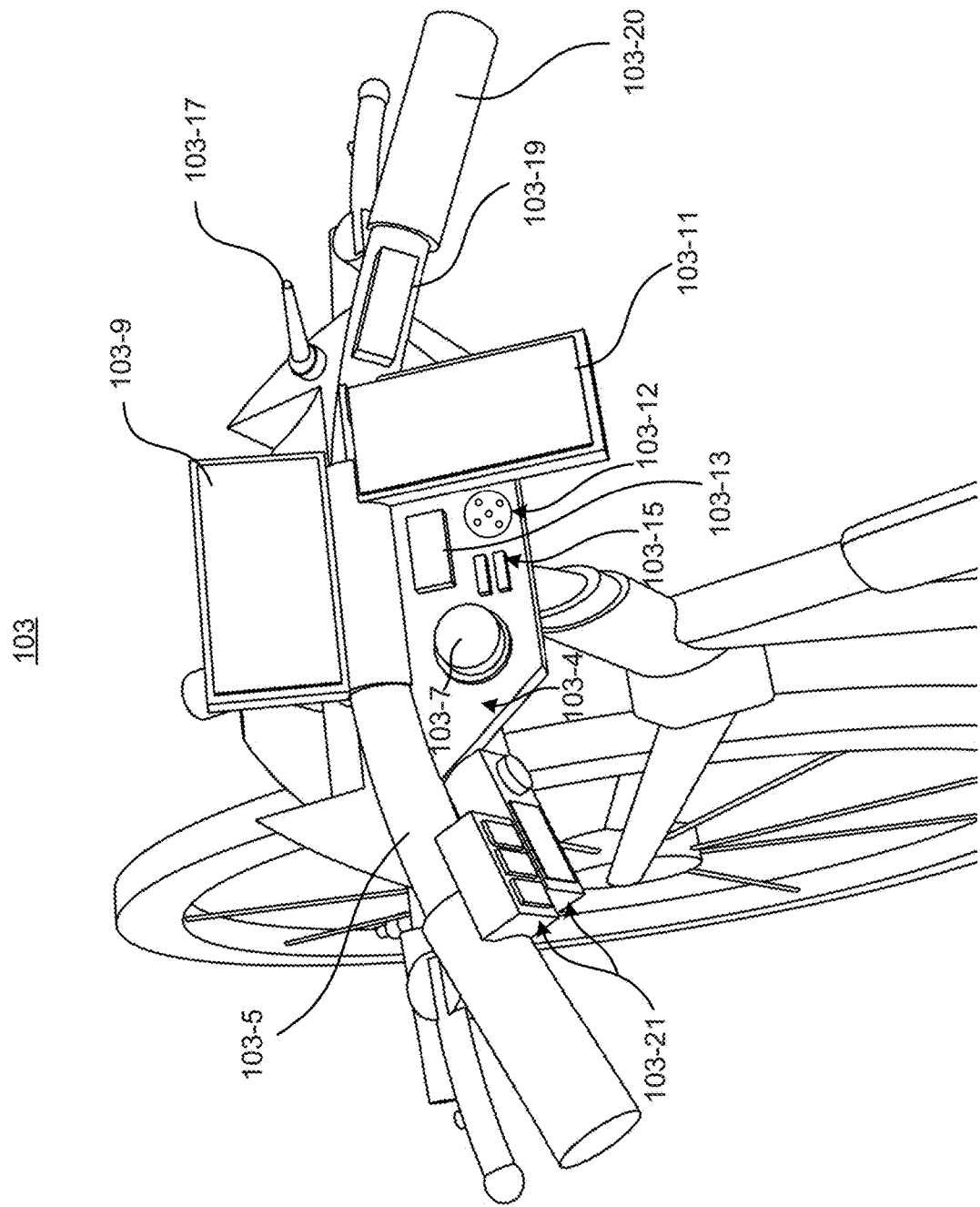
FIG. 4 illustrates a dash control panel mounted onto the handle bars of the ETow-Bike, according to an embodiment.

FIG. 4 illustrates a dash control panel 103-4 mounted onto the handle bars 103-5 of the ETow-Bike 103, according to an embodiment. The dash control panel 103-4 may include a power switch 103-7 for enabling and disabling the ETow-Bike 103 along with other on board electronic components, the EPCarT 101. The dash control panel 103-4 may also include electronic components such as the onboard dash computer 103-9 with built-in wireless communication and GPS tracking hardware and capabilities, an Ad Display and Touchscreen Controller 103-11, a brake wear sensor monitor 103-12, a tire pressure monitoring sensor display 103-13, and USB Serial Input ports 103-15. The ETow-Bike 103 may also be equipped with and an antenna 103-17, a power meter 103-19 for displaying and monitor real-time power usage and battery status of the high capacity battery 103-2, a throttle assembly 103-20 for controlling the speed, a control switch assembly 103-21 for controlling turn signals, motor speed modes (low/high), hazard signals, front lights, and brake/tail lights, horns. All electronic components are tied to and powered by the high capacity battery 103-2, providing a central, single charging and powering of all of the electrical components and subsystems included on the ETow-Bike 103.

Figure 5:
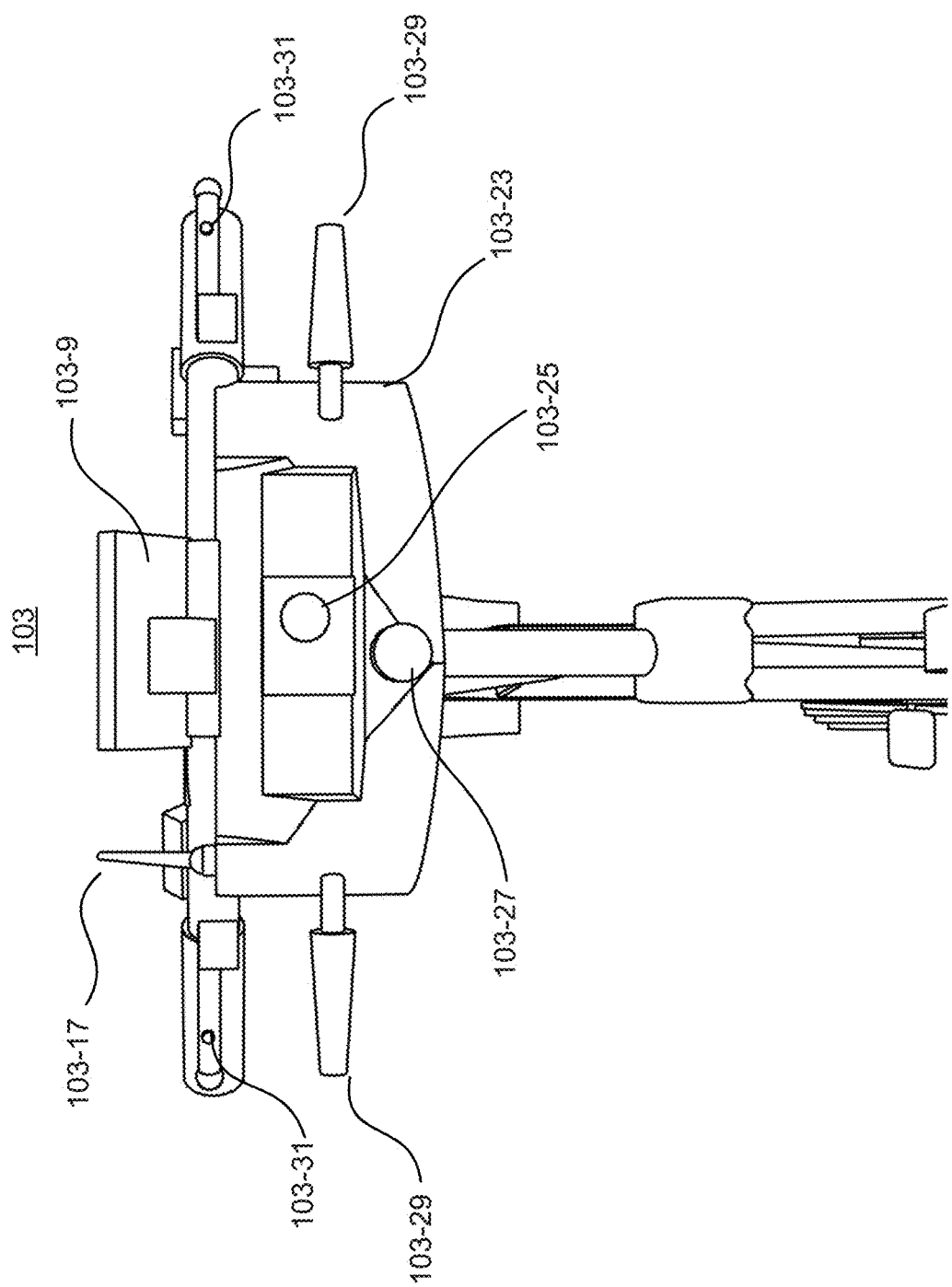
FIG. 5 illustrates a front side view of the front fairing 103-23, according to an embodiment.
Figure 6:
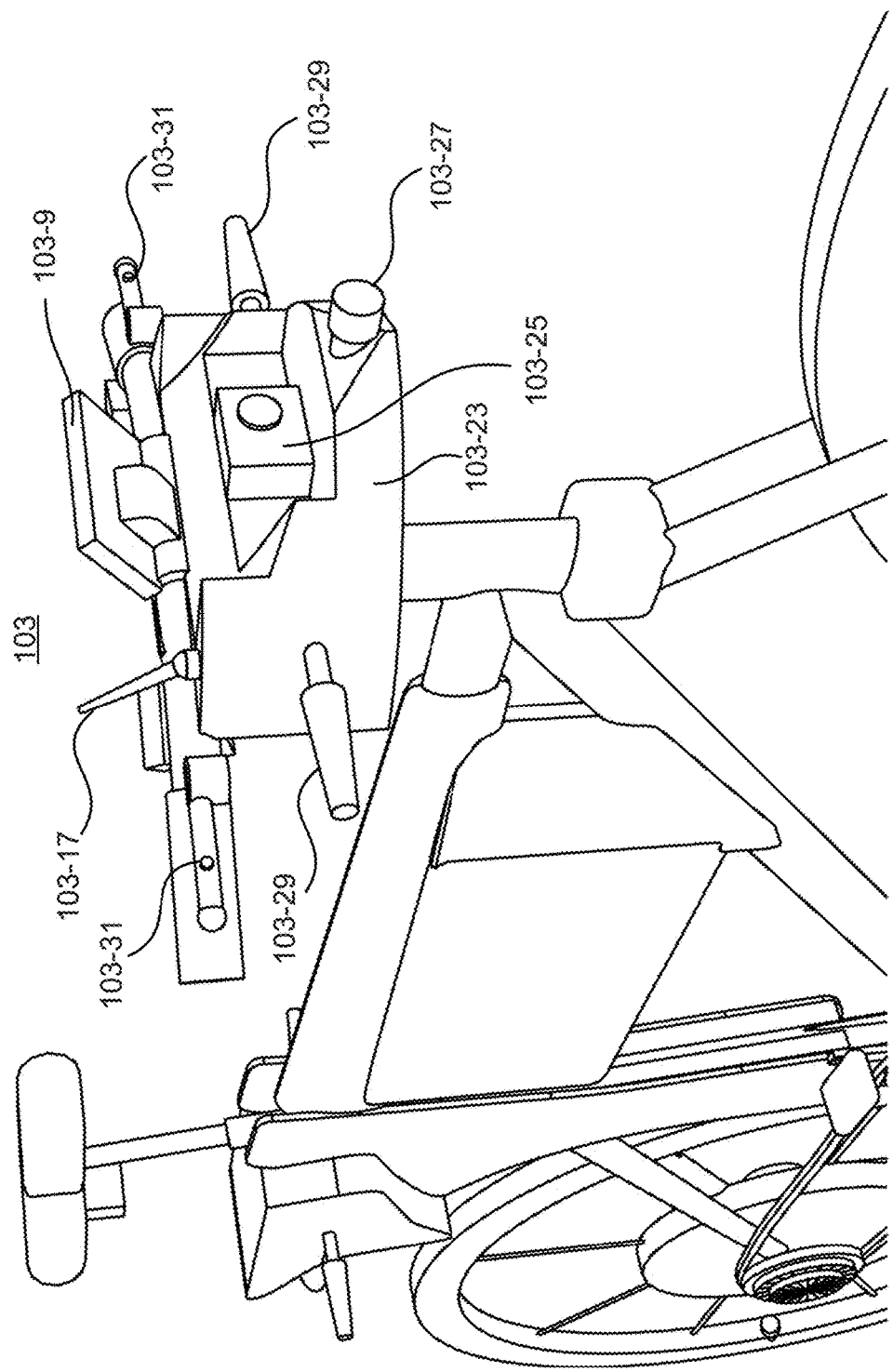
FIG. 6 illustrates a right side perspective view of the front fairing, according to an embodiment.

FIG. 5 and FIG. 6 illustrate a front side view and a right side perspective view, respectively, of the front fairing 103-23, according to an embodiment. Though the front fairing 103-23 may serve to reduce air drag at moderate to high speeds, its primary purpose in this embodiment is to provide a shell and support for other on board electrical components including a front digital camera 103-23, a front headlight 103-25, and a pair of front turn signals 103-27. Also shown are brake switches 103-31 mounted to each brake lever of the ETow-Bike 103.

Figure 7:
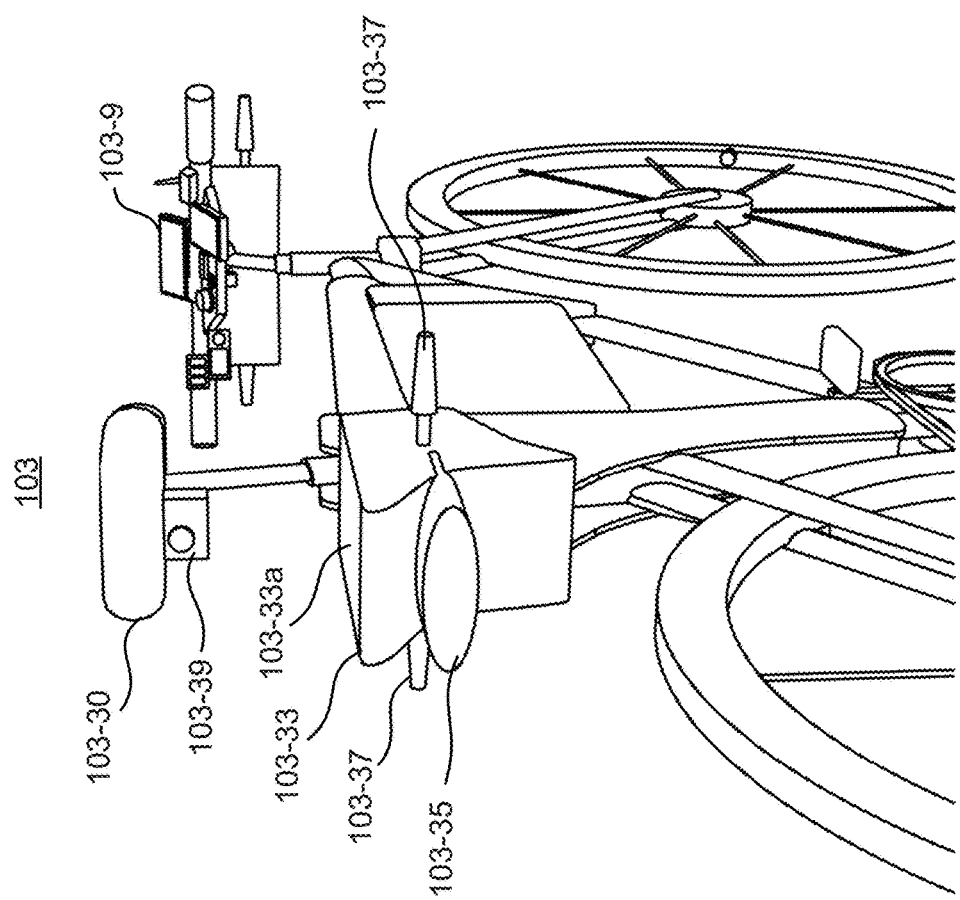
FIG. 7 illustrates a rack support member mounted onto of the back end of the ETow-Bike near the bike seat, according to an embodiment.

FIG. 7 illustrates a rack support member 103-33 mounted onto of the back end of the ETow-Bike 103 near the bike seat 103-30, according to an embodiment. The rack support member 103-33 may provide a section for carrying small items on a platform 103-33a of the rack support member 103-33. In addition, a brake and tail light assembly 103-35 and a pair of rear turn signals 103-37 may be mounted via mounting brackets and fasteners to the rack support member 103-33 as shown in FIG. 7. The brake and tail light assembly 103-35 are electrically coupled to and controlled by the brake switches 103-31 which are mounted to each brake lever of the ETow-Bike 103 while the pair of rear turn signals 103-37 are electrically coupled and controlled by a rocker switch disposed on the control switch assembly 103-21. A rear camera 103-39 may be attached to the rear section of the ETow-Bike 103 providing live video images of the EPCarT 101 to the onboard dash computer 103-9 via a wireless communication link when the EPCarT 101 is attached and hauled by the ETow-Bike 103.

Figure 8:
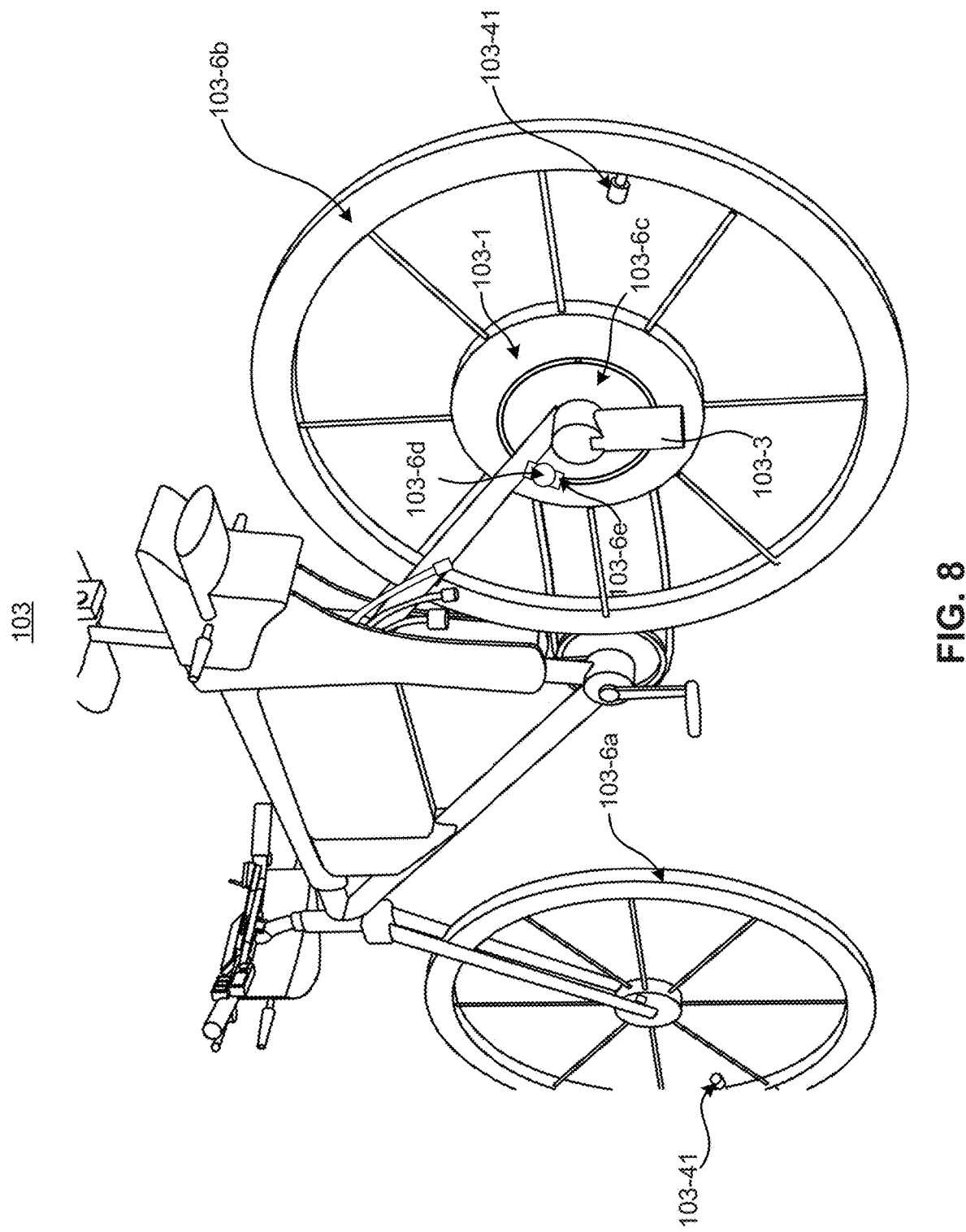
FIG. 8 illustrates side view of the ETow-Bike showing disk brake wear sensors and tire pressure monitor sensors (TPMS) applied to the bicycle wheels of the ETow-Bike, according to an embodiment.

FIG. 8 illustrates side view of the ETow-Bike 103 showing disk brake wear sensors and tire pressure monitor sensors (TPMS) applied to the bicycle wheels (103-6a and 103-6b) of the ETow-Bike 103, according to an embodiment. The bicycle wheels (103-6a and 103-6b) may include a special disc braking system having disc rotors 103-6c, calipers 103-6d and brake pads contained therein. In operation, the special disc braking system is controlled the front brake levers of the ETow-Bike 103. A brake disc brake wear sensor 103-6e may be applied to the brake pad contained within the caliper 103-6d to monitor the remaining thickness on the disc brake pads. The brake disc brake wear sensor 103-6e includes a brake depth contact plate that closes a brake low level switch when the brake pads are reduced to a predetermined thickness. Once the brake low level switch is closed, a brake low level signal is transmitted to the brake wear sensor monitor 103-12 triggering a pre-recorded audio voice alert via a speaker or a visual alert via a flashing or solid LED light. Since the ETow-Bike 103 is somewhat heavier in weight than most non-motorized bicycles and routinely hauls a heavy load (i.e., the EPCarT 101), increased brake pad wear is a likely occurrence during a heavy use. Thus, the primary advantage of the brake wear sensor monitor 103-12 is to provide the operator of the ETow-Bike 103 an early warning message and reminder for changing the brake pads before brake failure occurs. In addition, the tire pressure monitor sensors (TPMS) 103-41 may be applied the valve stems of the bicycle wheels (103-6a and 103-6b) to wirelessly transmit the tire pressure of both tires in real-time to the tire pressure monitoring sensor display 103-13. In sum, the ETow-Bike 103 Status provides all the necessary system indicators (Voltage, Range, Tire Pressure, brake wear feedback) to the ETow-Bike operator for both safety and preventive maintenance.

Figure 9:
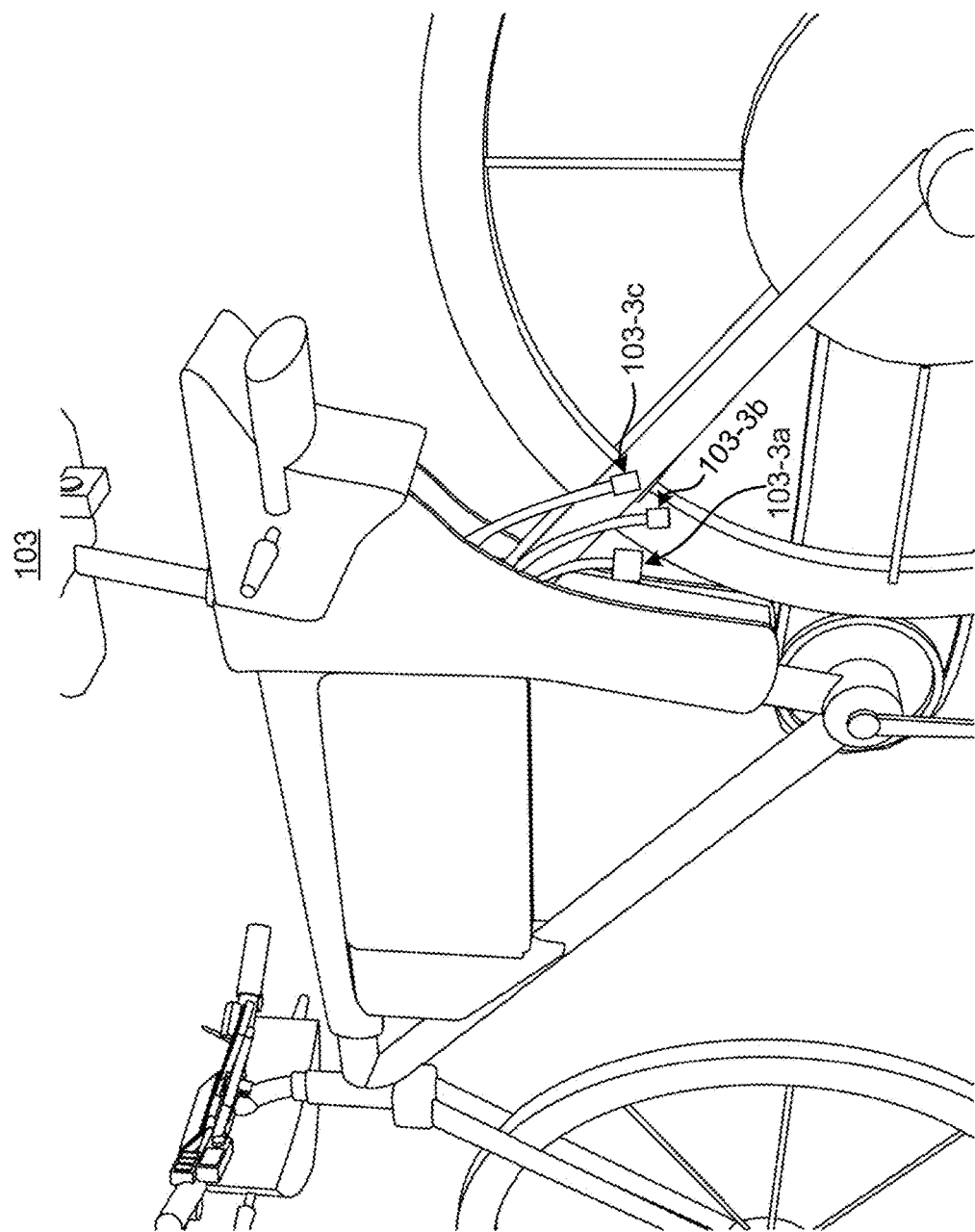
FIG. 9 illustrates specialized tow hookup connectors for coupling electrical components from the EPCarT to the ETow-Bike 103, according to an embodiment.

FIG. 9 illustrates specialized tow hookup connectors for coupling electrical components from the EPCarT 101 to the ETow-Bike 103, according to an embodiment. The specialized tow hookup connectors may include three primary connectors: 1) a charging cable connector 103-3a, 2) a trailer wiring connector 103-3b, and 3) a digital video, audio and data interface connector 103-3c. The specialized tow hookup connectors may be made from durable and weather resistant connector plugs, using female/male wire connector sockets with threaded sockets to secure and fasten the connector sockets when coupling the EPCarT 101 to the ETow-Bike 103.

Figure 10:
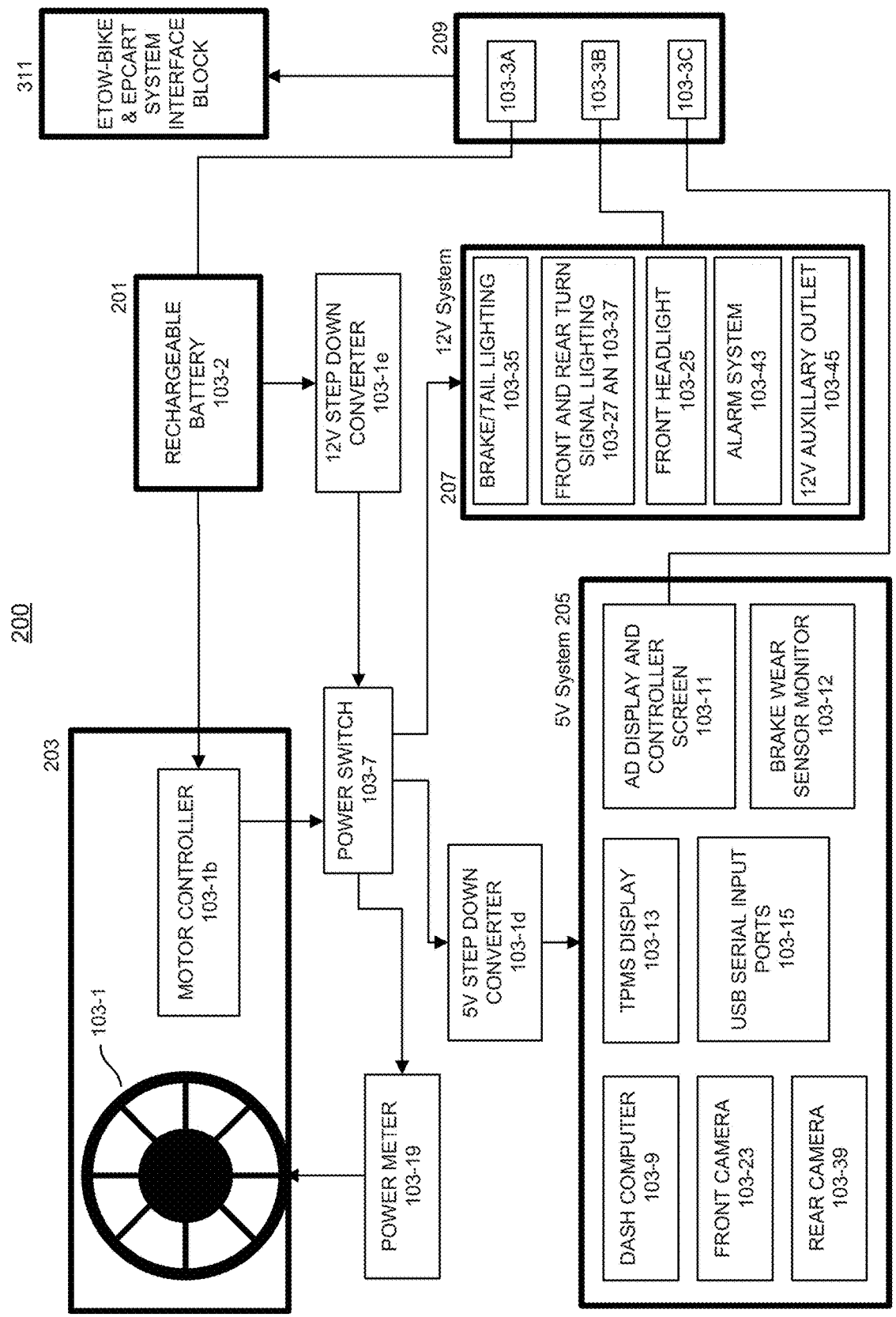
FIG. 10 illustrates a system block diagram of electrical components on the ETow-Bike, according to an embodiment.

FIG. 10 illustrates a system block diagram 200 of electrical components on the ETow-Bike 103, according to an embodiment. In the system block diagram 200, the electrical components are grouped and divided into five major blocks: a source block 201, a load block 203, a 5V system block 205, a 12V system block 207, an ETow-Bike interface coupler block 209, and a Etow-Bike/EPCarT system interface block 311 for electrically coupling the ETow-Bike 103 with the EPCarT 101. The source block 201 may include the battery 103-2 which provides power to the entire system, including the motor and all electrical components. The load block 203 includes the motor 103-1 and the motor controller 103-1b which draws high voltage and current power from the source block 201, regulating and supplying the regulate power to the motor 103-1. The 5V System block 205 includes all electrical components that are supplied with a 5V nominal voltage including the dash computer 103-9, the front camera 103-23, the rear-camera 103-39, the TPMS Display 103-13, the USB serial input ports 103-15, the brake wear sensor monitor 103-12, and the Ad Display and Touchscreen Controller 103-11. Power to the 5V System block 205 is provided by the source block 201 which is reduced and regulated to 5V via the DC/DC 12V to 5V step down converter and regulator 103-1d. The 12V System block 205 includes all electrical components that are supplied with a 12V nominal voltage including the brake and tail light assembly 103-35, the front and rear turn signal lights 103-27 and 103-37, the front headlight 103-25, an optional alarm system 103-43, and an optional 12V auxiliary outlet 103-45. Power to the 12V System block 205 is also provided by the source block 201 which is reduced and regulated to 12V via the DC/DC 48V to 12V step down converter and regulator 103-1d. The power switch 103-7 provides an ON/OFF switch to the entire electrical system which may include a keyless remote transmitter or keyfob. The Etow-Bike interface block 209 includes the charging cable connector 103-3a, the trailer wiring connector 103-3b, and the digital video, audio and data interface connector 103-3c (e.g., High-Definition Multimedia Interface HMDI, DisplayPort, BNC). In particular, the digital video, audio and data interface connector 103-3c may provide a wired connection between the Ad Display and Touchscreen Controller 103-11 and the EPCarT Ad Server 101-13a contained within the EPCarT 101 when coupled with the ETow-Bike 103. The wired connection having improved video signal quality over wireless video connections, and not prone to wireless interference issues that wireless video connections often face.

Electric Pod Cargo Trailer (EPCarT)

Figure 11:
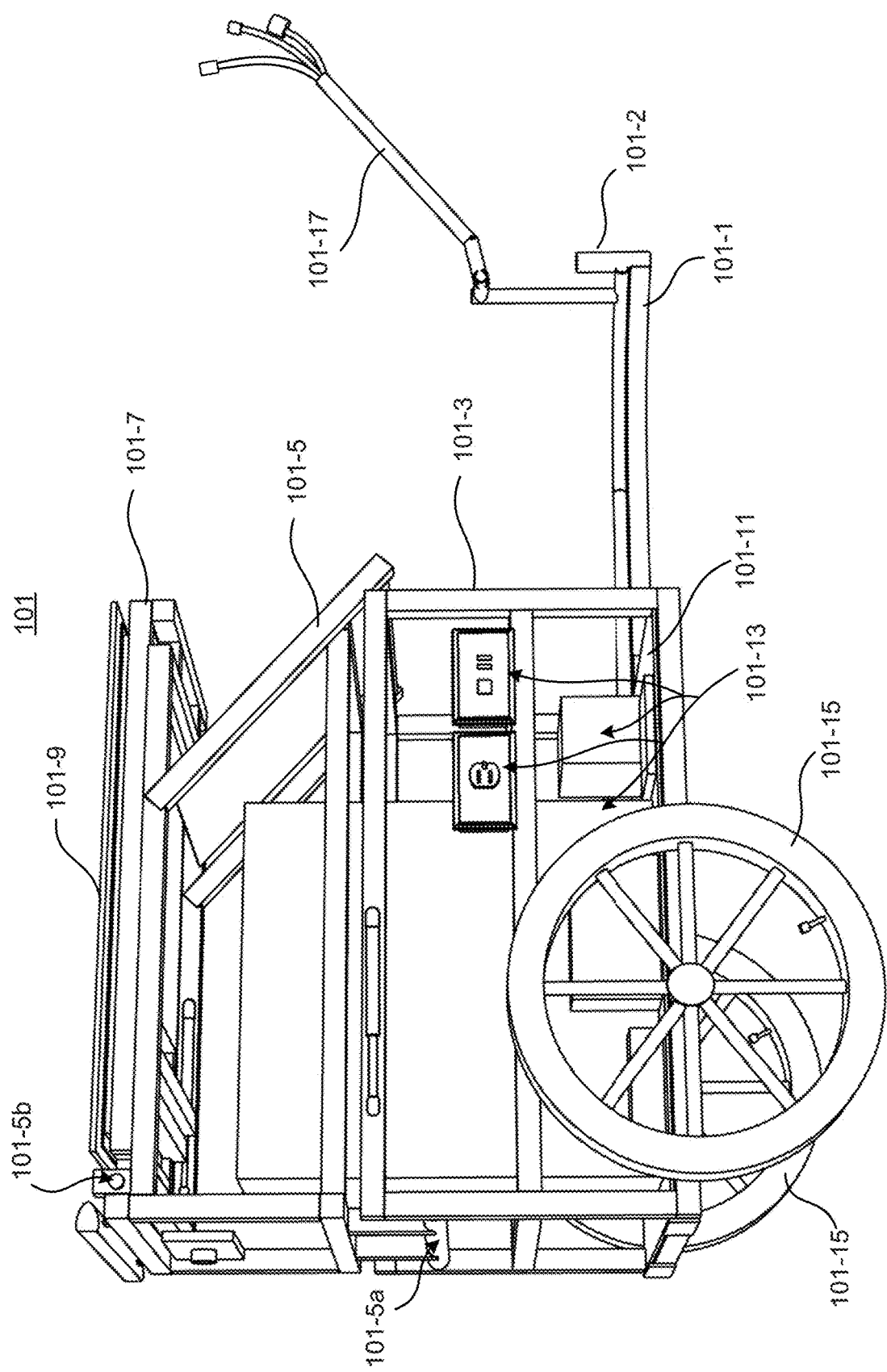
FIG. 11 illustrates a right side view of the EPCarT, according to an embodiment.
Figure 12:
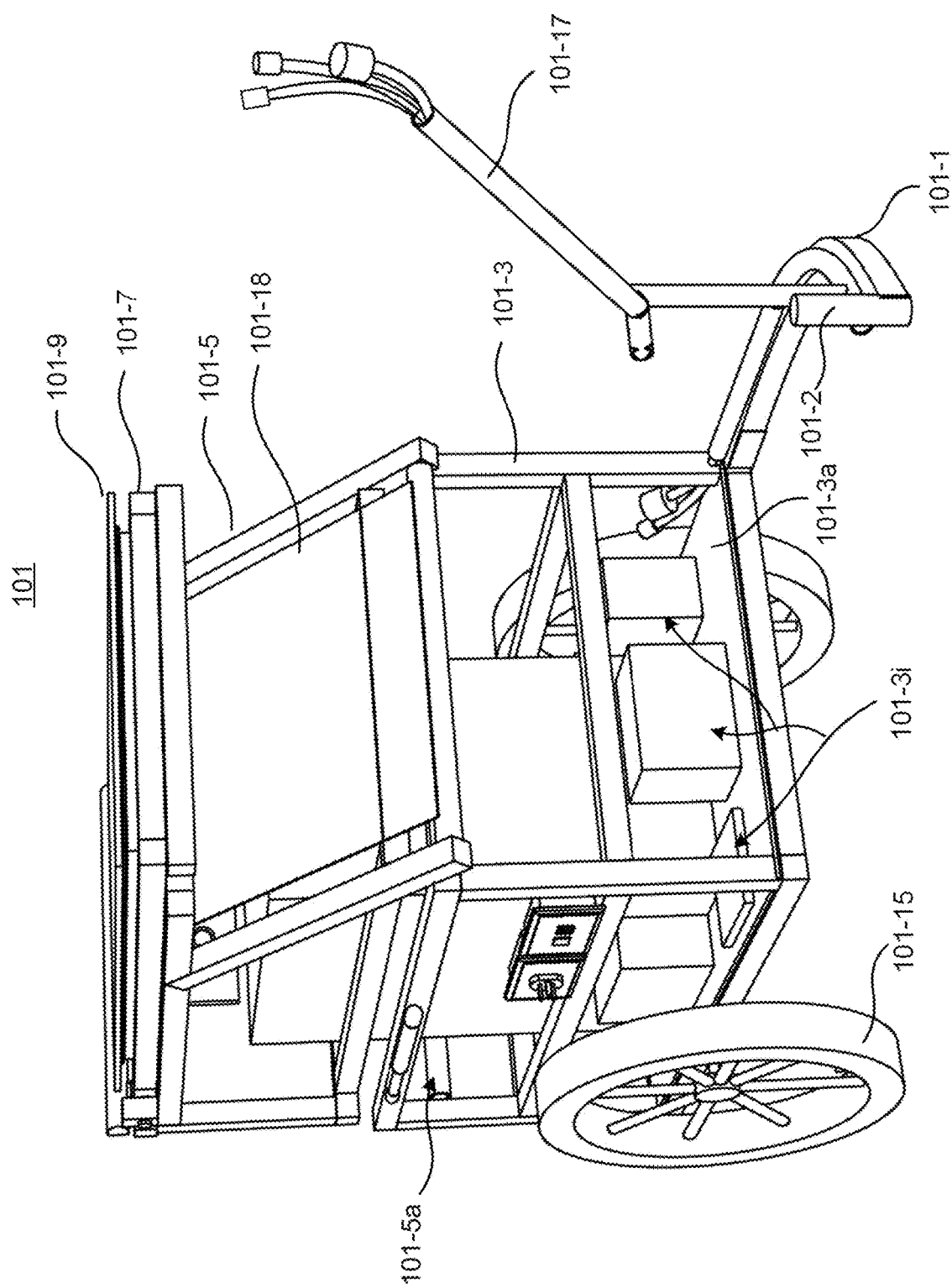
FIG. 12 illustrates a front side view of the EPCarT, according to an embodiment.

FIG. 11 illustrates a right side view of the EPCarT 101, according to an embodiment. The EPCarT 101 is a portable, convertible, versatile, and mobile advertising display pod on wheels carrying specialized electrical components that is equipped for automatically controlling and displaying all advertisements on an ad display screen. In addition, the EPCarT 101 is equipped with multiple power generating sources which provide power to all electrical components contained within its housing as well as providing regenerative power to the ETow-Bike 103 as needed. The EPCarT 101 includes a structural housing having a pod storage compartment 101-3 for housing electrical components, a hinged lid 101-5 coupled to the pod storage compartment 101-3 by a lid hinge assembly 101-5a, and an upper display panel rack 101-7 coupled to the hinged lid enclosure 101-5 by a display rack hinge assembly 101-5b. The pod storage compartment 101-3 may include a base platform 101-3a attached to its bottom side for supporting internal electronic components 101-13 and a pair for tires and wheels 101-15 coupled to a lower section of the pod storage compartment 101-3 via axels and support members. In addition, the pod storage compartment 101-3 may include trailer attachment members connected to its front side for coupling to the trailer rail 101-1 when being towed by the ETow-Bike 103. A trailer hitch post assembly 101-2 is connected at an end portion of the trailer rail 101-1, providing a coupling link to the detachable tow hitch assembly 103-3 of the ETow-Bike 103. The pod storage compartment 101-3 may also include an electrical harness assembly and harness plugs 101-17 connected alongside the trailer rail 101-1 for coupling electronic components from the EPCarT 101 to the ETow-Bike 103. The pod storage compartment 101-3 may also include an EPCarT Ad Display Unit 101-9 mounted and securely fasted to the upper display panel rack 101-7. In another implementation, the pod storage compartment 101-3 may also have a gas piston FIG. 12 illustrates a front side view of the EPCarT 101, according to an embodiment. The hinged lid enclosure 101-5 may have a sloped side portion which may support a solar panel 101-18 for providing a low voltage source to power and recharge some of the internal electronic components 101-13.

Figure 13:
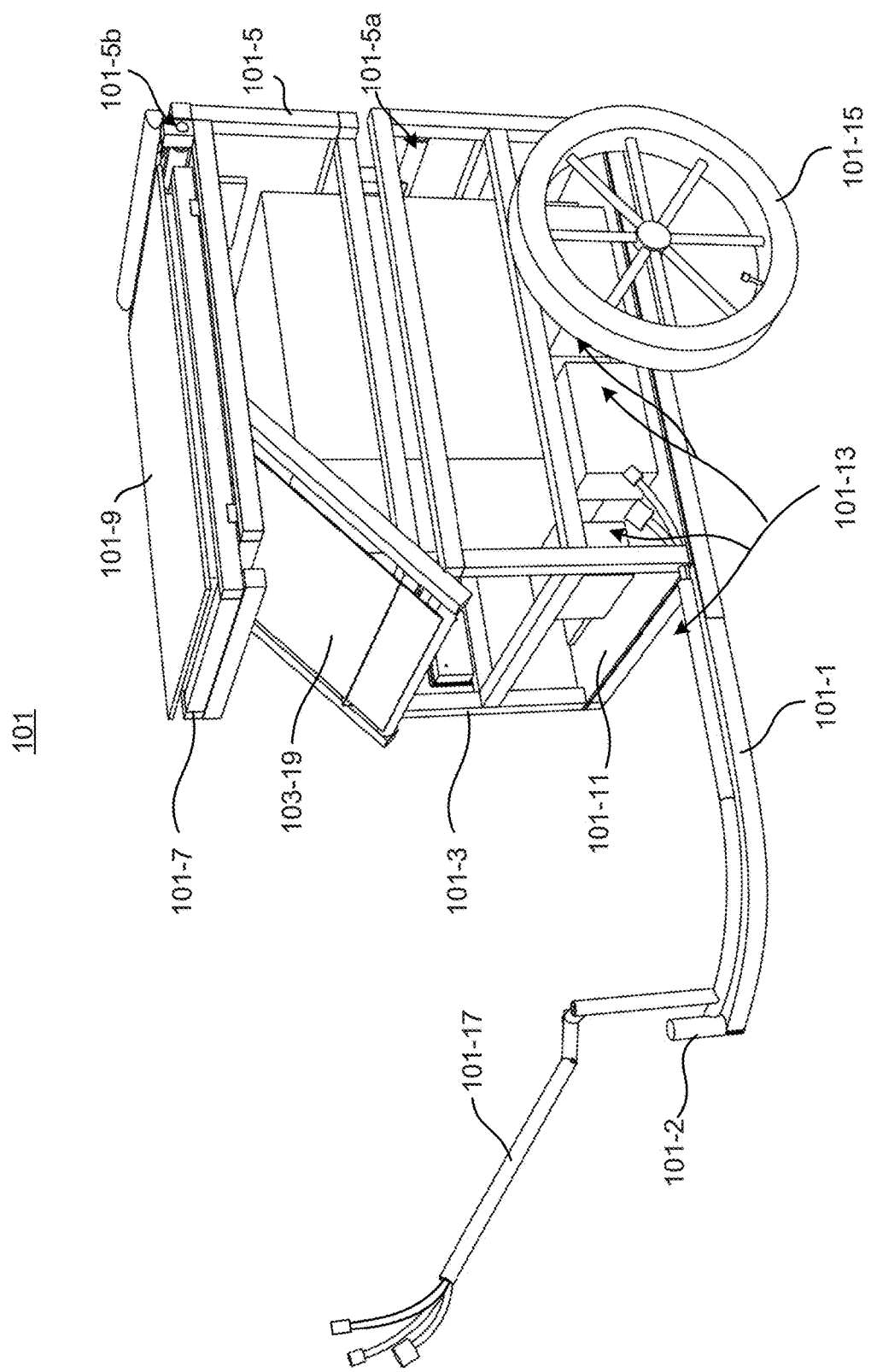
FIG. 13 illustrates a left side view of the EPCarT, according to an embodiment.

FIG. 13 illustrates a left side view of the EPCarT 101, according to an embodiment. All elements and components previously described hereinabove and in the previous figures are illustrated and shown at the left side perspective view, providing spatial context, relative dimensions, and relationship of elements included in the EPCarT 101 at this view.

Figure 14:
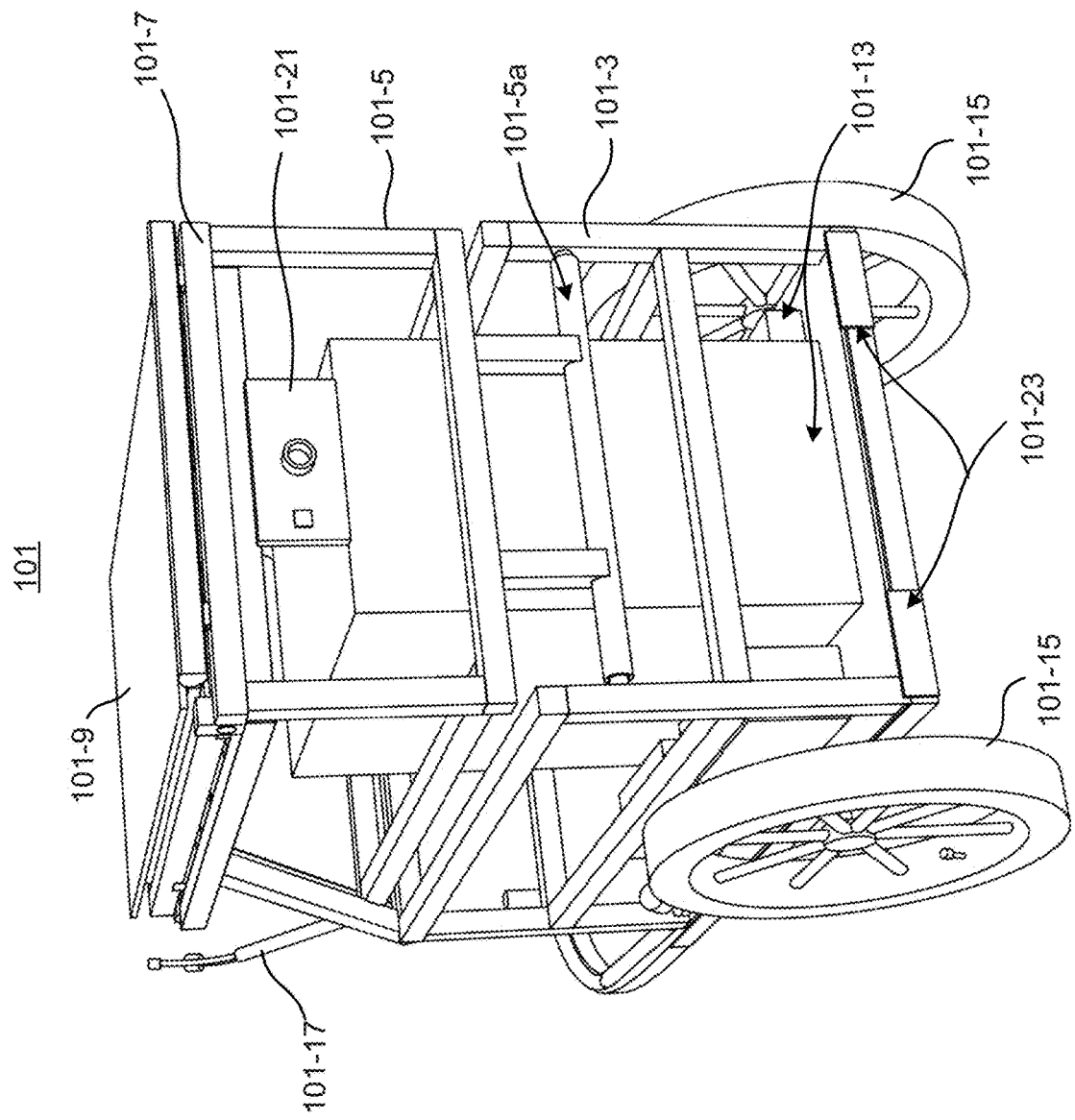
FIG. 14 illustrates a back side view of the EPCarT, according to an embodiment.

FIG. 14 illustrates a back side view of the EPCarT 101, according to an embodiment. The EPCarT 101 may also include additional electrical components such as a EPCarT rear facing camera and GPS device 101-21 attached to a back end portion of the hinged lid enclosure 101-5 and its own brake light, tail light, and turn signal assembly 101-3i attached to the lower section along a back side of the pod storage compartment 101-3. In operation, the brake light, tail light, and turn signal assembly 101-3i of the EPCarT 101 is controlled by switches on the control switch assembly 103-21 on the ETow-Bike 103 when to attached the ETow-Bike 103 via the electrical harness assembly and harness plugs 101-17. The EPCarT rear facing camera and GPS device 101-21 may include a digital image capturing system, local memory storage, a built-in wireless network hardware, a removable storage media, a data transfer port, and GPS hardware for transmitting captured images with corresponding GPS location data from the EPCarT rear facing camera and GPS device 101-21 to the remote EPCarT Base Station 105. The process of capturing a digital image taken at a specific GPS location is known as GPS photo tagging, or geotagging, where the captured digital image data includes embedded data such as date, time, size, latitude, longitude and sometimes altitude data. Wireless access and connectivity between the EPCarT rear facing camera and GPS device 101-21 and the remote EPCarT Base Station 105 may be provided by the onboard dash computer 103-9 or directly through the built-in wireless network hardware in the EPCarT rear facing camera and GPS device 101-21. The operation of the EPCarT rear facing camera and GPS device 101-21 may be controlled automatically with preconfigured timer settings to activate the camera and GPS device 101-21 and place it in an automatic digital image capturing and geotagging mode or controlled remotely by the Etow-Bike operator through the dash control panel 103-4 when connected to it via a wireless pairing connection (e.g., Bluetooth or WiFi).

Figure 15:
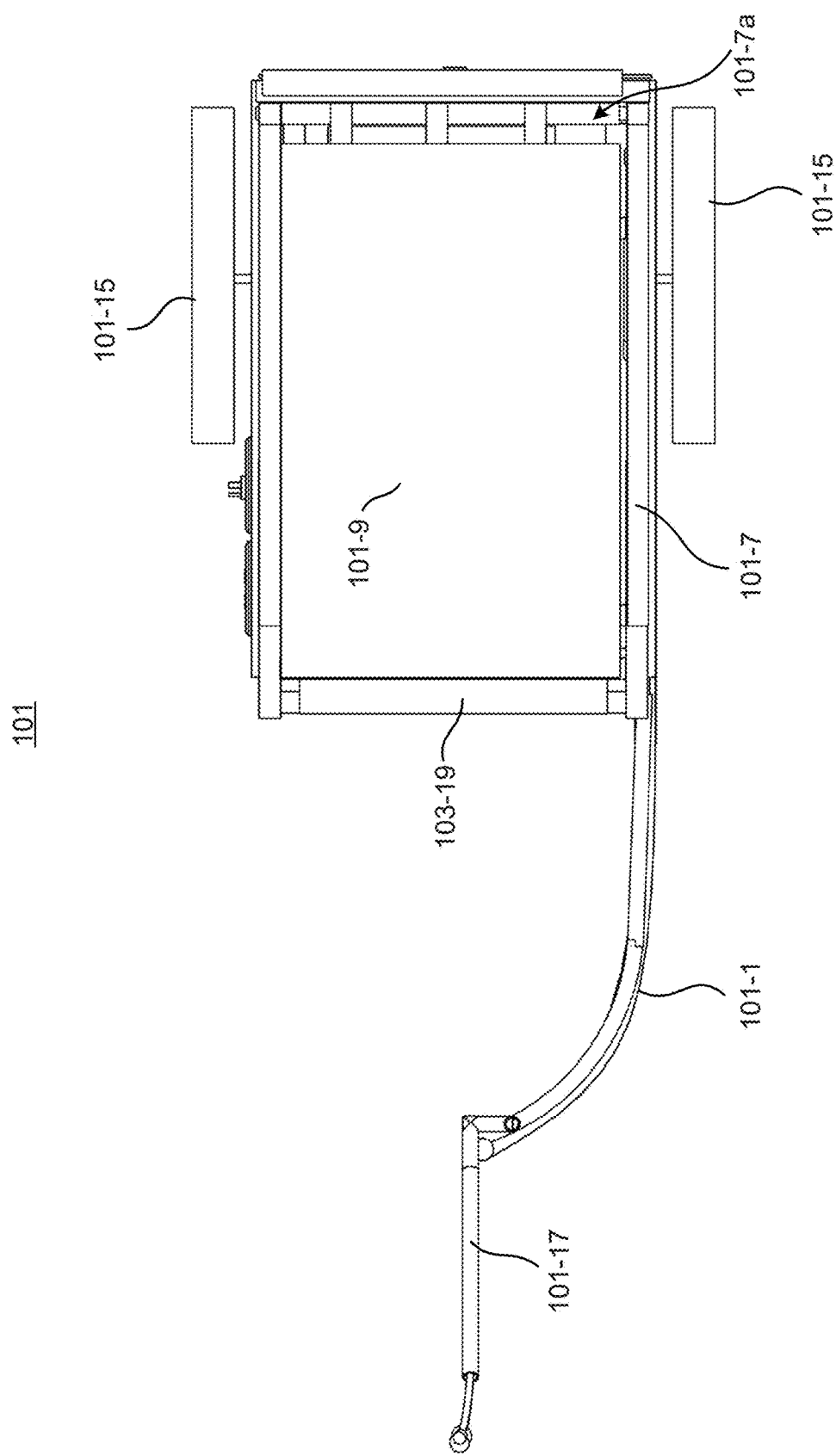
FIG. 15 illustrates a top side view of the EPCarT, according to an embodiment.

FIG. 15 illustrates a top side view of the EPCarT 101, according to an embodiment. All elements and components previously described hereinabove and in the previous figures are illustrated and shown at the top side perspective view, providing spatial context, relative dimensions, and relationship of elements and components included in the EPCarT 101 from the top side view.

Figure 16A:
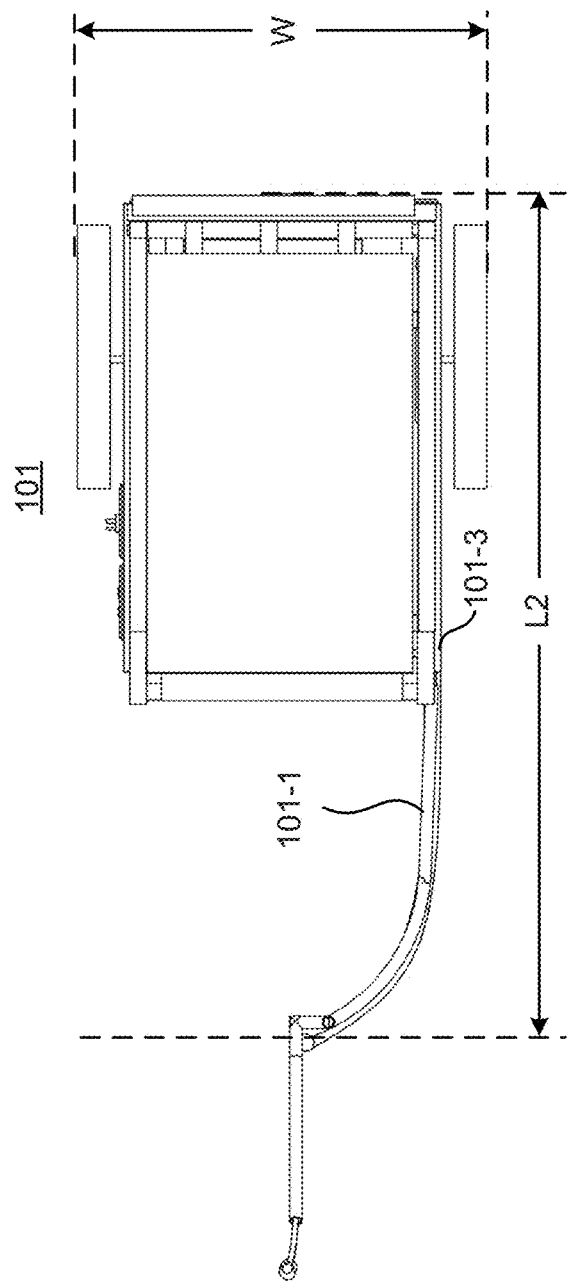
FIG. 16A and FIG. 16B illustrates a top side view and rear side view, respectively, of the EPCarT, providing approximate dimensions of the EPCarT, according to an embodiment.
Figure 16B:
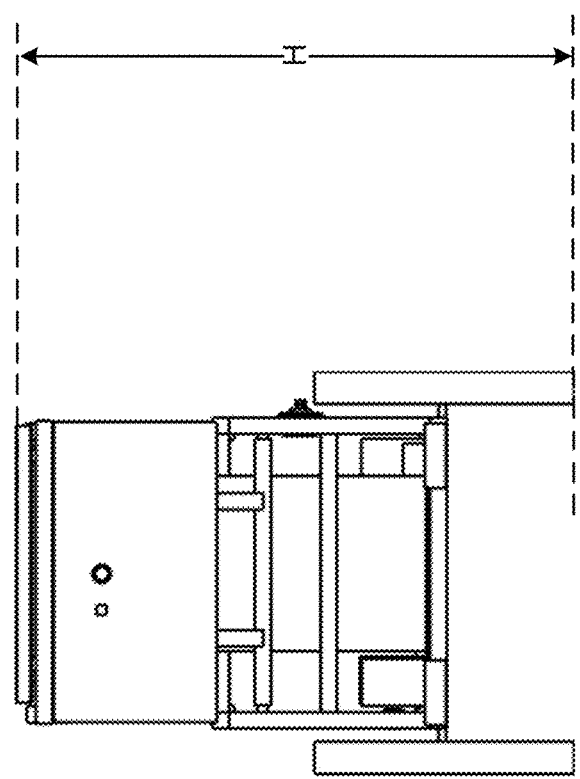

FIG. 16A and FIG. 16B illustrates a top side view and rear side view, respectively, of the EPCarT 101, providing approximate dimensions of the EPCarT 101, according to an embodiment. The size of the EPCarT may measure 48" (L)×24" (W)×32" (H) with the hinged lid enclosure 101-5 closed and which includes the length of the trailer rail 101-1 and length of the pod storage compartment 101-3. The approximate weight of the EPCarT 101 without the electronic components 101-13 may weigh less than 30 pounds while the fully loaded weight of the EPCarT 101, including electronic components 101-13, may weigh between 50-100 pounds, depending on which equipment is loaded therein. In relative terms and in comparison to common household items, the dimensions of the EPCarT 101 may be roughly equivalent to the size of a typical baby stroller, having similar load capacities as typical double strollers (i.e., 45-90 pounds).

Figure 17:
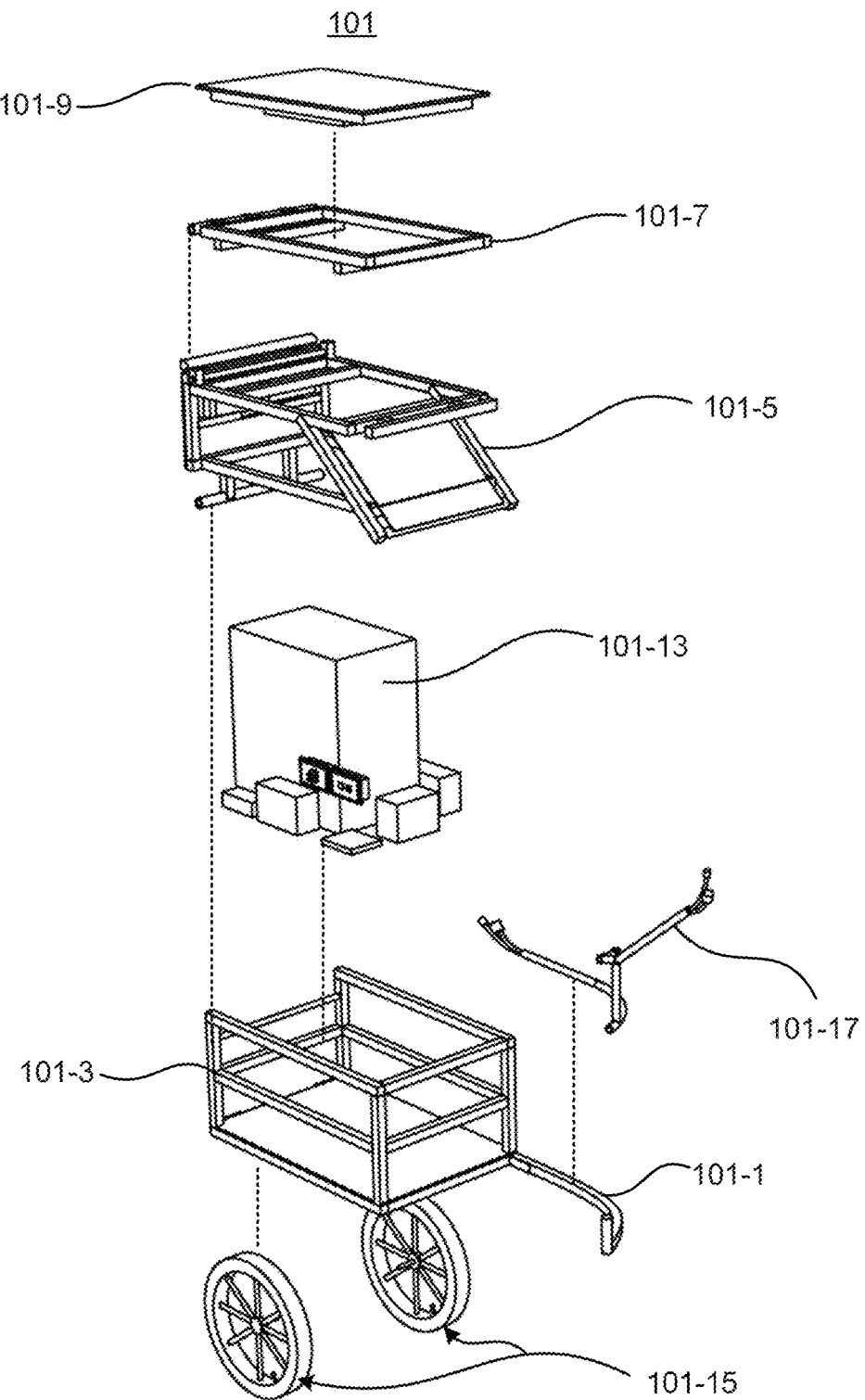
FIG. 17 illustrates a three-dimensional exploded view of the EPCarT, according to an embodiment.

FIG. 17 illustrates a three-dimensional exploded view of the EPCarT 101, according to an embodiment. In the exploded view, a breakdown of major parts and assemblies, their relationship and order of the parts and assemblies contained within the EPCarT 101 are provided. The order and relation of the major parts and assemblies starting from the bottom of the EPCarT 101 include 1) the tires and wheels 101-15 at the base of the EPCarT 101, 2) the pod storage compartment 101-3 which includes axel ports and wheel locking assembly located on a bottom frame thereof for coupling and securing the axel of the tires and wheels 101-15 to the axel ports of bottom frame via the wheel locking assembly, 3) the electrical harness assembly and harness plugs 101-17 which may be mounted and secured via strap fasteners to the trailer rail 101-1 of the pod storage compartment 101-3, 3) the electronic components 101-13 which are either mechanically fastened or securely stored via straps inside the pod storage compartment 101-3, 4) the hinged lid enclosure 101-5 which is coupled to the pod storage compartment 101-3 via a hinge assembly, allowing the hinged lid enclosure 101-5 to pivot and open and close the lid enclosure 101-5, 5) the upper display panel rack 101-7 having a display rack hinge assembly which is coupled to and mates with a receiving hinge assembly that mounted above the hinged lid enclosure 101-5, allowing the upper display panel rack 101-7 to pivot along the display rack hinge assembly between 0 and 90 degrees, and the EPCarT Ad Display Unit 101-9, mounted and secured to a display frame area of the upper display panel rack 101-7. Additional features and elements of each the major parts and assemblies shown in the exploded view are presented herein below.

Figure 18:
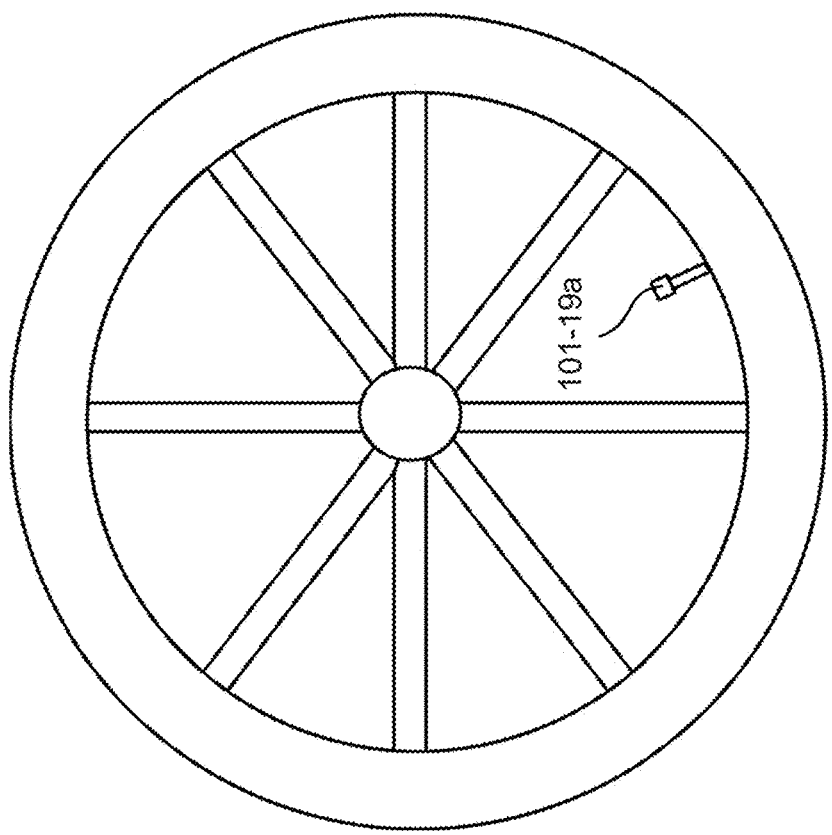
FIG. 18 illustrates a side view of the tire and wheel of the EPCarT, according to an embodiment.

FIG. 18 illustrates a side view of the tire and wheel 101-15 of the EPCarT 101, according to an embodiment. The tire and wheel 101-15 of the EPCarT 101 may include tire and wheel diameters ranging between 16" to 20", and a tire width ranging from 1.75 to 2.215 inches. Heavy duty tires are preferred on the EPCarT 101 in order to support heavier load requirements, having a tire load index rated to support loads of up to 150 pounds or more. To monitor air pressure in real-time of both tires and wheels 101-15, a TPMS sensor 101-19a may be applied to each stem valve of the tires and wheels 101-15. The tire air pressure may be monitored wirelessly transmitted in real-time to the tire pressure monitoring sensor display 103-13 on the ETow-Bike 103.

Figure 19A:
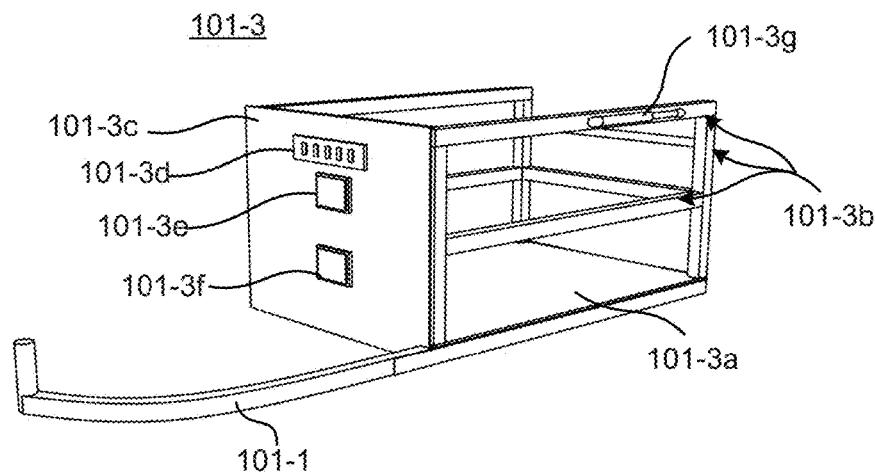
FIG. 19A-FIG. 19C illustrate a front-right side perspective view, a front-left side perspective, and back side perspective view, respectively, of the pod storage compartment, according to an embodiment.
Figure 19B:
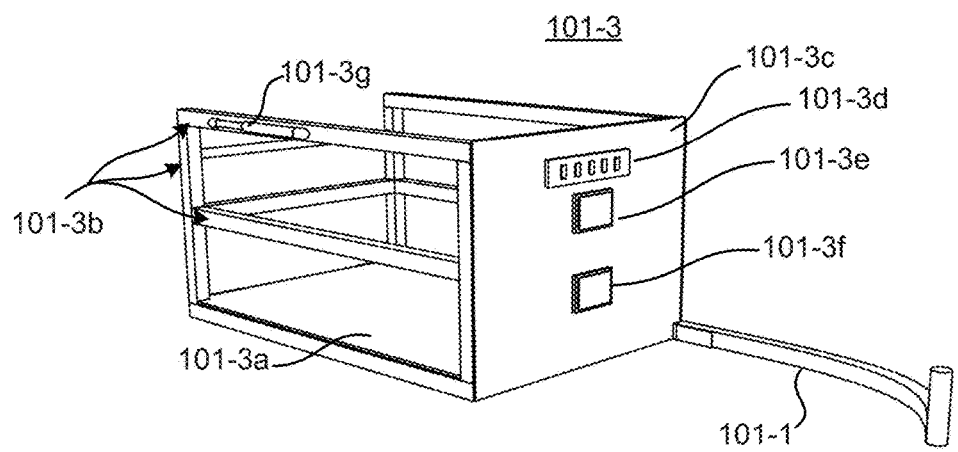
Figure 19C:
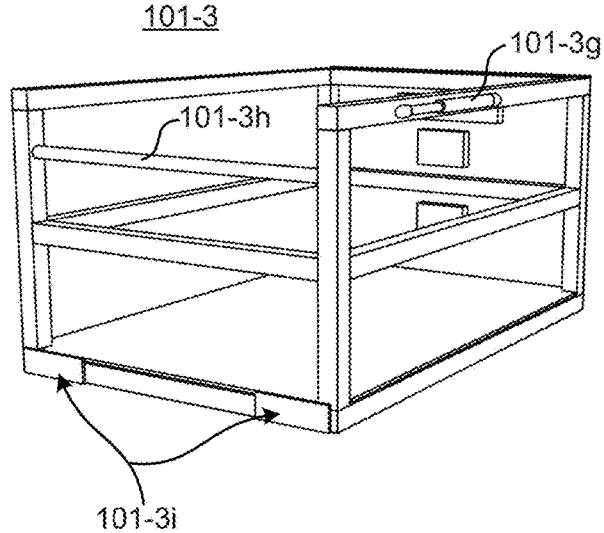

FIG. 19A-FIG. 19C illustrate a front-right side perspective view, a front-left side perspective, and back side perspective view, respectively, of the pod storage compartment 101-3, according to an embodiment. The pod storage compartment 101-3 may have a box frame or framing rails 101-3b fabricated from chromoly steel, aluminum, carbon fiber composite, or any other natural or composite materials having high strength yet lower in weight. In one implementation, the box frame 101-3b may support the base platform 101-3a and a EPCarT control panel cover 101-3c having EPCarT control switches 101-3d, a digital temperature display readout 101-3e, and a digital solar power meter readout 101-3f mounted to the face of the EPCarT control panel cover 101-3c. In another implementation, the box frame 101-3b may include one or more gas struts or pneumatic cylinder gas pistons 101-3g mounted to an upper rail of the box frame 101-3b for pneumatically supporting, raising and lowing the hinged lid enclosure 101-5 when the lid hinge assembly 101-5a on the hinged lid enclosure 101-5 is inserted into a hinged lid rod 101-3h of the box frame 101-3b, allowing the hinged lid enclosure 101-5 to pivot and rotate around the hinged lid rod 101-3h of the box frame 101-3b.

Figure 20A:
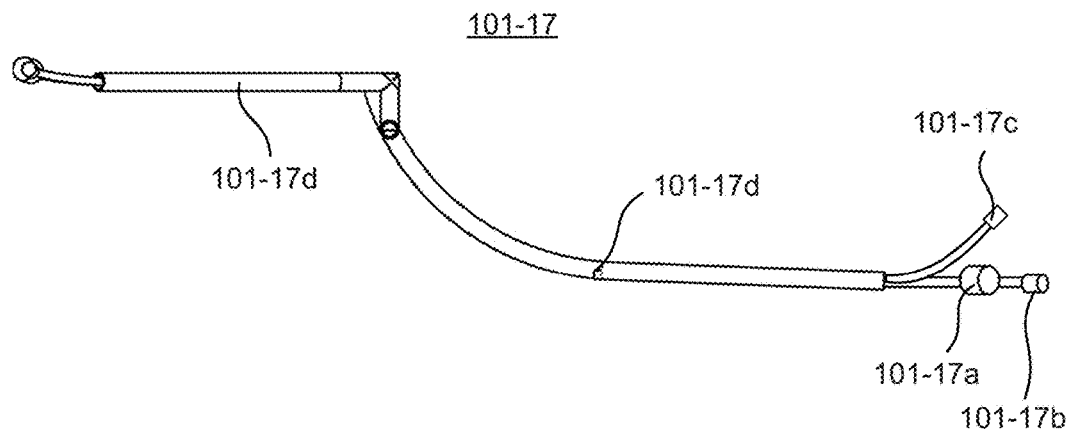
FIG. 20A-FIG. 20B illustrate a top and side view, respectively, of the electrical harness assembly and harness plugs, according to an embodiment.
Figure 20B:
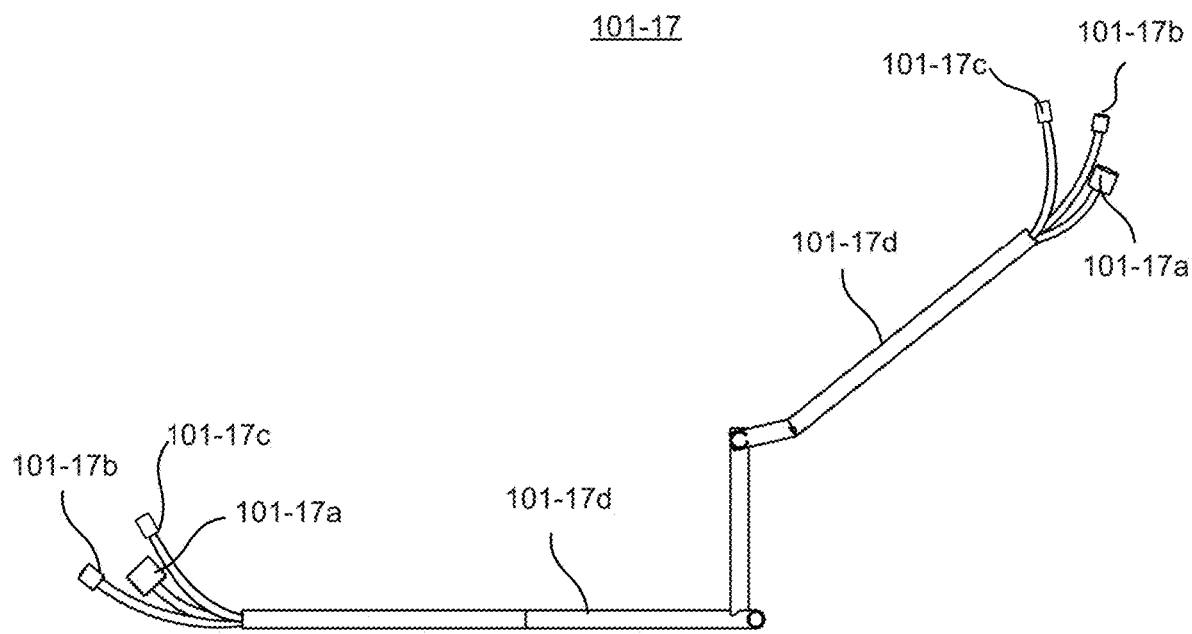

FIG. 20A-FIG. 20B illustrate a top and side view, respectively, of the electrical harness assembly and harness plugs 101-17, according to an embodiment. The electrical harness assembly and harness plugs 101-17 may include multiple wire cabling having an EPCarT plug connectors such as a charging cable connector 101-17a, a trailer wiring connector 101-17b, and a digital video, audio and data interface connector 101-17c. The electrical harness assembly and harness plugs 101-17 may also include a harness wire tubing or conduit 101-17d to protect the electrical harness assembly and harness plugs 101-17 from external damage that may cause an electrical short as well as to prevent others from possible injuries or electrical shock.

FIG. 21A-FIG. 21C illustrate a front-right side perspective view, a front-left side perspective, and top side view, respectively, of the internal electronic components 101-13 contained within the EPCarT 101, according to an embodiment. The internal electronic components 101-13 may include 1) the EPCarT Ad Server 101-13a having communication hardware that is capable of transmitting and receiving ad data and live content data to and from the remote EPCarT Base Station 105 or directly from the third party data service providers 107 via the wireless network 109, 2) a 5V wireless speaker and sound system 101-13b wirelessly coupled to the EPCarT 101 and the ETow-Bike 103, 3) a 12V accessory battery 101-13c coupled to the solar panel 101-18 and the wireless speaker and sound system 101-13b, 4) a high voltage battery charge controller 101-13d for charging the rechargeable battery 103-2 on ETow-Bike 103 when coupled to the EPCarT 101, a 12V brake light and signal relay controller 101-13e, 5) an AC lithium battery power outlet 101-13f providing at least 200 W of AC power for up to 5 hours or more, 6) a power generator 101-13g for providing additional power to the EPCarT 101 and the ETow-Bike 103 when in non-operating mode, 7) an AC power plug-in cord 101-13h for providing direct AC power to the EPCarT 101 and the ETow-Bike 103, and a network data line port 101-13i for providing a wired network connection between the EPCarT 101 and the remote EPCarT Base Station 105. Note, the power supplied to the EPCarT Ad Server 101-13a to recharge or operate it is an external AC power source supplying AC Voltage (100-240V, 50-60 Hz), and having a working DC voltage of up to 15V and power consumption of approximately less than 40 W. In another implementation, the power generator 101-13g may include a gas powered generator providing 2 kW peak for charging the ETow-Bike 103 when not in operation and away from people, providing an extended (nearly unlimited) range to the ETow-Bike 103 and supplying power and all times to all electronic components on both the EPCarT 101 and ETow-Bike 103. In yet another implementation, the power generator 101-13g may be coupled to the E-tow bike's rechargeable battery 103-2 via a quick-disconnect coupler which can supply power to the ETow-Bike 103 during long distance hauling when the EPCarT 101 is not in service (i.e., not displaying Ad Files) or can charge the ETow-Bike 103 while temporarily stopped.

Figure 22A:
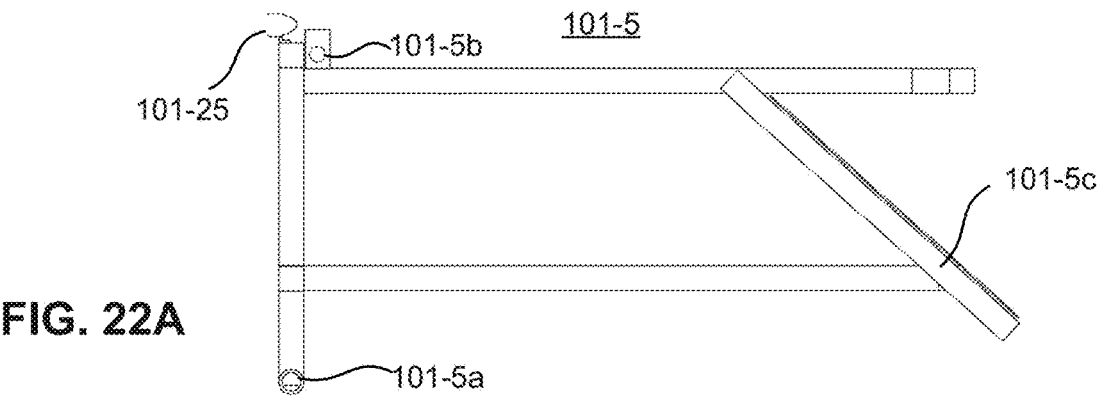
FIG. 22A-FIG. 22C illustrate a side view, front perspective view, and rear perspective view, respectively, of the hinged lid enclosure, according to an embodiment.
Figure 22B:
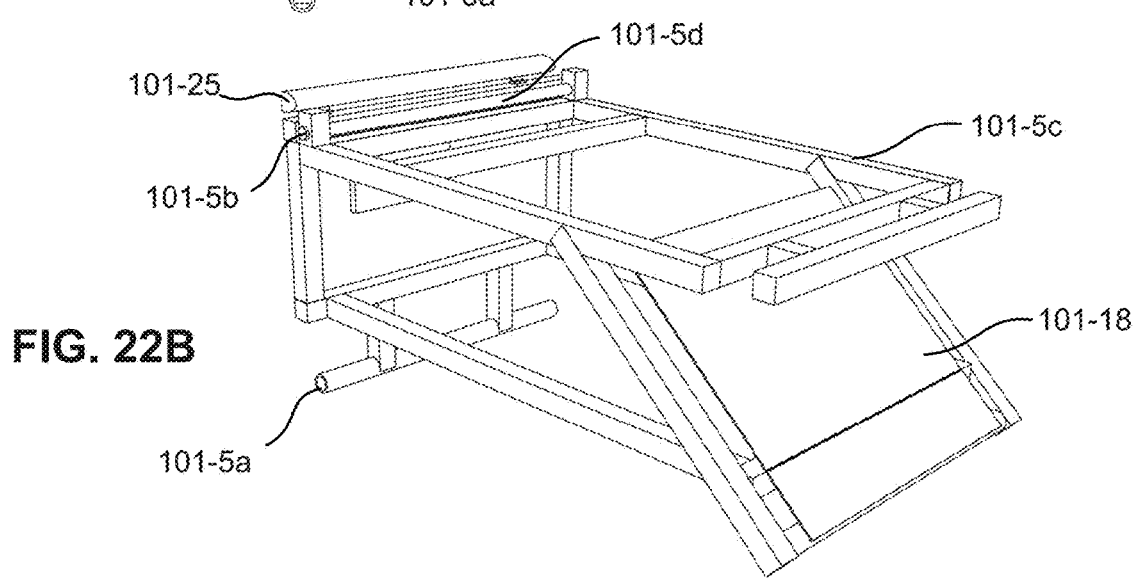
Figure 22C:
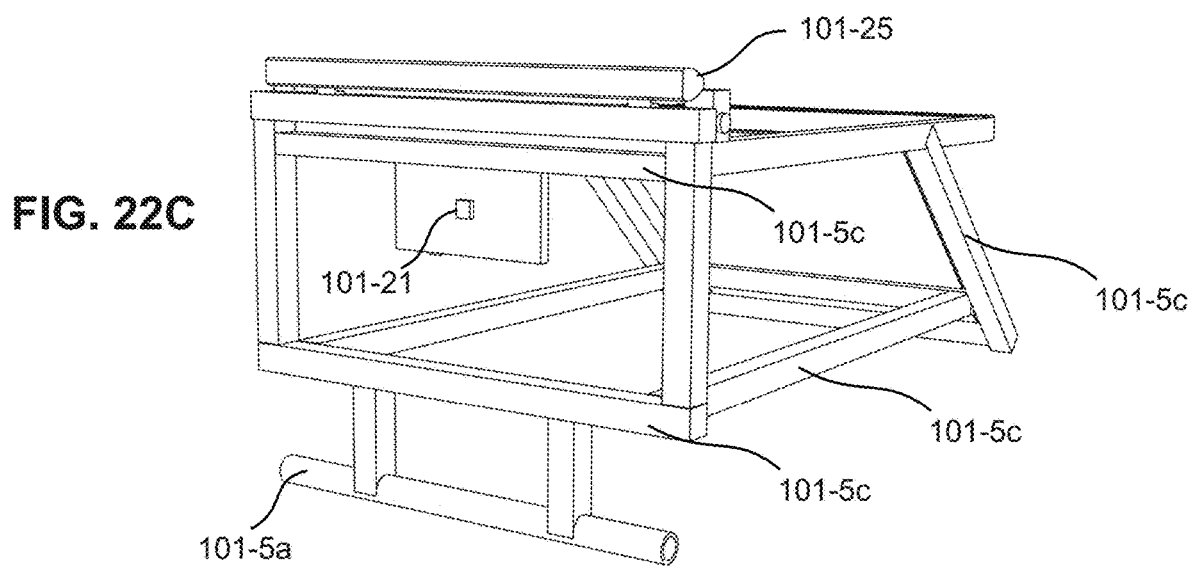

FIG. 22A-FIG. 22C illustrate a side view, front perspective view, and rear perspective view, respectively, of the hinged lid enclosure 101-5, according to an embodiment. The hinged lid enclosure 101-5 may include metal railings 101-5c forming a geometrically shaped enclosure frame and structure of the hinged lid enclosure 101-5 as shown. The hinged lid enclosure 101-5 may also include the lid hinge assembly 101-5a having a cylindrical tube that is inserted into the hinged lid rod 101-3h of the box frame 101-3b, allowing the hinged lid enclosure 101-5 to pivot and rotate around the hinged lid rod 101-3h of the box frame 101-3b. The hinged lid enclosure 101-5 includes the display rack hinge assembly 101-5b having a hinge pin or rod 101-5d inserted between the display rack hinge assembly 101-5b. The EPCarT rear facing camera and GPS device 101-21 may be attached and secured to the top metal railings 101-5c along the back end of the of the hinged lid enclosure 101-5. In another implementation, a light bar 101-25 may be mounted to top side of the metal railings 101-5c along the back end of the hinged lid enclosure 101-5 for providing a light source for capturing images and video by the EPCarT rear facing camera and GPS device 101-21. In operation, the hinged lid enclosure 101-5 provides a cover for the internal components, protecting it from sun, moisture and rain; and 2) may act as a sound absorbing cover with proper acoustic foam installed for dampening sound from the power generator 101-13g when in operation.

Figure 23A:
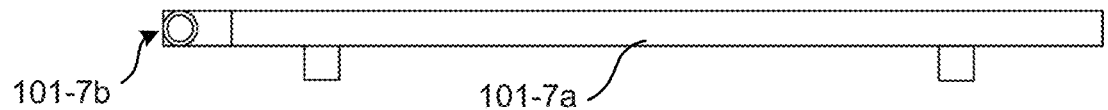
FIG. 23A-FIG. 23C illustrate a side view, top view, and top perspective view, respectively, of the upper display panel rack, according to an embodiment.
Figure 23B:
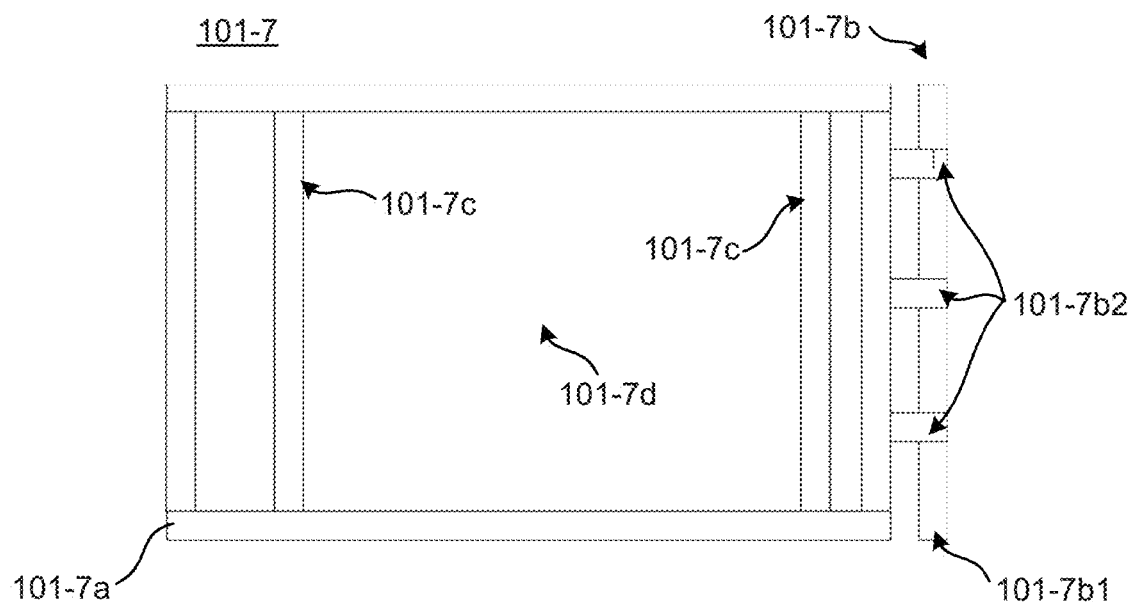
Figure 23C:
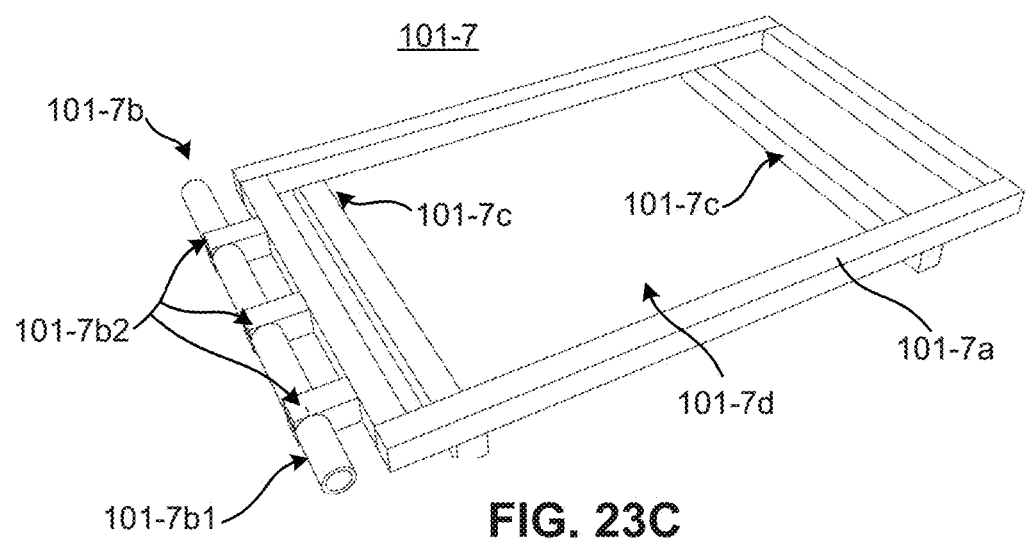

FIG. 23A-FIG. 23C illustrate a side view, top view, and top perspective view, respectively, of the upper display panel rack 101-7, according to an embodiment. The upper display panel rack 101-7 includes a rectangular frame 101-7a coupled to a display rack hinge assembly 101-7b at one end of the rectangular frame 101-7a. The display rack hinge assembly 101-7b may include a cylindrical hinge member 101-7b1 and frame coupling members 101-7b2 for coupling the cylindrical hinge member 101-7b1 to the rectangular frame 101-7a. The outer rails of the rectangular frame 101-7a and display support bars 101-7c forms a shallow inner display slot 101-7d which is structured to receive and support the EPCarT Ad Display Unit 101-9 when inserted therein.

Figure 24A:
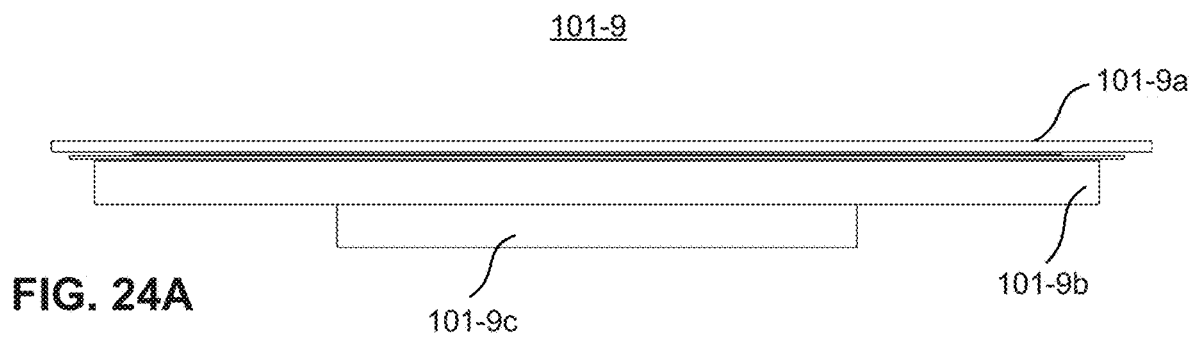
FIG. 24A-FIG. 24C illustrate a side view, front perspective view, and rear perspective view, respectively, of the EPCarT Ad Display Unit having a LCD panel embedded in a high strength cold rolled steel back case, and internal circuitry, in accordance to an embodiment.
Figure 24B:
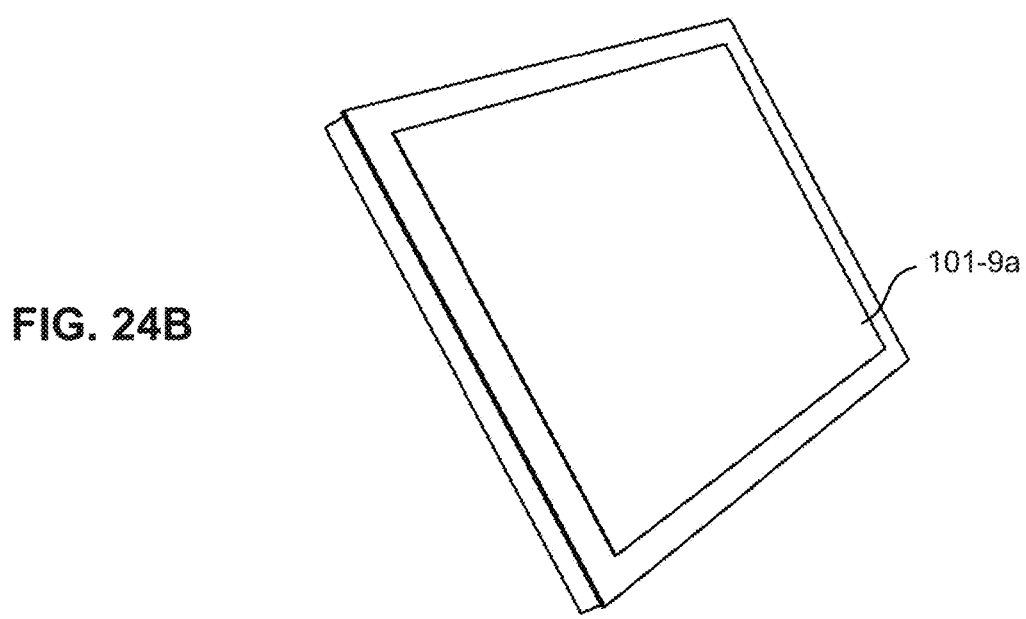
Figure 24C:
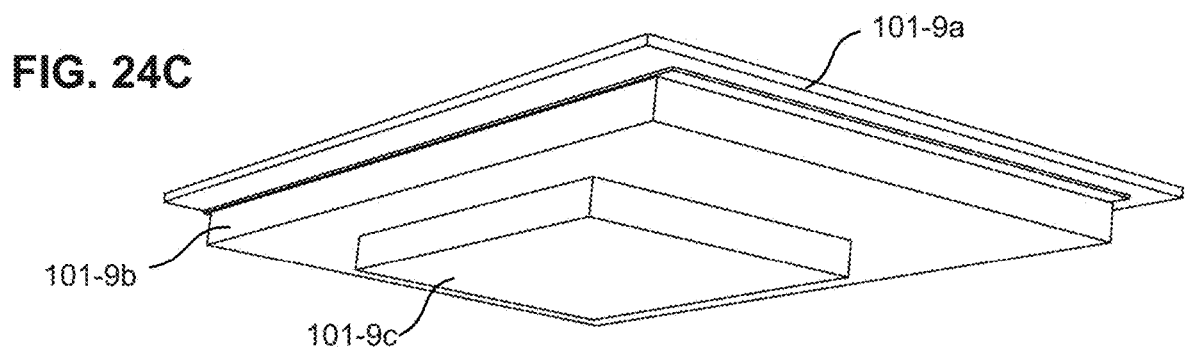

FIG. 24A-FIG. 24C illustrate a side view, front perspective view, and rear perspective view, respectively, of the EPCarT Ad Display Unit 101-9 having a LCD panel 101-9a embedded in a high strength cold rolled steel back case 101-9b, and internal circuitry 101-9c, in accordance to an embodiment. Unlike consumer monitors that are typically rated with lower brightness rating, lower viewing angles, and reduced operating temperature tolerances, the EPCarT Ad Display Unit 101-9 is configured to include an industrial LCD panel, having a wide viewing angle, high nits, and true color. In application, the EPCarT Ad Display Unit 101-9 is at least a 20" display screen for providing optimum viewing of text, images, and videos to nearby pedestrian within 2 to 6 feet of the LCD panel 101-9a. The EPCarT Ad Display Unit 101-9 includes a sun readable display having a brightness (cd/m²) specification of at least 700 Nits or greater. However, a brightness specification of 1000 Nits or greater is preferred to be optimally visible during all hours of the day. In order to handle diverse and extreme weather conditions, the EPCarT Ad Display Unit 101-9 has an operating temperature range −20 to 70° C., and relative humidity operating range of 10% to 80%. An external power supply is required to operate the EPCarT Ad Display Unit 101-9 with an AC power source supplying AC 100-240V, 50-60 Hz, having a working DC voltage of 12V and power consumption of approximately less than 35 W.

In operation, the orientation of the EPCarT Ad Display Unit 101-9 is mounted to the EPCarT 101 in the vertical position so that images are displayed in portrait mode having a vertical layout instead of a landscape mode or horizontal layout. With the EPCarT Ad Display Unit 101-9 in the portrait orientation, the display resolution is 1080×1920 pixels, having an aspect ratio 9:16.

Some advantages of mounting the EPCarT Ad Display Unit 101-9 to the EPCarT 101 in the vertical (portrait) position include 1) safer transportation and stability of the display while hauling it the EPCarT 101, since the width of the display does not extend past the width of the EPCarT 101; 2) because it resolves the issue of screen black out when polarized sunglasses are worn since polarized sunglasses only allowing light to pass through vertically (portrait mode); and 3) Consumers are familiar and adapted to read display in portrait mode (e.g., smartphone, tablet, or mobile devices).

Figure 25:
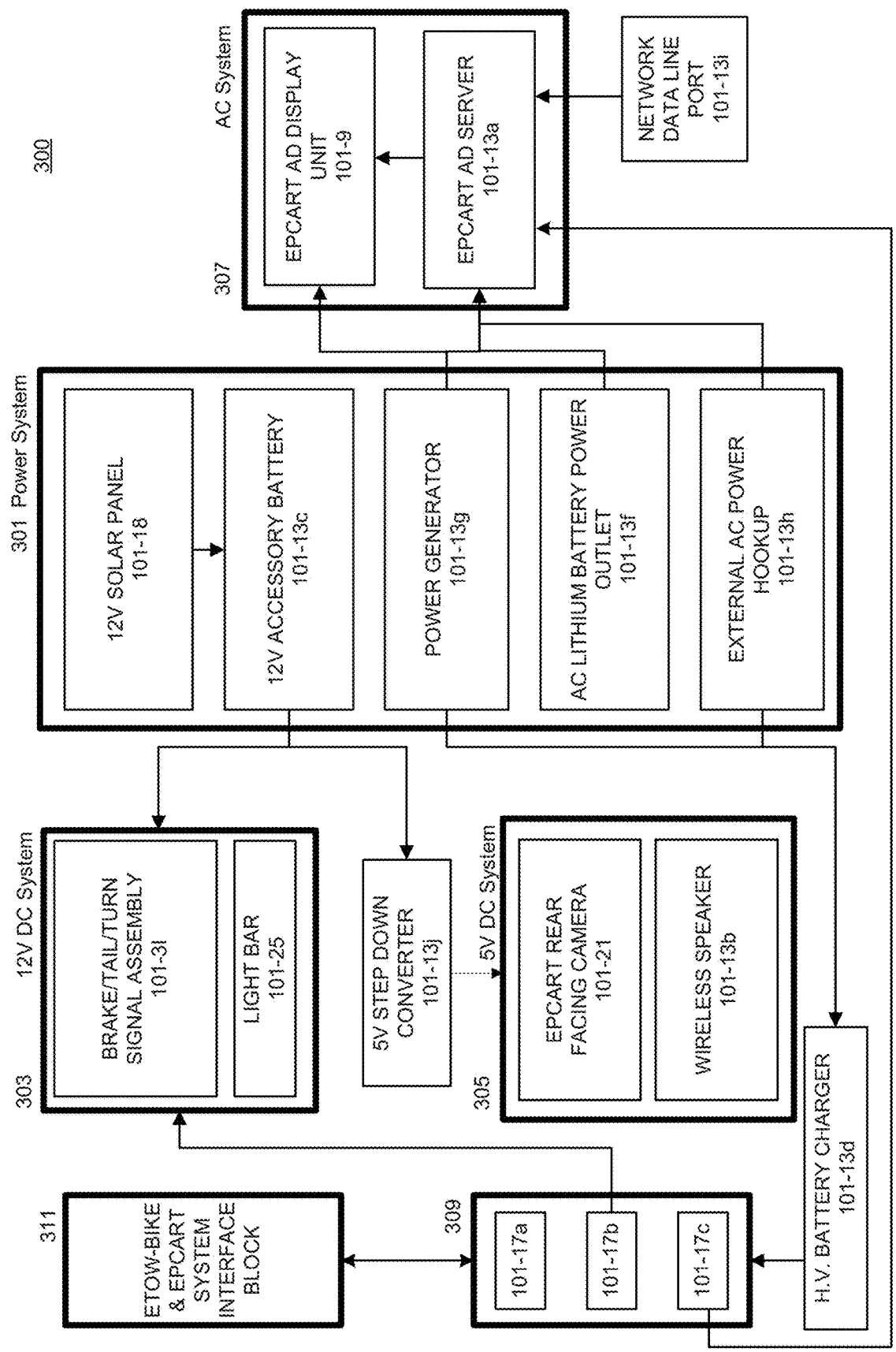
FIG. 25 illustrates a system block diagram electrical components on the EPCarT, according to an embodiment.

FIG. 25 illustrates a system block diagram 300 electrical components on the EPCarT 101, according to an embodiment. In the system block diagram 300, the electrical systems are grouped and divided into five major blocks: a power system block 301, a 5V system block 303, a 12V system block 305, a AC system block 307, an EPCarT interface coupler block 309, and the Etow-Bike/EPCarT system interface block 311 for electrically coupling the ETow-Bike 103 with the EPCarT 101. The power system block 301 may include the different power supply sources supplying power to the system 300. These power supply sources include the 1) 12V Solar Panel 101-18 which provides a 12V renewable power supply to recharge the 12V Accessory Battery 101-13c; 2) the 12V Accessory Battery 101-13c which may supply power to the 12V brake light and signal relay controller 101-13e, the 12V DC System including the brake, tail, and turn signal assembly 101-3i on the EPCarT 101, and the light bar 101-25. The 12V Accessory Battery 101-13c also supplying power to the 5V DC System 305 via a 5V Step Down Converter 101-13j; 3) the power generator 101-13g which may include a portable gas generator that is capable of generating both AC and DC power; 4) the AC lithium battery power outlet 101-13f for supplying AC power; and 5) AC power from the AC power plug-in cord 101-13h when connected to an external AC power supply via the plug-in cord. The AC system block 307 includes the electrical components having AC power requirements for either charging or operating these components. In the system 300, the electrical components requiring AC power may include the EPCarT Ad Server 101-13a and the EPCarT Ad Display Unit 101-9 which may be directly powered by the power generator 101-13g, the AC lithium battery power outlet 101-13f or the AC power plug-in cord 101-13h depending on the selected operating mode (stand-alone, remote, or as-needed) of the EPCarT 101. The system 300 may also provide a power supply source to charge the rechargeable battery 103-2 on the ETow-Bike 103 via the power generator 101-13g and the high voltage battery charge controller 101-13d when the ETow-Bike System 200 is coupled to the EPCarT system 300 via the Etow-Bike/EPCarT system interface block 311. The EPCarT interface coupler block 309 includes the charging cable connector 101-17a, the trailer wiring connector 101-17b, and the digital video, audio and data interface connector 101-17c. In particular, the Ad Display and Touchscreen Controller 103-11 on the ETow-Bike 103 is coupled to the EPCarT Ad Server 101-13a on the EPCarT 101 via interface connector 101-17c and interface connector 103-3c. In addition, the control switch assembly 103-21 on the ETow-Bike 103 may be coupled to the brake light, tail light, and turn signal assembly 101-3i on the EPCarT 101 via interface connector 101-17b and interface connector 103-3b. Moreover, the system 300 may include the network data line port 101-13i for providing a wired network connection between the EPCarT Ad Server 101-13a on the EPCarT 101 and the remote EPCarT Base Station 105.

Figure 26A:
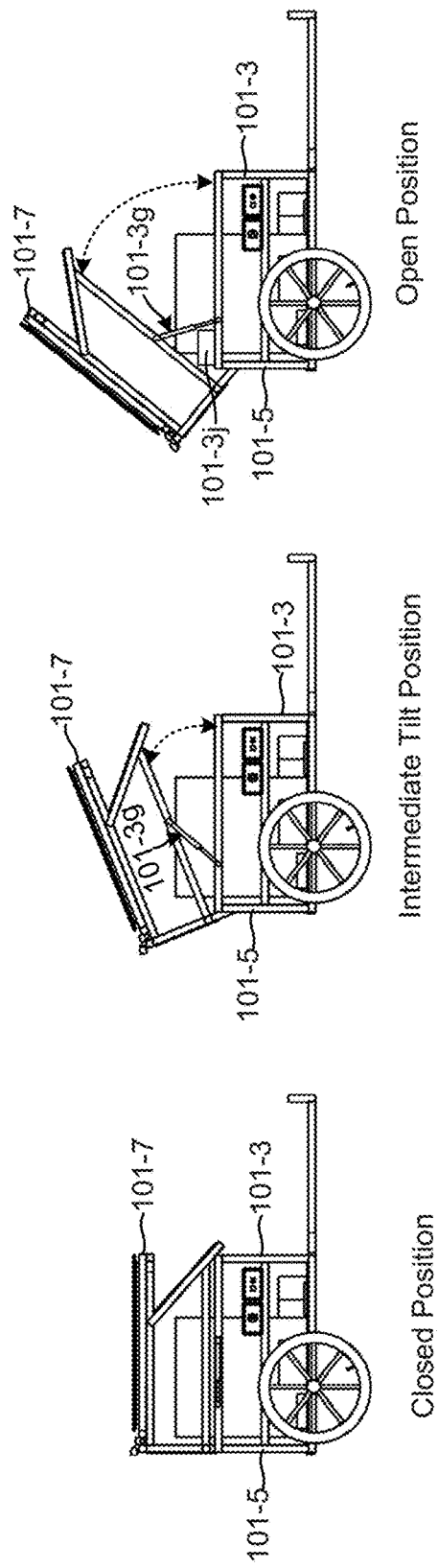
FIG. 26A-FIG. 26B illustrate side and perspective views, respectively, of the EPCarT with the hinged lid at various swing positions, according to an embodiment.
Figure 26B:
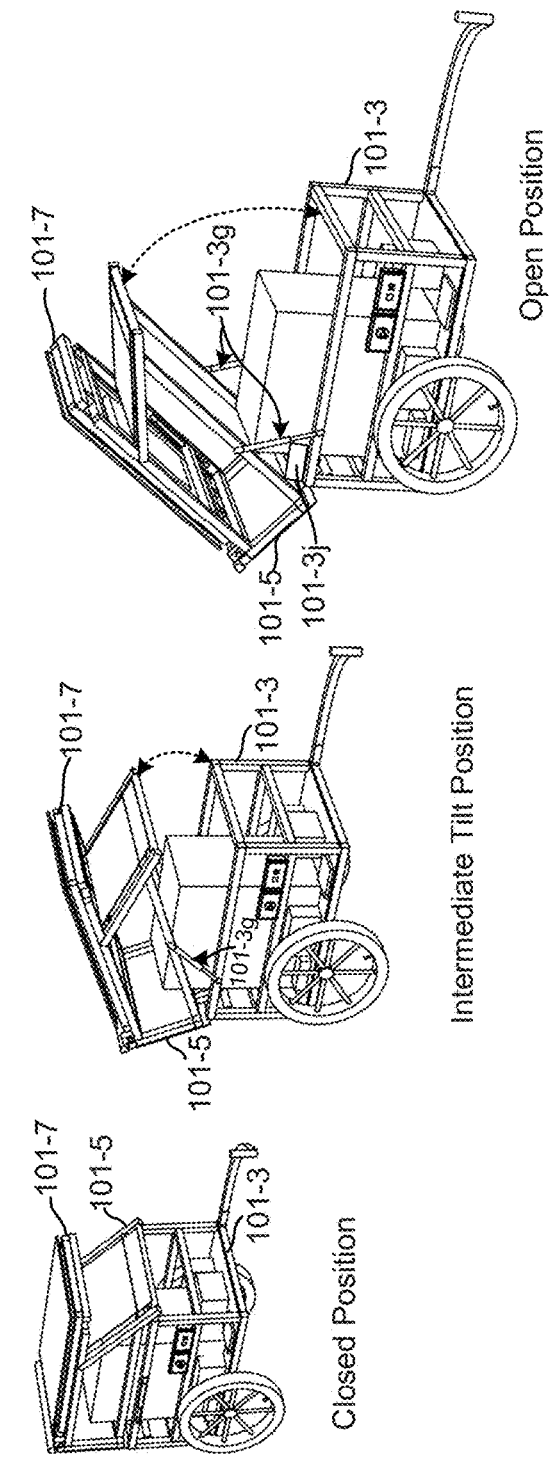

FIG. 26A-FIG. 26B illustrate side and perspective views, respectively, of the EPCarT 101 with the hinged lid 101-5 at various swing positions, according to an embodiment. the box frame 101-3b may include one or more gas struts or pneumatic cylinder gas pistons 101-3g mounted to an upper rail of the box frame 101-3b for pneumatically supporting, raising and lowering the hinged lid enclosure 101-5 when the lid hinge assembly 101-5a on the hinged lid enclosure 101-5 is inserted into a hinged lid rod 101-3h of the box frame 101-3b, allowing the hinged lid enclosure 101-5 to pivot and rotate around the hinged lid rod 101-3h of the box frame 101-3b. The hinged lid enclosure 101-5 may have one end of the gas strut 101-3g attached along an edge portion of the an upper rail of the box frame 101-3b of the pod storage compartment 101-3 while the other end of the gas strut may be attached to the bottom portion of the hinged lid 101-5, allowing the hinged lid enclosure 101-5 to pivot at a closed position at a 0 degree tilt (leftmost figure), an intermediate tilt position between a 30-45 degrees (center figure), or a fully extended tilt position at greater than 45 degrees tilt (rightmost figure). In another implementation, a 12 v power linear actuator assembly 101-3j may be coupled to the gas strut 101-3g to automatically lift the hinged lid enclosure 101-5 via a lid remote control operated by the ETow-Bike operator.

FIG. 27A-FIG. 27B illustrate a side and perspective views, respectively, of the EPCarT 101 with the upper display panel rack 101-7 at adjustable tilt position settings, according to an embodiment. The upper display panel rack 101-7 may have one end of a gas strut or pneumatic cylinder gas piston 101-3k attached along an edge portion of the rectangular frame 101-7a of the upper display panel rack 101-7 while the other end of the gas strut or pneumatic cylinder gas piston 101-3k may be attached to the top portion of the hinged lid 101-5, allowing the upper display panel rack 101-7 to rest at a closed position at 0 degree tilt (leftmost figure), an intermediate tilt position between a 30-45 degrees (center figure), or a fully extended tilt position at greater than 45 degrees tilt (rightmost figure). In practice, the adjustable tilt position settings may allow the user to set an tilt angle of the EPCarT Ad Display Unit 101-9 for optimum viewing when in operation. In addition, the adjustable tilt position settings provides structural support to a EPCarT Ad Display Unit 101-9, allowing it to tilt from a 0 degree position for high-speed (10-25 mph) commuting and non-advertising modes to a 45-90 degree tilt position (Tp) when actively displaying visual digital advertisements at low speeds (below 5 mph). In another implementation, a 12 v power linear actuator assembly 101-3j may be coupled to the gas strut 101-3k to automatically lift the upper display panel rack 101-7 via a rack remote control operated by the ETow-Bike operator.

Figure 28:
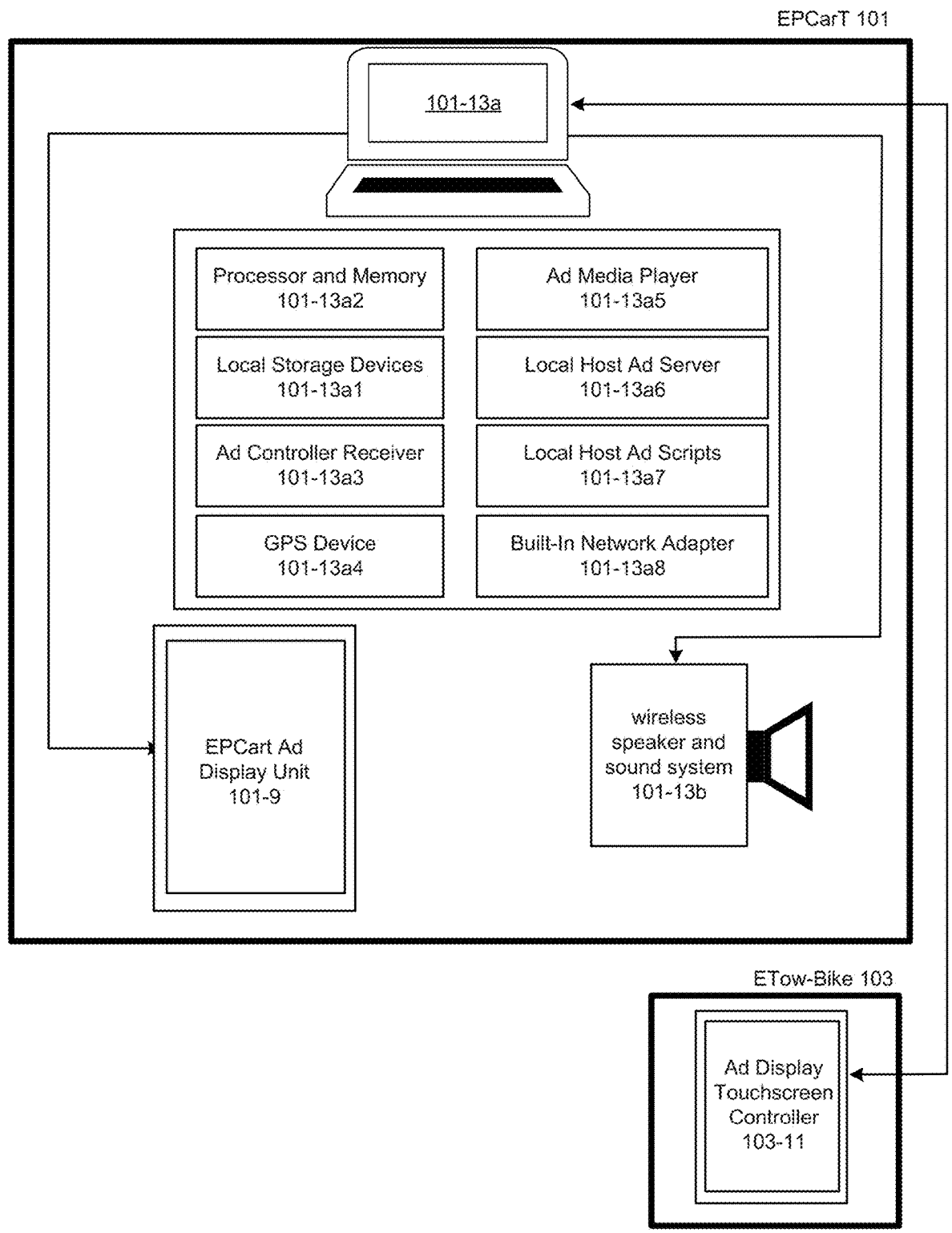
FIG. 28 illustrates a system overview of the EPCarT Ad Server, according to an embodiment.

FIG. 28 illustrates a system overview of the EPCarT Ad Server 101-13a, according to an embodiment. The EPCarT Ad Server 101-13a includes one or more Local Storage Devices 101-13a1, a Processor and Memory 101-13a2, an Ad Controller Receiver 101-13a3, a GPS Device 101-13a4, an Ad Media Player 101-13a5, a Local Host Ad Server 101-13a6, Local Host Ad Scripts 101-13a7, and a Built-in Network Adapter 101-13a8 for wireless or wired network access. All digital advertisements are in the form of digital media advertisement data (video, images, text, and/or audio). In addition, the digital media advertisement data may be stored in an Ad File (or Ad Playlist File) containing digital media advertisement data from multiple merchants. In operation, the Ad File may be loaded into the local storage device 101-13a1 of the EPCarT Ad Server 101-13a via an external flash drive or downloaded from the remote EPCarT Base Station 105. The Ad File may be processed and executed by the EPCarT Ad Server 101-13a via the processor 101-13a2, and subsequently played on the EPCarT Ad Display Unit 101-9 by the Ad Media Player 101-13a5. The Ad Media Player 101-13a5 may execute instructions from the Ad File which contains a timed sequence of the digital media advertisement data in a predetermined and sequential order to be displayed in an Ad Space Window on the EPCarT Ad Display Unit 101-9. The Ad Media Player 101-13a5 may also execute dynamic media content in the Ad Space Window either at the same time as the fixed digital advertisement content or at separate times. All dynamic media content transmitted to the Ad Media Player 101-13a5 are generated by the local host Ad script 101-13a7 and processed and distributed by the local host Ad server 101-13a6 when requested by the Ad Media Player 101-13a5. The dynamic media content may include live local weather, news, sports, event, and financial data from the third party data service providers 107 via the Built-in Network Adapter 101-13a8. The dynamic media content received from the third party data service providers 107 may be based on GPS Coordinates acquired by the GPS device 101-13a4 or a predetermined and fixed GPS coordinates defined by the remote EPCarT Base Station 105. If the Ad File requires an audio device for a voice-based advertisement, the EPCarT Ad Server 101-13a may transmit and play the voice-based advertisement to the wireless speaker and sound system 101-13b. the EPCarT Ad Server 101-13a and displayed on the EPCarT Ad Display Unit 101-9. The digital advertisements displayed on the EPCarT Ad Display Unit 101-9 may also be simultaneously displayed and controlled on the Ad Display and Touchscreen Controller 103-11 on the ETow-Bike 103 via the video connector 101-17c coupling the Ad Display and Touchscreen Controller 103-11 with the EPCarT Ad Server 101-13a. Playback and monitoring of the digital advertisements displayed on both display monitors (101-9 and 103-11) may be controlled at the dash control panel 103-4 of ETow-Bike 103 through the Ad Display and Touchscreen Controller 103-11. In another implementation, playback of the digital advertisements may be controlled by a Remote Ad Transmitter (not shown), wirelessly transmitting playback control signals to the Ad Controller Receiver 101-13a3 to pause, stop, forward or rewind the digital advertisement displayed on the EPCarT Ad Display Unit 101-9. In practice, the ETow-Bike operator has the direct video feed of digital advertisements displayed at Ad Display and Touchscreen Controller 103-11 on the dash control panel 103-4 to monitor Ad for proper display and content. The term Script used through this document refers to any general-purpose scripting or programming language that is suited for web, server hosting, or mobile APP based development.

Figure 29:
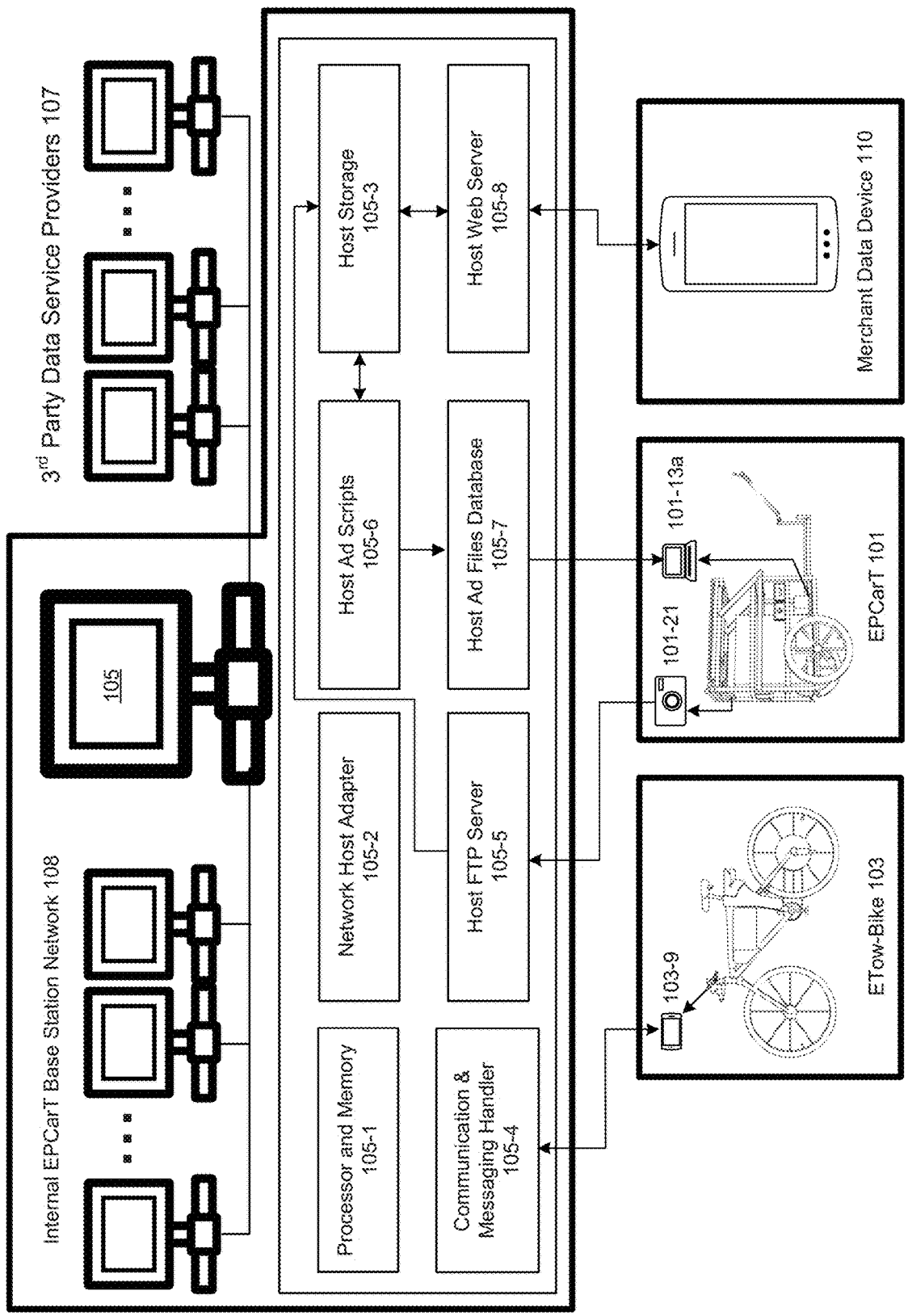
FIG. 29 illustrates a system overview of the Remote EPCarT Base Station, according to an embodiment.

FIG. 29 illustrates a system overview of the Remote EPCarT Base Station 105, according to an embodiment. The Remote EPCarT Base Station 105 includes a server which processes and handles all incoming and outgoing data requests, data transmissions, and messaging from the Etow-Bike 103, the EPCarT 101, Merchant Data Devices 110, the third party data service providers 107, as well as other local area network servers coupled to an internal EPCarT Base Station Network 108. The server of the Remote EPCarT Base Station 105 may include hardware components such as a network processor and memory 105-1, a network host adapter 105-2, and network host storage 105-3 for processing and handling all incoming and outgoing data. The server of the Remote EPCarT Base Station 105 may also include other operating components such as a Communication and Messaging Handler 105-4, a Host FTP Server 105-5, Host Ad Scripts 105-6, Host Ad Files 105-7, a Host Web Server 105-8. The processing and handling of all incoming and outgoing data provided by the Remote EPCarT Base Station 105 are event-based depending on which source generates or triggers the event. These sources triggering an event may include devices on the Etow-Bike 103, devices on the EPCarT 101, or Merchant Data Devices 110. For example, if the source is from the onboard dash computer 103-9 on the Etow-Bike 103, then a communication event between the communication and messaging handler 105-4 in the Remote EPCarT Base Station 105 may be triggered, resulting in transmitting and receiving Etow-Bike messaging data between the Remote EPCarT Base Station 105 and the onboard dash computer 103-9 on the Etow-Bike 103. If the source is from the EPCarT rear facing camera and GPS device 101-21, then an upload data event may be triggered, resulting in transferring captured digital images and GPS location data (i.e. GPS Image Tagging Data or Geotagging Data) from the EPCarT rear facing camera and GPS device 101-21 to the Host FTP Server 101-13a5 of the Remote EPCarT Base Station 105. If the source is from the EPCarT Ad Server 101-13a, then an Ad Request event may be triggered, resulting in the transmission of Ad Files from the Host Ad Files Database to the EPCarT Ad Server 101-13a. If the source is from the Merchant Data Device 110 via a request or submission made through the Host Web Server 105-8, then a merchant script event may be triggered, resulting in the transmitting and receiving of merchant related data to and from the Merchant Data Device 110. The Merchant Data Device 110 may include any computing device having a display screen and input device such as a mobile device, a smartphone, a computer, or a tablet.

Figure 30:
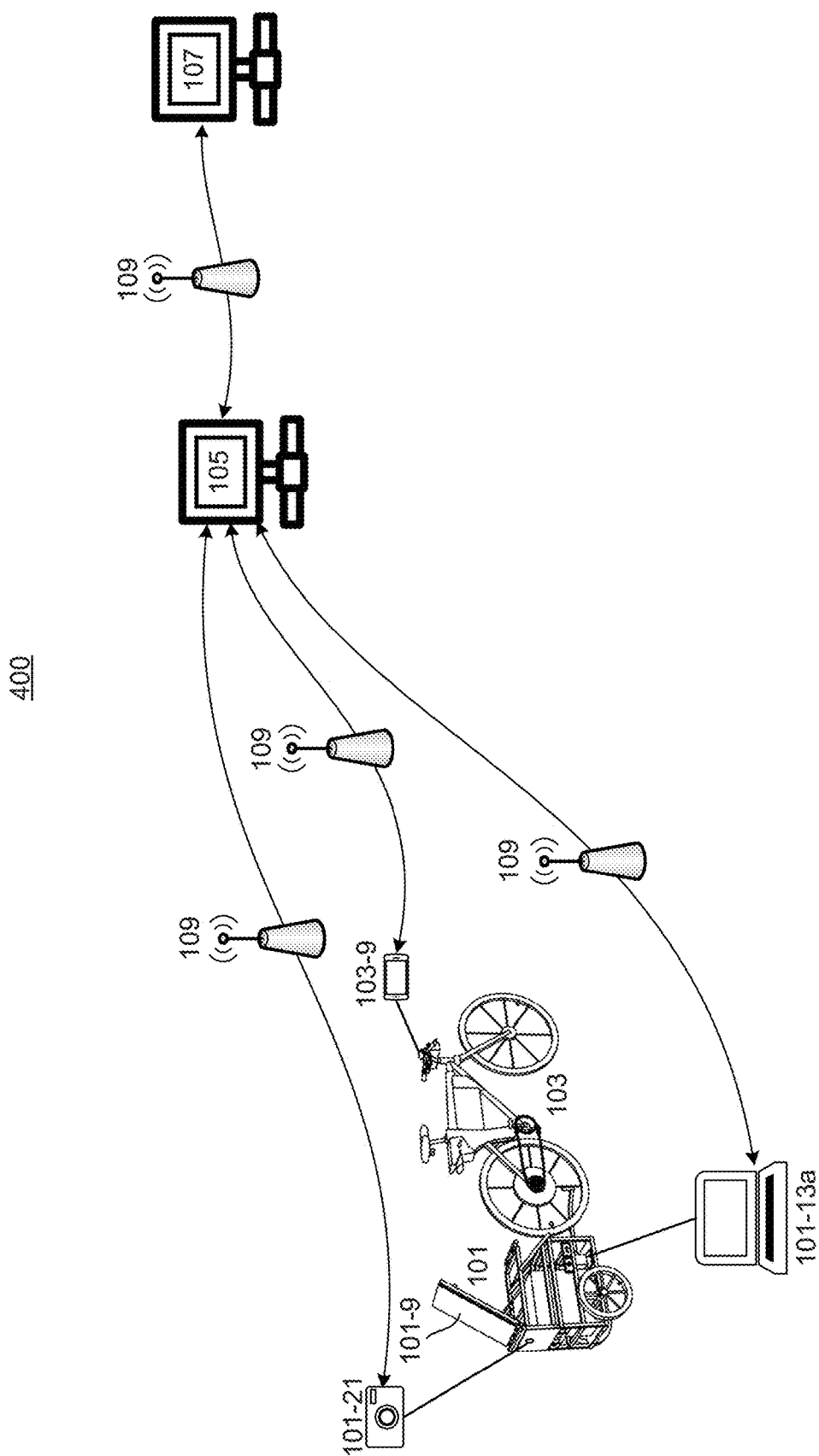
FIG. 30 illustrates a live update immersion digital advertising system, according to an embodiment.

FIG. 30 illustrates a live update immersion digital advertising system 400, according to an embodiment. In the live update system 400, a Merchant's Ad File data transmitted by the remote EPCarT Base Station 105 may be directly received by the EPCarT Ad Server 101-13a on the EPCarT 101 in real-time via the wireless network 109. The Merchant's Ad File data may include periodic updates in real-time based on changes made to the Ad File. The changes may include live updates, deletions or additions to the images or text contained within the Ad File. All live updates to the Merchant's Ad File data are immediately played by the Ad Media Player 101-13a5 and displayed on the EPCarT Ad Display Unit 101-9 once it is received by the EPCarT Ad Server 101-13*a*. In addition, status messages may be transmitted by the ETow-Bike operator via the onboard dash computer 103-9 to the remote EPCarT Base Station 105 through the wireless network 109 while special Ad instructions may be sent by the remote EPCarT Base Station 105 to the ETow-Bike operator via the onboard dash computer 103-9 through the wireless network 109. The status messages transmitted by the ETow-Bike operator may include messages such as 1) system glitches, 2) operator activity events (e.g., active, in-route, pause, lunch, breaks, urgent pit stops), 3) fatal system errors (e.g., flat tire, damaged equipment), 4) request for help, 5) delays, 5) advertisement issues, or 7) other messages pertaining to events occurring along the path ridden by the ETow-Bike operator. The special Ad instructions to the ETow-Bike operator may include messages such as 1) verifying equipment setup and a sound check on the wireless speaker and sound system 101-13*b*, 2) performing a physical observation and verification of the Ad File shown on the EPCarT Ad Display Unit 101-9, 3) changing a route, or 4) stopping at certain locations. Also, in the live update system 400, geotagging data from the EPCarT rear facing camera and GPS device 101-21 may be transmitted to the remote EPCarT Base Station 105 in real-time via the wireless network 109. In addition, the dynamic media content played in the Ad Space Window of the EPCarT Ad Display Unit 101-9 may be updated in real-time via live updates made by the remote EPCarT Base Station 105 from acquired content data provided by the GPS coordinate data from the EPCarT Ad Server 101-13*a* and by the third party data service providers 107 via the wireless network 109. In the live update system 400, the wireless network 109 is needed in order to continuously communicate data between the remote EPCarT Base Station 105, the ETow-Bike operator via the onboard dash computer 103-9, and the EPCarT Ad Server 101-13*a*, and continuously providing live data to the EPCarT Ad Server 101-13*a* via the third party data service providers 107. Conversely, the EPCarT Ad Server 101-13*a* may also communicate and transmit EPCarT System ID data to the remote EPCarT Base Station 105 including, EPCarT ID number, EPCarT System Version, and EPCarT System Type. The EPCarT System Types may include a 1) Basic System (Tier 1 having minimal onboard system and shorter operating range—under 20 miles); 2) Intermediate System (Tier 2 having standard onboard system with midlevel range—under 40 miles); and 3) Advanced System (Tier 3 advance onboard system with unlimited range)

Advantages in the live update system 400 include 1) Live Ad updates to all Ad data contents displayed on the EPCarT Ad Display Unit 101-9; 2) ETow-Bike operator is not involved loading the Ad File to the EPCarT Ad Server 101-13*a*. Conversely, disadvantages in the live update system 400 may include 1) Slower Ad File loading, especially for extremely large Ad Files; 2) Highly susceptible to poor wireless connection depending on location.

Figure 31:
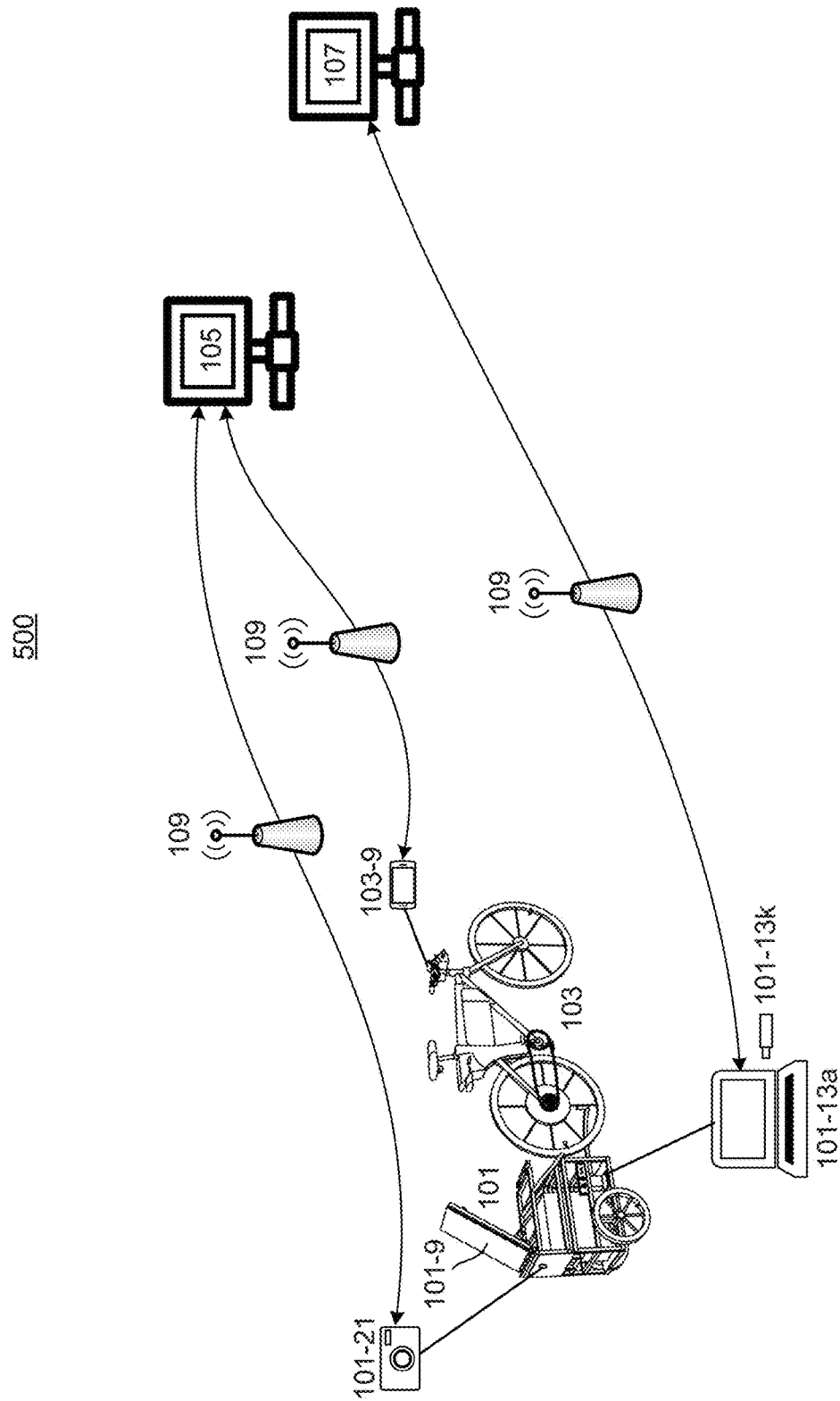
FIG. 31 illustrates a first fixed Ad File immersion digital advertising system, according to an embodiment.

FIG. 31 illustrates a first fixed Ad File immersion digital advertising system 500, according to an embodiment. The first fixed Ad File immersion digital advertising system 500 is identical to the live update immersion digital advertising system 400 except for these two differences: 1) The Merchant's Ad File data is loaded manually onto the EPCarT Ad Server 101-13*a* by the ETow-Bike operator via a media storage device 101-13*k* (e.g., media card, memory stick, USB Drive, flash drive); and 2) the dynamic media content played in the Ad Space Window of the EPCarT Ad Display Unit 101-9 is updated in real-time through data requests made by the EPCarT Ad Display Unit 101-9 to the third party data service providers 107 via the wireless network 109. Advantages in the first fixed Ad File immersion digital advertising system 500 include 1) faster Ad File loading and playing onto the EPCarT Ad Display Unit 101-9 since the Ad File is local and does not need to be wirelessly downloaded from the remote EPCarT Base Station 105; 2) the dynamic media content is directly acquired by EPCarT Ad Server 101-13*a* from the third party data service providers 107 requiring less processing time to generate the dynamic media content; Conversely, disadvantages in the system 500 may include 1) Does not support live Ad File updates; and 2) ETow-Bike operator must acquire the Ad Files from the remote EPCarT Base Station 105 and then physically download the Ad Files onto the EPCarT Ad Server 101-13*a*.

Figure 32:
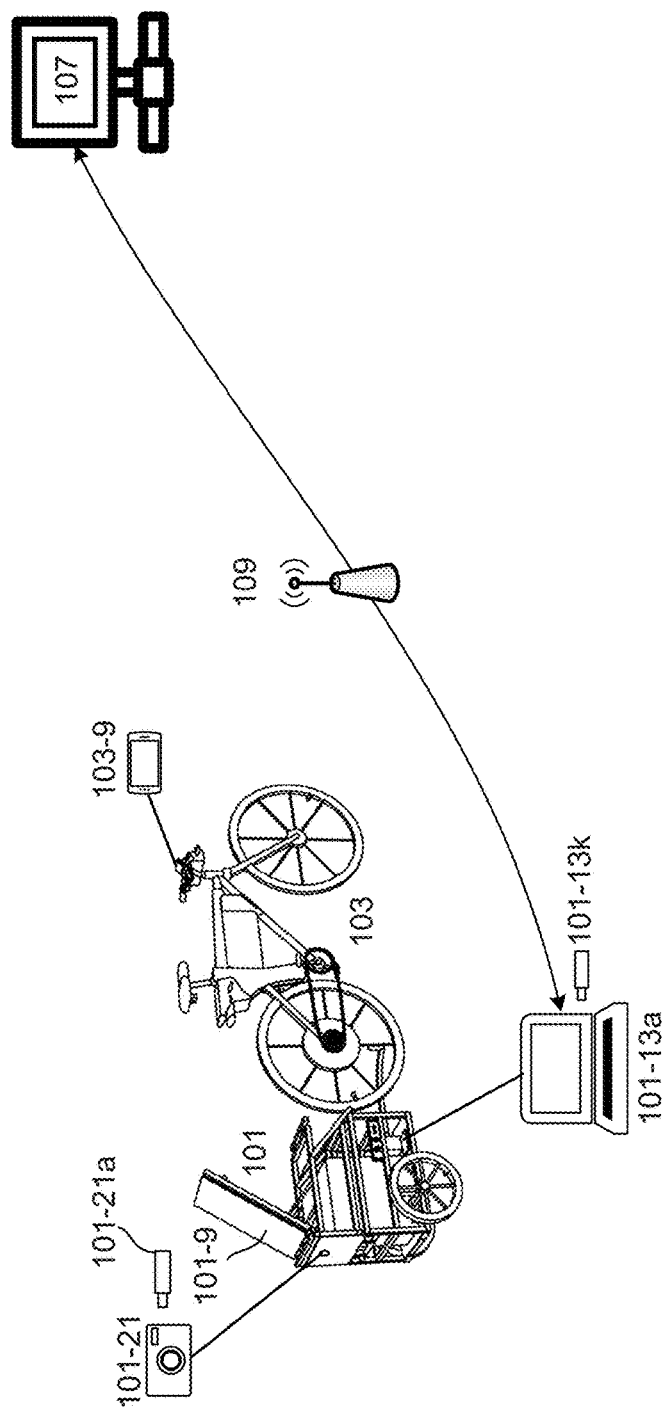
FIG. 32 illustrates a second fixed Ad File immersion digital advertising system, according to an embodiment.

FIG. 32 illustrates a second fixed Ad File immersion digital advertising system 600, according to an embodiment. The remote EPCarT Base Station 105 in the second fixed Ad File immersion digital advertising system 600 is completed removed from the system, having the EPCarT Ad Server 101-13*a* wirelessly communicating with the third party data service providers 107 over the wireless network 109. With the remote EPCarT Base Station 105 unavailable in this embodiment, the Merchant's Ad File data is loaded manually onto the EPCarT Ad Server 101-13*a* by the ETow-Bike operator via a first media storage device 101-13*k* (e.g., media card, memory stick, USB Drive, flash drive); 2) captured images and GPS location data (geotagging data) from the EPCarT rear facing camera and GPS device 101-21 are stored onto a second media storage device 101-21*a* (e.g., media card, memory stick, USB Drive, flash drive); and 3) the dynamic media content played in the Ad Space Window of the EPCarT Ad Display Unit 101-9 is updated in real-time through data requests made by the EPCarT Ad Display Unit 101-9 to the third party data service providers 107 via the wireless network 109. Data saved and stored onto first and second media storage devices (101-13*k* and 101-21*a*) are uploaded to the remote EPCarT Base Station 105 at a later time when the system is inactive (i.e., closing time, and after hours).

Figure 33:
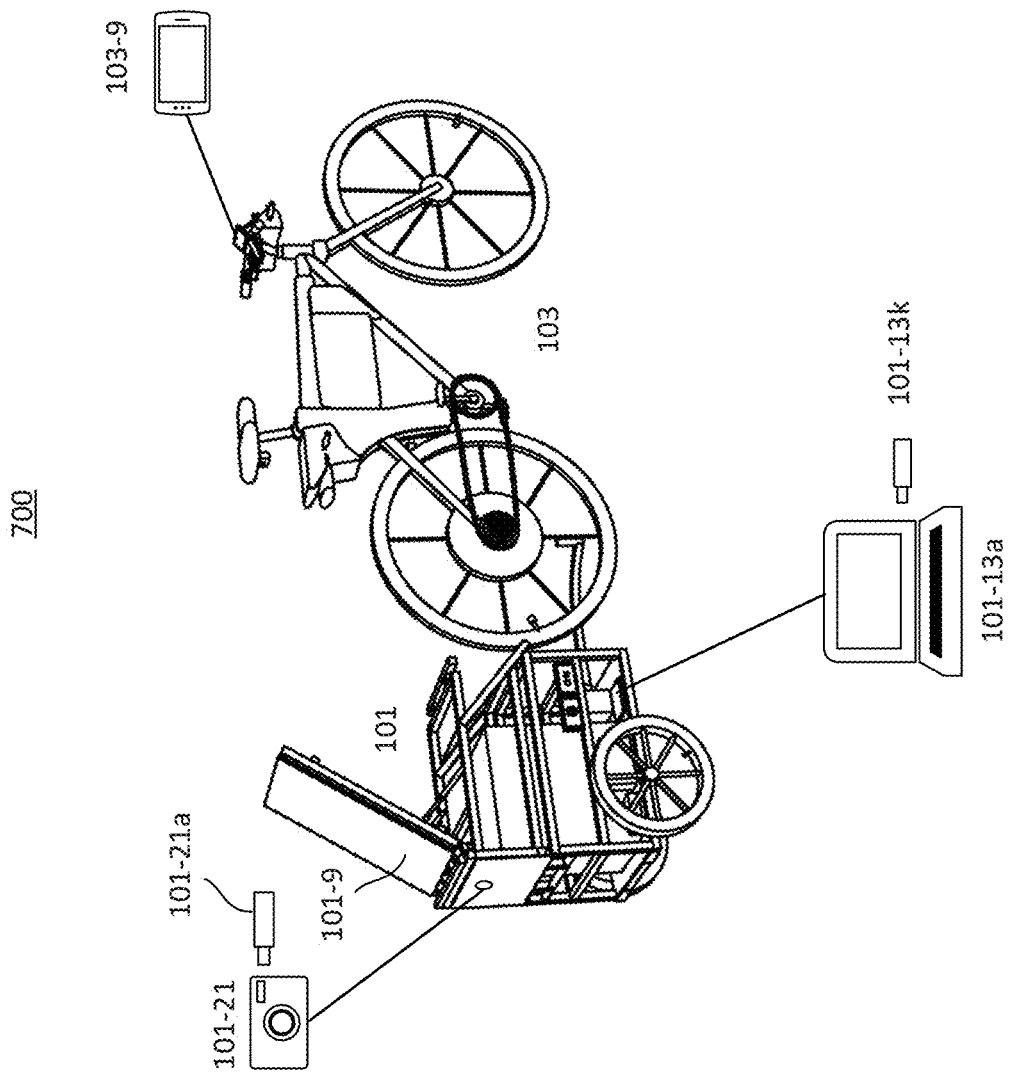
FIG. 33 illustrates stand-alone immersion digital advertising system, according to an embodiment.

FIG. 33 illustrates stand-alone immersion digital advertising system 700, according to an embodiment. In the stand-alone immersion digital advertising system 700 no wireless connections are provided in this system, having all captured geotagging data and Ad Files stored or accessed directly through the first and second media storage device (101-13*k* and 101-21*a*), respectively. In addition, without any wireless connection and access to the third party data service providers 107, the dynamic media content is not available and no longer played in the Ad Space Window of the EPCarT Ad Display Unit 101-9. Since the system 700 is completely stand-alone, all captured images and GPS location data must be eventually stored onto the remote EPCarT Base Station 105 at a later time (after operating hours) while the Merchant's Ad Files may be downloaded and stored onto the first media storage device 101-13*k* for later upload onto the EPCarT Ad Server 101-13*a* prior to operating and display Ad Files on the EPCarT 101.

Figure 34:
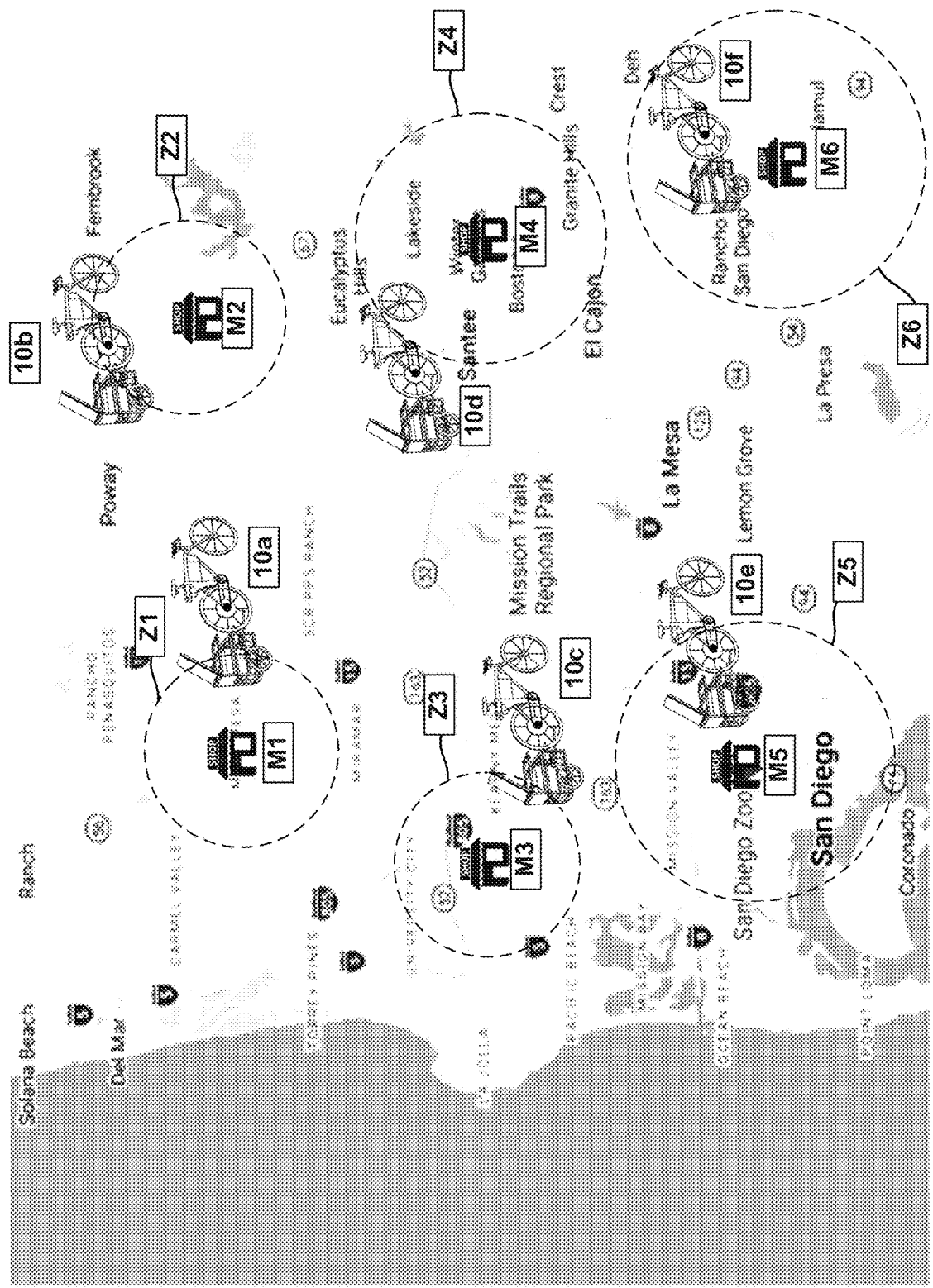
FIG. 34 illustrates an example of Local Merchant Service Zones covered and serviced by multiple mobile digital advertising units, according to an embodiment.

FIG. 34 illustrates an example of Local Merchant Service Zones covered and serviced by multiple mobile digital advertising units (10*a*-10*f*), according to an embodiment. The Local Merchant Service Zones may include different Merchant locations (i.e., physical addresses) designated by (M1-M6) having an approximate radial zone area (Z1-Z6) around each Merchant location. The network mobile digital advertising units (10*a*-10*f*), having multiple EPCarTs (101) and ETow-Bikes (103), are each designated to service and operate within their assigned riding zone (Z1-Z6). Active Ad zones may include parks, popular attraction sites, harbors, shops, golf areas, schools, entertainment centers, shopping malls, public resorts, recreational facilities, restaurants, or any other places where people may publically gather. Zones only include safe riding locations or "safe areas", excluding major highways, freeways or roadways where active moving vehicles are present.

Figure 35:
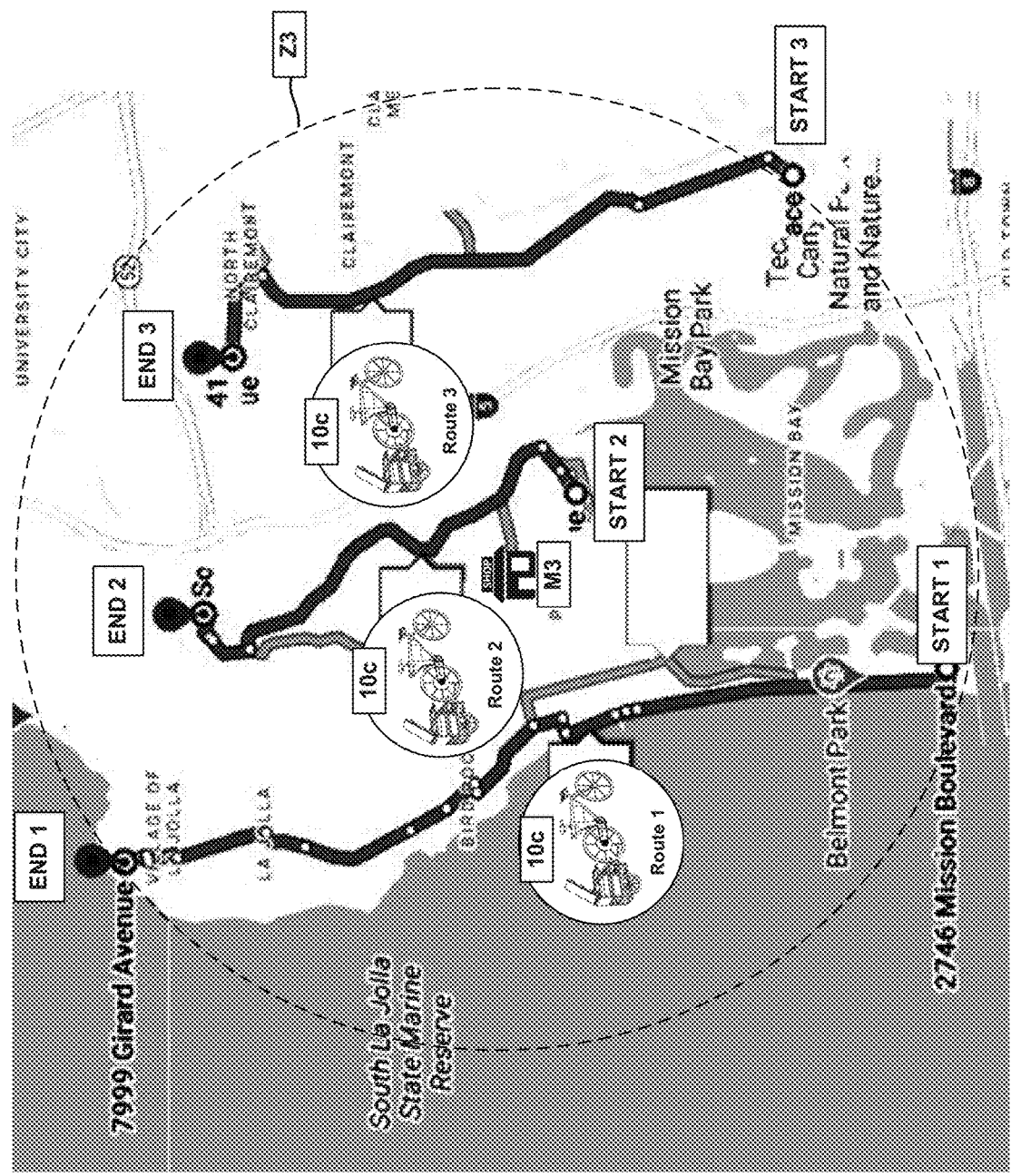
FIG. 35 illustrates an example of Pedestrian Ad Routes covered and serviced by an individual mobile digital advertising unit, in accordance to an embodiment.

FIG. 35 illustrates an example of predetermined Pedestrian Ad Routes covered and serviced by an individual mobile digital advertising unit, in accordance to an embodiment. In this example, three routes (Route 1, Route 2, and Route 3) are designated as predetermined pedestrian Ad routes within Zone Z3 of Merchant location M3. Mobile digital advertising system 10c may be assigned and designated to traverse either one or more of the three routes (Route 1, Route 2, and Route 3), depending on route instructions transmitted to the Etow-Bike operator by the remote EPCarT Base Station 105. The predetermined Pedestrian Ad routes may include walkways, sidewalks, bike paths, hiking trails, boardwalks or any other public routes, paths, or access shared by people and bicycles. Pedestrian Ad routes exclude highways, freeways, roadways, or any other routes that are primarily designated as active travel lanes for moving cars, trucks, or other vehicles.

Figure 36:
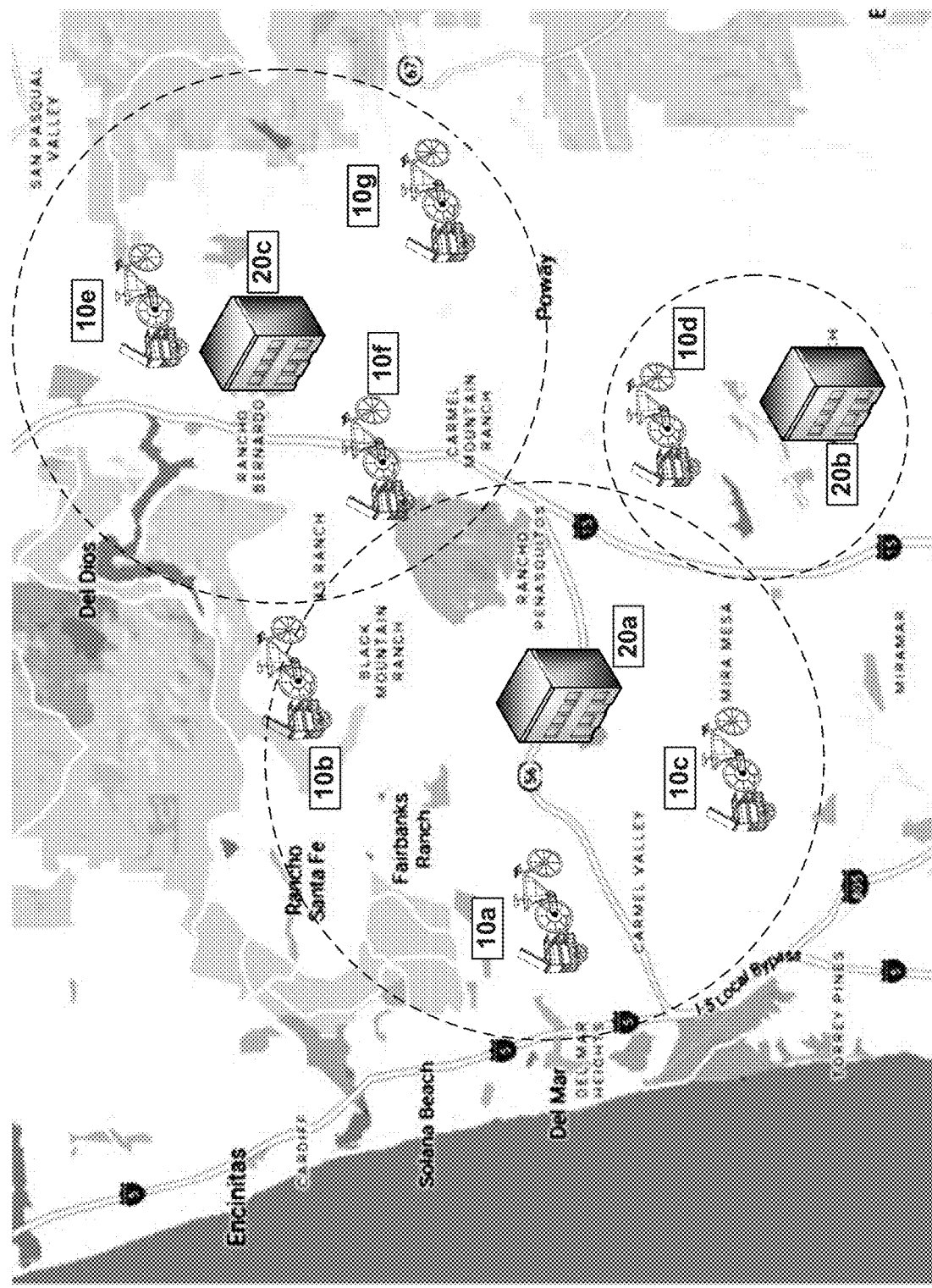
FIG. 36 illustrates an example of an EPCarT Depot for servicing and housing the mobile digital advertising unit, according to an embodiment.

FIG. 36 illustrates an example of an EPCarT Depot for servicing and housing the mobile digital advertising unit, according to an embodiment. The EPCarT Depot may provide storage, maintenance, repair, data uploads, data maintenance, equipment upgrades to the mobile digital advertising units (10a-10g). In addition, there may be multiple EPCarT Depots (20a-20c) at different locations. In operation, a group of mobile digital advertising units may be assigned to a particular EPCarT Depot depending on the location of their assigned riding zone.

Figure 37:
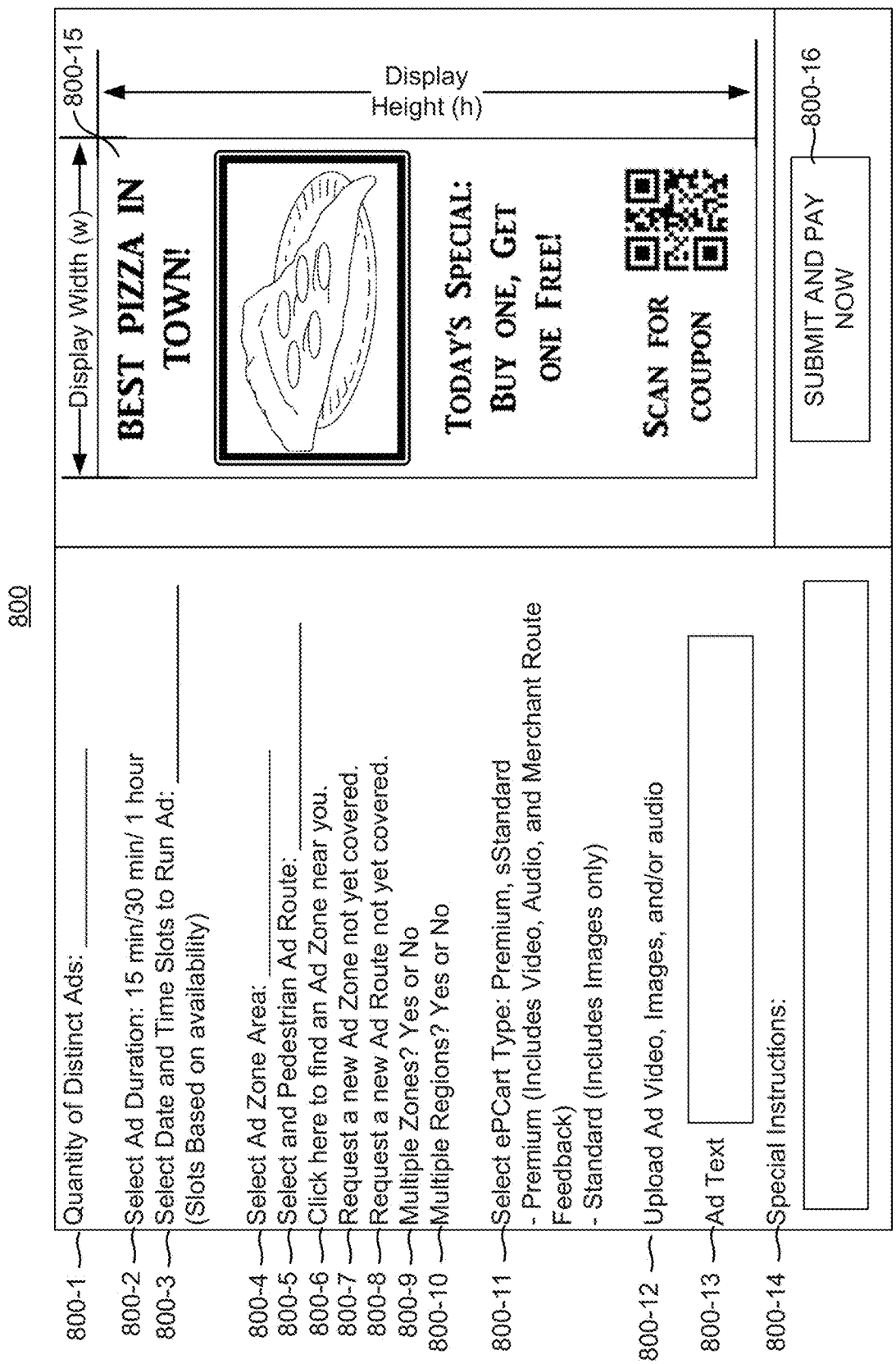
FIG. 37 illustrates a Local Merchant Ad Creation and Data Input Screen via a Merchant User Web Interface, according to an embodiment.

FIG. 37 illustrates a Local Merchant Ad Creation and Data Input Screen via a Merchant User Interface 800, according to an embodiment. The Merchant User Interface 800 is a dynamic and scripted web page hosted and accessed on the remote EPCarT Base Station 105 by Merchants either by the wireless 109 or wired 111 network connections. The Merchant User Interface 800 provides the merchant a merchant data input collection web page allowing merchants to create one or more digital Ad Files to run on the mobile digital advertising unit 10. In addition, merchants may access a Merchant User APP Interface designed for mobile devices (e.g., smartphones and tablets) having similar data collection as in the Merchant User Interface 800. Data collection as input into the Merchant User Interface 800 include, for example, 1) a Quantity of Distinct Ads 800-1; 2) Ad Duration: 15 min/30 min/1 hour 800-2; 3) Ad Date and Time Slots (Slots Based on availability) 800-3; 4) Ad Zone Area 800-4; 5) Pedestrian Ad Route 800-5; 6) Option to find an Ad Zone near you 800-6; 7) a request for a new Ad Zone not yet covered 800-7; 8) a request for a new Ad Route not yet covered 800-8; 9) Number of Zones to cover 800-9; 10) Number of routes selected 800-10; 11) EPCarT Type: Premium, Standard—Premium (Includes Video, Audio, and Merchant Route Feedback); Standard (Includes Images only) 800-11; 12) Digital Ad Video, Images, and/or audio to upload 800-12; 13) Ad Text input box; 14) Special instructions input box (e.g., special instruction to enable and/or verify audio system for audio based advertisements); 15) Ad Preview in an Ad Space Window 800-15 (Portrait mode having an aspect ratio of 9:16 (1:1.778); 16) Payment for Ad Order 800-16. Referring again to FIG. 29, Host Ad Scripts (101-13a6) are stored and processed at the remote EPCarT Base Station 105 having specific Ad script files for handling the Merchant User Interface 800. These Ad script files may include multiple host executable script files that perform data transactions between the remote EPCarT Base Station 105 and the merchants as shown in Table 2.0 below.

TABLE 2.0

Example Host Ad Scripts (101-13a6)

| Host Ad Script Name | Description |
| --- | --- |
| Merchant_Registration.script | Script for signing up new merchants to the immersion digital advertising system; |
| Ad_InputForm.script | Script for acquiring Ad data from merchant including Ad digital media content (images, video and text), Ad duration, time slots, zones, routes, special instructions, etc.); |
| Ad_Preview.script | Script for previewing and verifying Ad File in the Ad Space Window 800-15 (9:16 ratio); |
| Ad_Review.script | Script for verifying Ad File content for content accuracy and compliance to rules including prohibited graphical and text items. Merchant Ad information status; |
| Ad_Payment.script | Script for payment processing from merchant; |
| Ad_Status_Viewer.script | Script for visually displaying the current status of the Merchant Ad including route feedback data by merchant (Pending, In Progress, Completed, Unavailable, Cancelled, Delayed, etc.) (private - only the merchant owning the Ad can view this page); |
| Ad_Route_Map.script | Script for generating pedestrian Ad route map data to merchant; (private - only the merchant owning the Ad can view this page); |
| QR_Tracking.script | Script for processing the QR Code embedded data and generating a QR Code Ad Effectiveness rating displayed in the Ad Information Window; |

Figure 38:
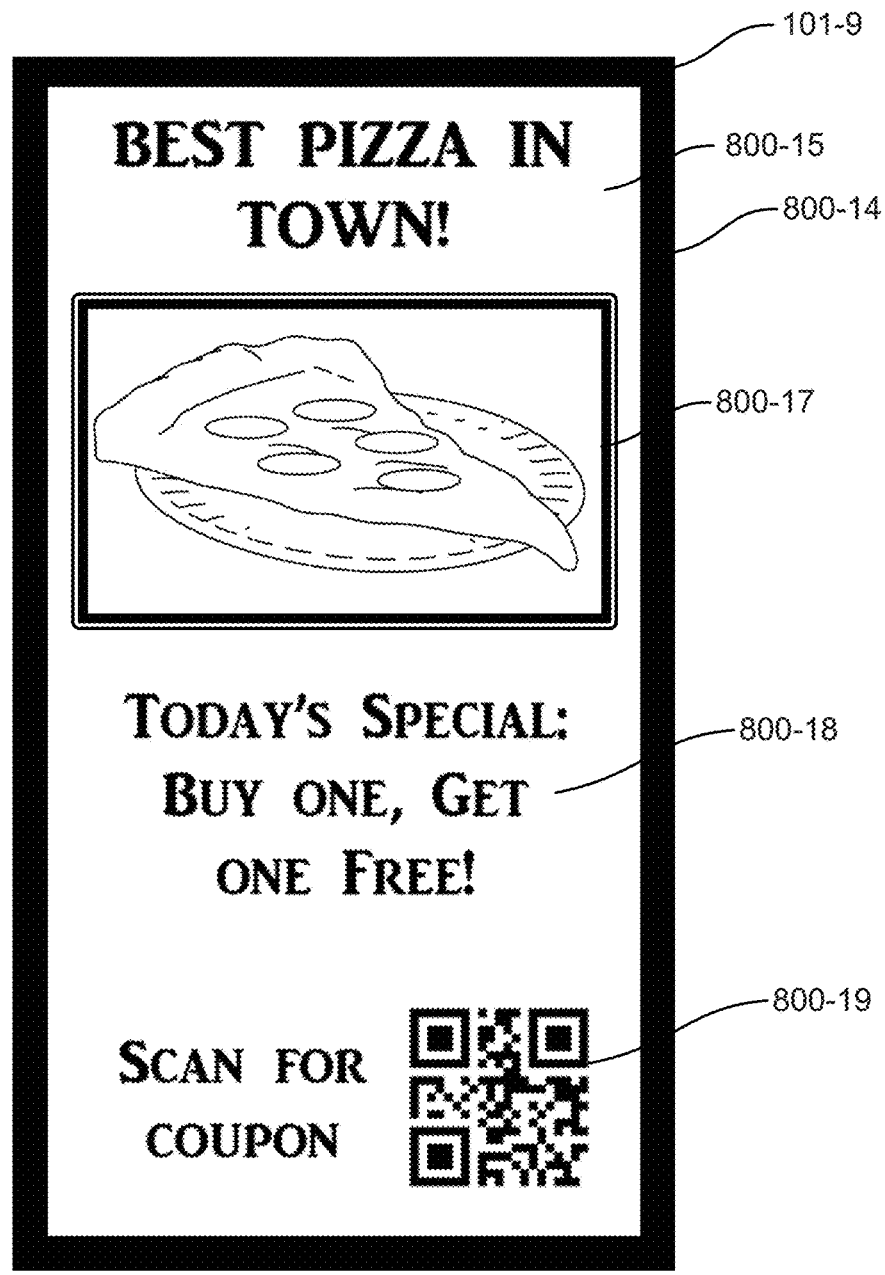
FIG. 38 illustrates an example of a Merchant Ad File played by the Ad Media Player and displayed in the Ad Space Window of the EPCarT Ad Display Unit, according to an embodiment.

FIG. 38 illustrates an example of a Merchant Ad File played by the Ad Media Player 101-13a5 and displayed in the Ad Space Window 800-15 of the EPCarT Ad Display Unit 101-9, according to an embodiment. The Merchant Ad File may include various digital media content such as an image or video 800-17, text 800-18, or even Quick Response Codes (QR Codes) 800-19. Multiple Merchant Ad Files may be played by the Ad Media Player 101-13a5 using a playlist of Ad Files to be played on the EPCarT Ad Display Unit 101-9 in a sequential or time-based order. The Merchant Ad File may include customized digital advertisement made by local merchants providing incentives which target nearby pedestrians traveling on the pedestrian Ad route to visit their store. Advertising incentives include making it easier for pedestrians to locate shops and specials by having real-time GPS location data showing a "You are Here" and footsteps to local merchant store displayed the EPCarT Ad Display Unit 101-9, and custom QR Code specials that pedestrian can scan directly from the EPCarT Ad Display Unit 101-9 and download daily specials from the Merchant Ad File displayed thereon.

Figure 39:
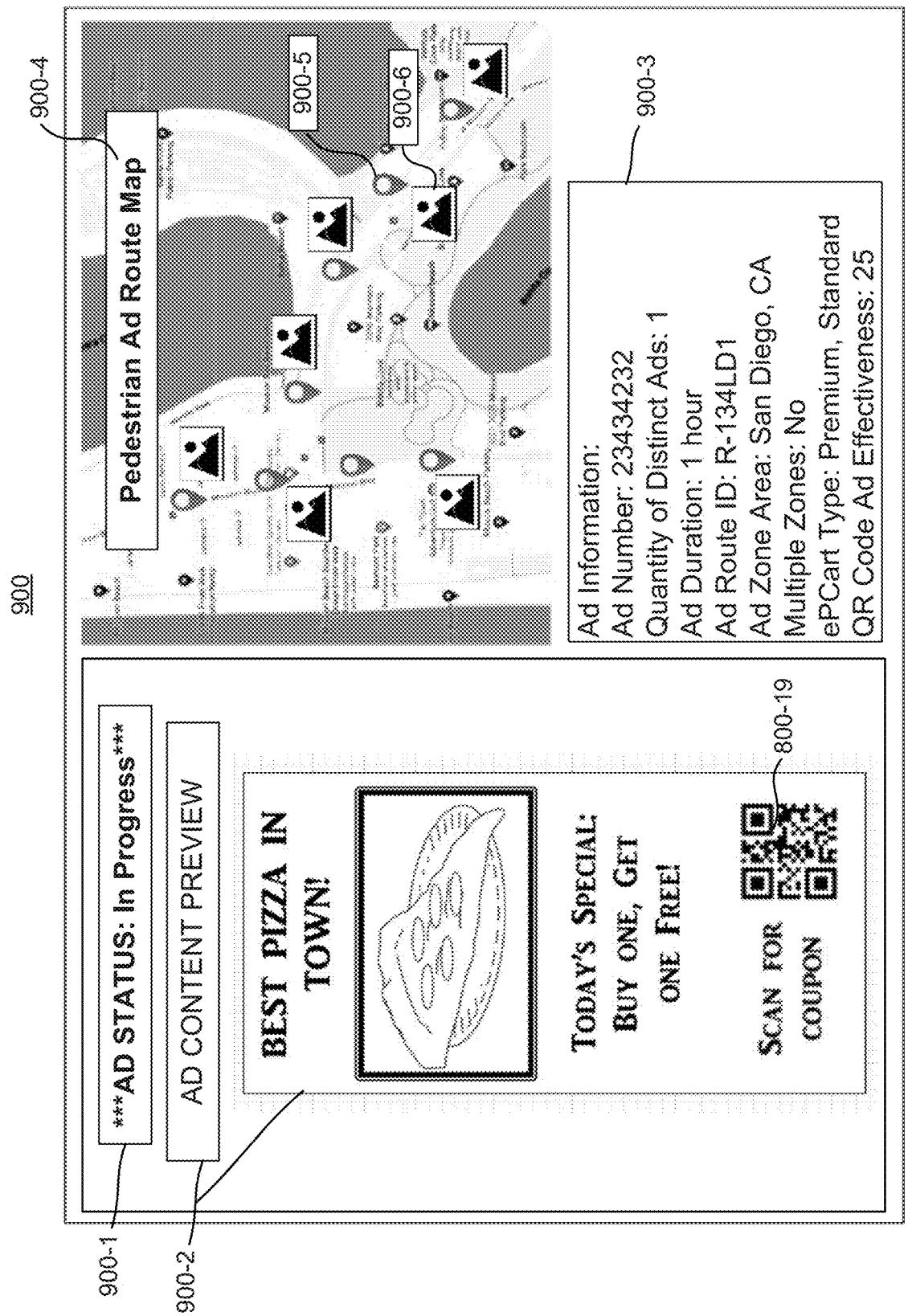
FIG. 39 illustrates an example of a private Merchant Ad Status Viewer Screen, according to an embodiment.

FIG. 39 illustrates an example of a private Merchant Ad Status Viewer Interface 900, according to an embodiment.

The Merchant Ad Status Viewer Interface 900 provides detail status information on the Ad File that was entered and submitted in the Merchant User Interface 800 by the merchant. Content displayed on the Merchant Ad Status Viewer Interface 900 may include 1) an Ad Status 900-1 of the submitted Ad File (e.g., Pending, In Progress, Completed, Unavailable, Cancelled, Delayed, etc.); 2) an Ad Content Preview window 900-2 for displaying the digital Ad video, images, and text of the submitted Ad File by the merchant in the Merchant User Interface 800; 3) an Ad Information Window 900-3 providing Ad reference numbers, Ad duration, pedestrian Ad routes and zones, and EPCarT selection type; and 4) an interactive Pedestrian Ad Route Map 900-4 showing selectable pin drop markers 900-5 and images icons 900-6 along a pedestrian Ad route selected the merchant. The script for generating and visually displaying the current status of the Merchant Ad including route feedback data by merchant is handled by the Ad_Status_Viewer.script (see Table 2.0) and executed by the remote EPCarT Base Station 105. Note, that content contained in the Merchant Ad Status Viewer Interface 900 is private and only visible and viewable to the merchant who is the owner of the Ad File which is accessible via a login and password. In addition, content contained in the Merchant Ad Status Viewer Interface 900 may be viewed either on the merchant's computer via a website hosted by the remote EPCarT Base Station 105 or a mobile device via a mobile App provided by a third party App store. In yet another implementation, the QR Codes 800-19 may be embedded with digital tracking data which is used to measure the effectiveness of the Merchant Ad File along the pedestrian Ad route. For example, for every person who sees and responds the Merchant Ad File displayed on the EPCarT Ad Display Unit 101-9 by scanning the QR Code 800-19 with their smartphone or mobile device, a hyperlink embedded in the QR Codes 800-19, including QR Code embedded data having a date and timestamp, a GPS location, and Merchant Ad ID number, is transmitted to the EPCarT Base Station 105 which stores the QR Code embedded data in a QR Code tracking database. The script for processing the QR Code embedded data and generating a QR Code Ad Effectiveness rating displayed in the Ad Information Window 900-3 is handled by the QR_Tracking.script (see Table 2.0) and executed by the remote EPCarT Base Station 105. The QR Code Ad Effectiveness rating may be based on the total QR Code scan count or the frequency of QR Code scans per unit time, providing the Merchant quantitative feedback of their Merchant Ad File along the pedestrian Ad route.

Figure 40:
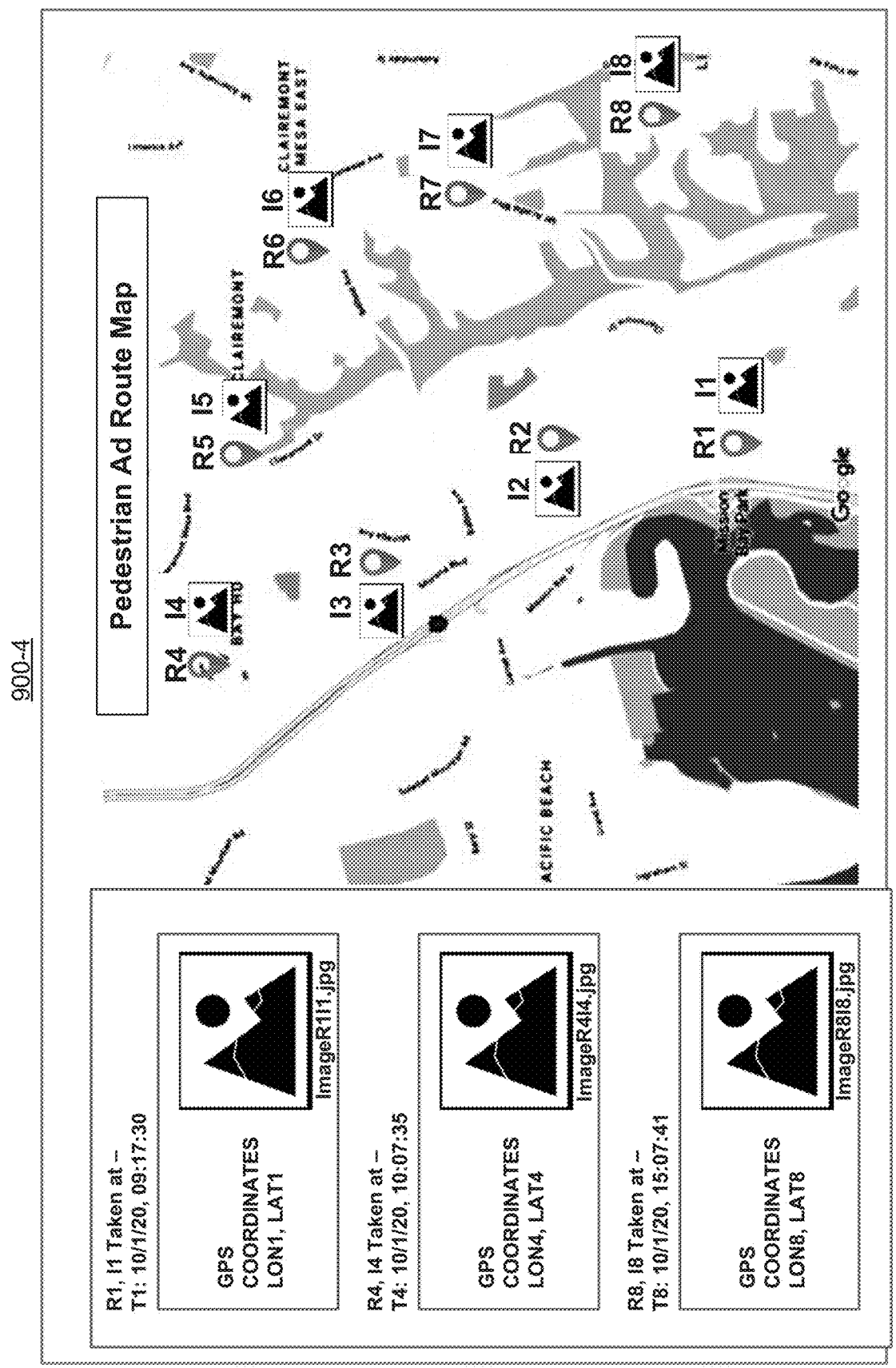
FIG. 40 illustrates an expanded view of the interactive Pedestrian Ad Route Map, according to an embodiment.

FIG. 40 illustrates an expanded view of the interactive Pedestrian Ad Route Map 900-4, according to an embodiment. Geotagging data captured by the EPCarT rear facing camera and GPS device 101-21 along the pedestrian Ad route on which the mobile digital advertising unit 10 has traveled is transmitted to the remote EPCarT Base Station 105 for processing and generating the interactive Pedestrian Ad Route Map 900-4. Geotagging data may include time sampled data of Route Points (Ri) and Image Data Points (Ii) taken over discrete time intervals, having discrete timestamps (Ti). Merchants may view a specific captured image (ImageRiTi) and their corresponding GPS location on the map (LONi, LATi) for a specific time interval (Ti) on the interactive Pedestrian Ad Route Map 900-4 by clicking on the Route Point (Ri) or Image Data Point (Ii) on the map 900-4. The script for generating and visually displaying the interactive Pedestrian Ad Route Map 900-4 may be handled by the Ad Route Map.script (see Table 2.0) which is executed by the remote EPCarT Base Station 105. Note, that content contained in the interactive Pedestrian Ad Route Map 900-4 is private and only visible and viewable to the merchant who is the owner of the Ad File which is accessible via a login and password. In another implementation, the remote EPCarT Base Station 105 may transmit a notification to the merchant if the mobile digital advertising unit 10 is within short distance (e.g., within ¼ mile of their shop), if the notification is requested by the merchant.

Figure 41:
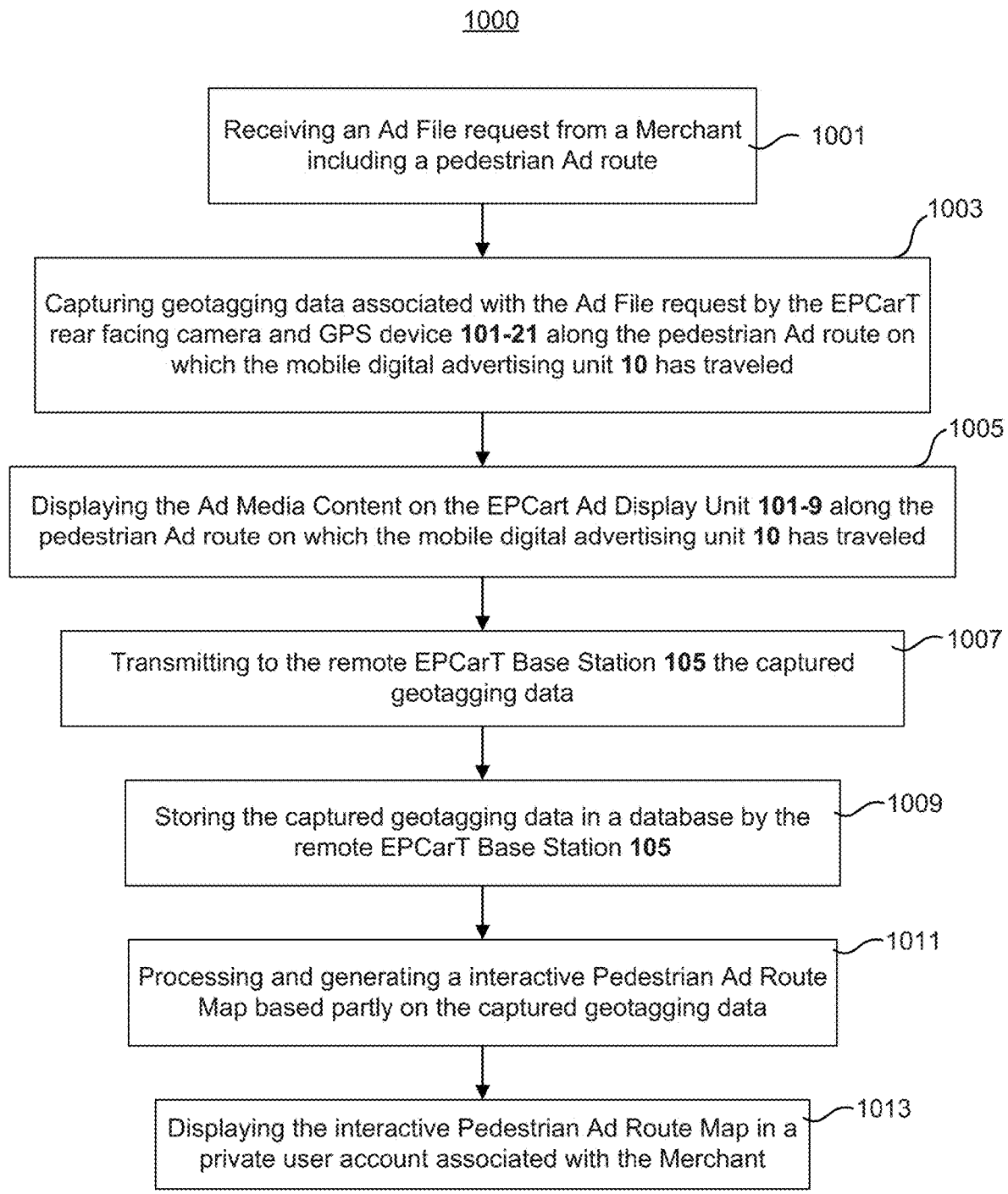
FIG. 41 illustrates a method of generating and displaying an interactive Pedestrian Ad Route Map for a merchant based on captured geotagging data, according to an embodiment.

FIG. 41 illustrates a method of generating and displaying an interactive Pedestrian Ad Route Map for a merchant based on captured geotagging data 1000, according to an embodiment. Process steps in the flowchart 1000 include 1) Receiving an Ad File request from a Merchant including a pedestrian Ad route and Ad Media Content 1001; 2) Capturing geotagging data associated with the Ad File request by the EPCarT rear facing camera and GPS device 101-21 along the pedestrian Ad route on which the mobile digital advertising unit 10 has traveled 1003; 3) Displaying the Ad Media Content on the EPCarT Ad Display Unit 101-9 along the pedestrian Ad route on which the mobile digital advertising unit 10 has traveled 1005; 4) Transmitting to the remote EPCarT Base Station 105 the captured geotagging data 1007; 5) Storing the captured geotagging data in a database by the remote EPCarT Base Station 105 1009; 6) Processing and generating a Pedestrian Ad Route Map based partly on the captured geotagging data 1011; and 7) Displaying the interactive Pedestrian Ad Route Map in a private user account associated with the Merchant 1013.

Other process data acquisition and communication scripts utilized by the mobile digital advertising unit 10 and the remote EPCarT Base Station 105 are provided in Table 3.0 below. The EPCarT rear facing camera and GPS device 101-21 may include timer settings to control time intervals for capturing geotagging data. The time interval capture settings in the EPCarT rear facing camera and GPS device 101-21 may be customized for high frequency capture rates (i.e., 1 frame/sec) to low frequency capture (1 frame/hour). In addition, the captured geotagging data is stored in the EPCarT rear facing camera and GPS device 101-21 and periodically uploaded to the Host FTP Server 105-5 of the remote EPCarT Base Station 105 at a scheduled time frequency (e.g., every 1 minute, every 5 minutes, once per hour, once per day, and so on). The EPCarT rear facing camera and GPS device 101-21 may include a script for handling automatic uploads from the EPCarT rear facing camera and GPS device 101-21 to the Host FTP Server 105-5 of the remote EPCarT Base Station 105 at the scheduled time frequency is defined in EPCarT_Data.script as provided in Table 3.0 below.

In the remote EPCarT Base Station 105, the Communication and Messaging Handler 105-4 performs all messaging and communication scripts for handling incoming and outgoing messaging between Base Station 105 and the dash computer 103-9 of the ETow-Bike 103 which includes the BaseStation_Msg.script and the eTowBikeOp_Msg.script as provided in Table 3.0 below.

TABLE 3.0

Geotagging Data Handling and Communication Scripts

| Host Ad Script Name | Description |
|---|---|
| EPCarT_Data.script | Script residing in the EPCarT rear facing camera and GPS device 101-21 for periodically processing and uploading captured images and geotags of "foot traffic" associated with each |

TABLE 3.0-continued

Geotagging Data Handling and Communication Scripts

| Host Ad Script Name | Description |
| --- | --- |
|  | local Merchant Ad to the the Host FTP Server 105-5 |
| BaseStation_Msg.script | Script for generating and transmitting messages from BaseStation to e-bike operator based on Merchant Ad conditions and requirements (Ad changes, Ad acquisitions (Network Download or Physical Flash Drive), Ad Routes, Ad Setup (enable audio for voice commercials)) via the Communication and Messaging Handler 105-4 |
| eTowBikeOp_Msg.script | Script for generating and receiving ebike status updates and messages from eBike operator (pause, alert, lunch break) via the Communication and Messaging Handler 105-4 |

Figure 42:
FIG. 42 illustrates the Ad Space Window and a Dynamic Content Window simultaneously played by the Ad Media Player and displayed on the EPCarT Ad Display Unit, according to an embodiment.

FIG. 42 illustrates the Ad Space Window 800-15 and a Dynamic Content Window 800-21 simultaneously played by the Ad Media Player 101-13a5 and displayed on the EPCarT Ad Display Unit 101-9, according to an embodiment. The Dynamic Content Window 800-21 may include live digital media content generated by the EPCarT Ad Server 101-13a by a DynamicContent.script file (see Table 4.0), receiving real-time data feeds from third party data service providers 107 via the wireless network 109 producing the live digital media content. Examples of live digital media content displayed in the Dynamic Content Window 800-21 may include embedded real-time weather, local news, sports, financial information, and news alerts. The real-time data feeds provided by the third party data service providers 107 may be in the form of an open standard file format, and data interchange format, such as JavaScript Object Notation (JSON) or Extensible Markup Language (XML), using human-readable text to store and transmit data objects having attribute-value pairs and array data types. The DynamicContent.script file imports the real-time data (JSON or XML formatted data) and subsequently builds media content from it which is used to generate the live digital media content that is ultimately displayed in the Dynamic Content Window 800-21.

TABLE 4.0

Dynamic Content Script

| Host Ad Script Name | Description |
| --- | --- |
| DynamicContent.script | Script in the EPCarT Ad Server 101-13a for generating live digital media content from real-time data feeds via the third party data service providers 107 over the wireless network 109. |

Figure 43:
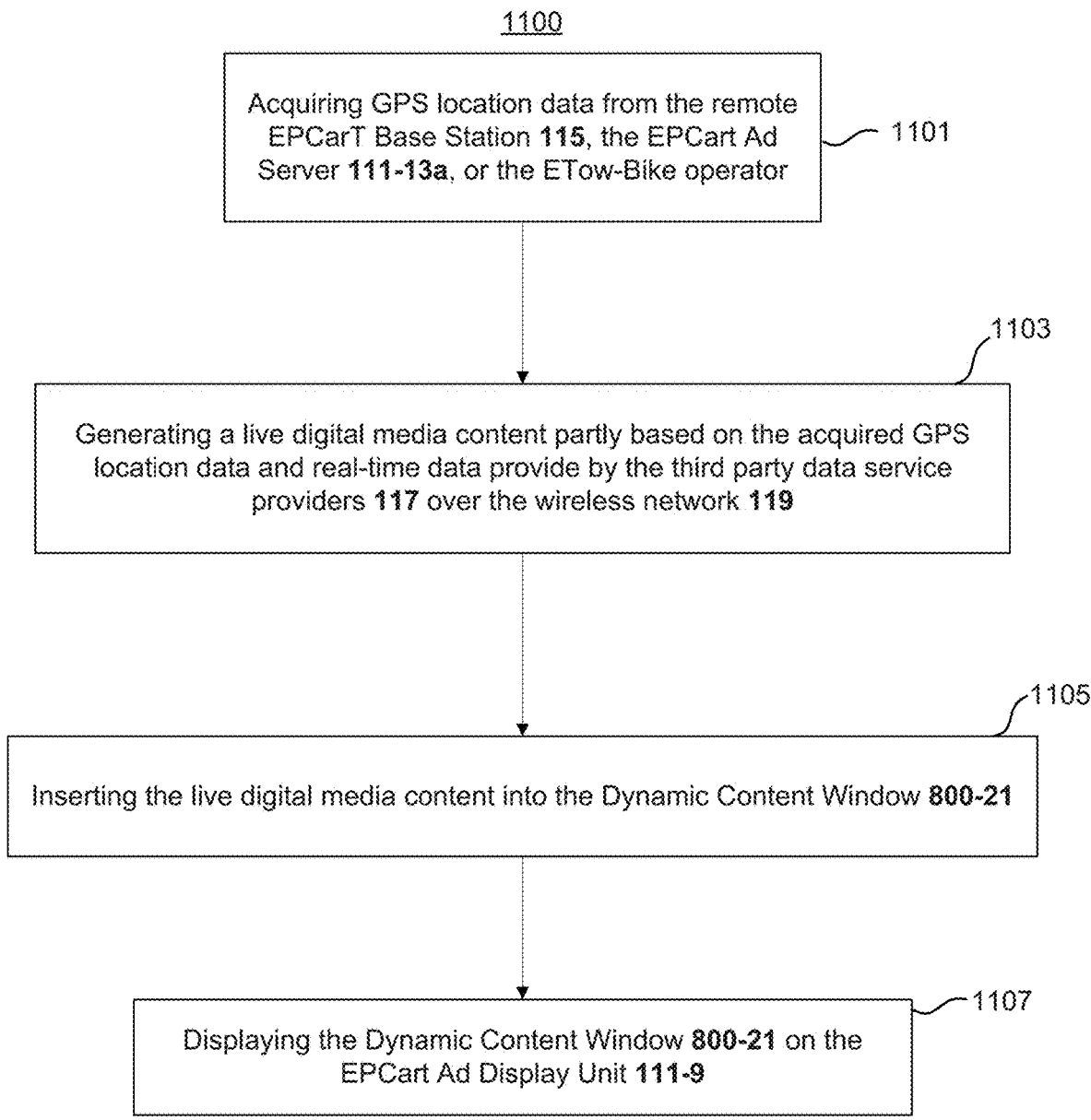
FIG. 43 illustrates a method of generating live digital media content in the Dynamic Content Window, according to an embodiment.

FIG. 43 illustrates a method of generating live digital media content in the Dynamic Content Window 1100, according to an embodiment. Process steps in the flowchart 1100 include 1) Acquiring GPS location data from the remote EPCarT Base Station 105, the EPCarT Ad Server 101-13a, or the ETow-Bike operator (Step 1101); 2) Generating a live digital media content partly based on the acquired GPS location data and real-time data provide by the third party data service providers 107 over the wireless network 109 (Step 1103); 3) Inserting the live digital media content into the Dynamic Content Window 800-21 (Step 1105); and 4) Displaying the Dynamic Content Window 800-21 on the EPCarT Ad Display Unit 101-9 (Step 1107).

Figure 44:
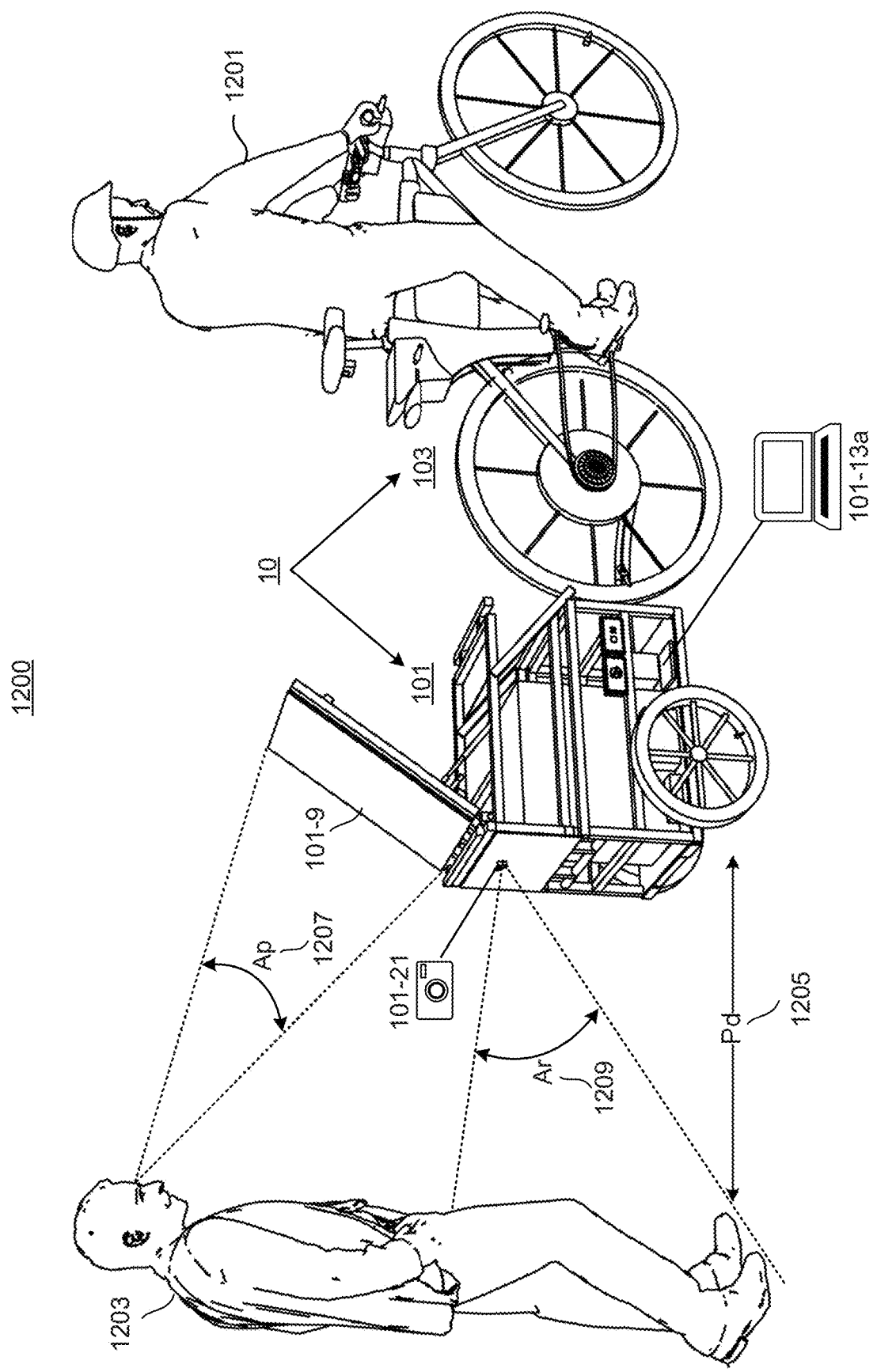
FIG. 44 illustrates the mobile digital advertising unit driven by an ETow-Bike operator in an Active Ad Operating Mode, according to an embodiment.

FIG. 44 illustrates the mobile digital advertising unit 10 driven by an ETow-Bike operator 1201 in an Active Ad Operating Mode 1200, according to an embodiment. Operational states in the Active Ad Operating Mode 1200 include:
 1) The ETow-Bike operator 1201 is manually peddling the ETow-Bike 103 at low speeds (under 5 mph) to haul EPCarT 101;
 2) The EPCarT Ad Display Unit 101-9 is tilted at the fully extended tilt position (greater than 45 degrees);
 3) The EPCarT rear facing camera and GPS device 101-21 is active, capturing geotagging data;
 4) The EPCarT Ad Server 101-13a is active and displaying Merchant Ad Files on the EPCarT Ad Display Unit 101-9 via the Ad Media Player 101-13a5; and
 5) Captured geotagging data is being uploaded to the remote EPCarT Base Station 105 over the wireless network 109.

In the Active Ad Operating Mode 1200 Merchant Ad Files are active and only displayed in Active Ad zones or "Safe Zones", including bike paths, boardwalks, and shared bike and pedestrian lanes. Conversely, Merchant Ad Files are inactive and not displayed when riding on highways, in traffic, or during transportation of the mobile digital advertising unit 10. FIG. 44 also illustrates an average sized person 1203 walking behind the mobile digital advertising unit 10 at a viewing distance (Pd) 1205. At this viewing distance (Pd) 1205, the pedestrian 1203 has a clear line-of-sight of the EPCarT Ad Display Unit 101-9 at a viewing angle (Ap) 1207 that is approximately below eye level, having the EPCarT 101 low to the ground with the bottom of the EPCarT Ad Display Unit 101-9 approximately 24 inches above the ground. Most people, by habit, look down and straight ahead while they walk in order to watch the ground to avoid hazardous objects that may cause them to fall, or avoid the sun during peak hours of the day, sometimes avoiding eye-contact with other passing people. With the EPCarT Ad Display Unit 101-9 tilted between 50-90 degrees, watching and reading Merchant Ad Files on the EPCarT Ad Display Unit 101-9 is easy and at a comfortable reading position for passing pedestrians, not having to tilt their heads at an uncomfortable position while watching or reading Ads on the EPCarT Ad Display Unit 101-9.

FIG. 44 also shows the approximate viewing angle (Ar) 1209 captured by the EPCarT rear facing camera and GPS device 101-21, according to an embodiment. The EPCarT rear facing camera and GPS device 101-21 is mounted on the back side of the EPCarT 101 approximately 25" off the ground, facing oncoming pedestrians walking from behind the EPCarT 101. With the viewing angle (Ar) 1209 of the EPCarT rear facing camera and GPS device 101-21 pointed towards ground level and mounted only 25" off the ground, images captured by the EPCarT rear facing camera and GPS device 101-21 is limited to capturing body parts below the torso. In operation, the EPCarT rear facing camera and GPS device 101-21 is intended to capture "foot traffic images", not faces due to maintain the privacy of people in a public setting. In addition, the captured images only require a low resolution (1280×720 pixels or lower) since data from the captured images are for quantitative purposes (number of people, rather than for identification of people), making it faster and easier to quickly upload files to Base Station. In this document, the definition of "foot traffic images" is "captured digital images of feet, legs, or any body parts below the torso of people walking behind the mobile digital advertising unit 10". Captured images by the EPCarT rear facing camera and GPS device 101-21 provides Merchants a private viewing of "foot traffic images", allowing them to gauge and have feedback of the number of people to which their Ad File was displayed. In another implementation, a method of blurring faces of unintentional captured faces in the captured image data may be handled and corrected by a BlurFace.script residing and executed by the remote EPCarT Base Station 105 to blur any captured faces prior to displaying it in the private Merchant Ad Status Viewer Interface 900.

Figure 45:
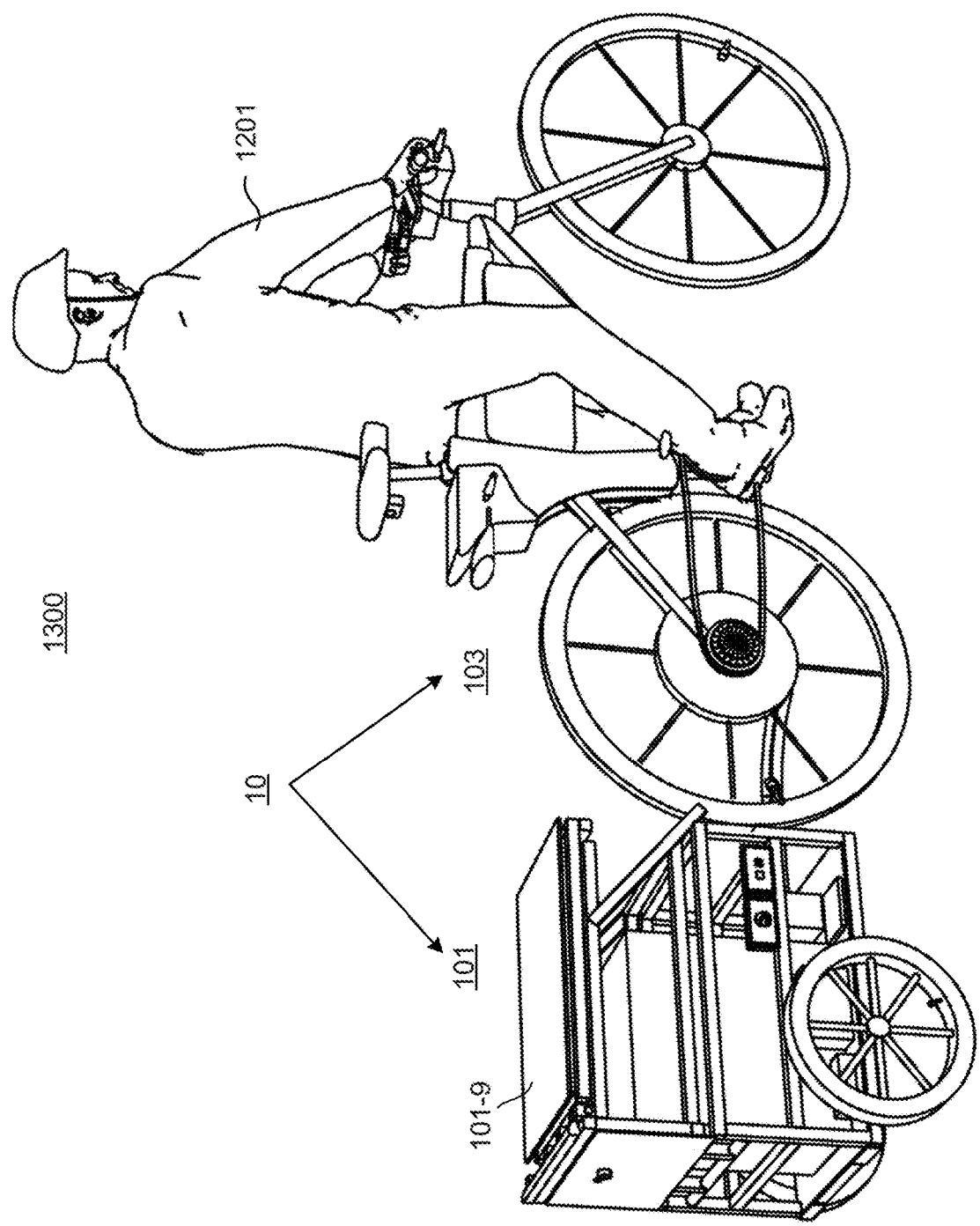
FIG. 45 illustrates the mobile digital advertising unit in an Inactive Ad and Travel Mode, according to an embodiment.

FIG. 45 illustrates the mobile digital advertising unit 10 in an Inactive Ad and Travel Mode, according to an embodiment. Operational states in the Inactive Ad and Travel Mode 1300 include:

1) The ETow-Bike operator 1201 is peddling the ETow-Bike 103 at moderate speeds (between 10-25 mph) with electric motorized power assist from the electric motor wheel 103-1 on the ETow-Bike 103 to haul EPCarT 101 to another zone or one of the EPCarT Depots 20a-20c;

2) The EPCarT Ad Display Unit 101-9 is in closed position (0 degrees) preventing it from swaying, and protecting it while in travel mode;

3) The EPCarT rear facing camera and GPS device 101-21 is inactive, not capturing geotagging data; and 4) The EPCarT Ad Server 101-13a is inactive and not displaying Merchant Ad Files on the EPCarT Ad Display Unit 101-9 via the Ad Media Player 101-13a5.

In the Inactive Ad Travel and Mode 1300, the ETow-Bike operator 1201 may ride on roads, highways, in traffic, or during transportation of the mobile digital advertising unit 10 where bicycle are permitted.

FIG. 46 illustrates two EPCarT 101 units in a stand-alone mode 1400, according to an embodiment. In the stand-alone mode, the ETow-Bike 103 is disconnected and separated from the EPCarT 101, allowing the EPCarT 101 to act as a stand-alone kiosk. In the stand-alone mode, the EPCarT may be parked at a fixed merchant's location (e.g., in front of their store entrance 1401). In another implementation, the EPCarT Ad Display Unit 101-9 may include a touch screen interface for consumer and pedestrian interactions, allowing users to place orders or access other Merchant information about their services provided or products sold. The AC power plug-in cord 101-13h on the EPCarT 101 may connect directly to an AC power to supply power to EPCarT 101 while the network data line port 101-13i may be connected to the Merchant's wired network connection to access the remote EPCarT Base Station 105 or third party data service providers 107. Alternatively, the remote EPCarT Base Station 105 may access the third party data service providers 107 over the wireless network 109. Operational states in the stand-alone mode 1400 include:

1) No ETow-Bike operator 1201 is required for the EPCarT 101 to run in stand-alone mode 1400;

The EPCarT Ad Display Unit 101-9 is tilted at the fully extended tilt position (greater than 45 degrees);

3) The EPCarT rear facing camera and GPS device 101-21 is inactive, not capturing geotagging data; and 4) The EPCarT Ad Server 101-13a is active and displaying Merchant Ad Files on the EPCarT Ad Display Unit 101-9 via the Ad Media Player 101-13a5.

Advantages of the Mobile Digital Advertising Unit

In sum, the mobile digital advertising unit 10 provides Merchants an accessible, affordable, and easy-to-use immersive digital advertising system. The mobile digital advertising unit 10 also provides Merchant Ad File feedback to the Merchant to gauge the success of their advertisements along a predetermined and selectable pedestrian Ad route. In operation, the mobile digital advertising unit 10 provides the local merchant a complete mobile advertising package having several modes of operation and pedestrian Ad route options as well as pricing options that suits their advertisement budgets.

The mobile digital advertising unit 10 also has many advantages including: 1) reduced total weight capacity allowing it to be handled, carried, and towed by a single person using no additional equipment; 2) can also be driven for long distances including ranges beyond 40 miles, allowing it to travel to its predetermined Ad routes and to and from the EPCarT depot station for housing and servicing; 3) includes self-sustainable power via the power generator to recharge and operate anywhere; 4) can recharge remotely for longer operating times; 5) the EPCarT 101 can be decoupled from the ETow-Bike 103 and swapped out for a different EPCarT 101 Unit for repairs or system upgrades; 6) has a lower system build and operating cost as compared to expensive large vehicles and trucks hauling billboard signs, costing much less than other available mobile digital billboard advertising systems; 7) the EPCarT Ad Display Unit 101-9 is approximately 2 square feet in area and is too small to attract attention away from drivers making it a safe advertising system, but large enough to be viewed when driving it alongside with other pedestrians and other bicyclists; 8) local merchants have the ability to choose and target a destination and area (via Zones and Routes) to expand and attract nearby people to their store; 9) the system provides merchants private access to "foot traffic images" and location feedback of pedestrians to whom their Ad Files were displayed; and 10) Does not require wireless connectivity or the Internet to operate and run merchant Ad Files.

Miscellaneous Embodiments

In other embodiments, the mobile digital advertising unit 10 may be equipped with an aerial drone enclosure coupled to the top of the pod storage compartment 101-3 of the EPCart 101 for housing an aerial drone, providing an option of capturing aerial images of the local vicinity by the aerial drone and storing and/or transmitting the captured aerial images to the remote EPCarT Base Station 105 for storage, processing, and media and Ad content generation. In another embodiment, the mobile digital advertising unit 10 may include motion detectors coupled to the back side of the EPCart 101 for detecting people and triggering a switch for activating the EPCarT Ad Display Unit 101-9 when nearby pedestrians are present and within 2 feet of the EPCart 101. An artificial intelligence system may be implemented in the mobile digital advertising unit 10 for determining type and frequency of Ads to be displayed based on the surrounding conditions and number of people in view of the mobile digital advertising unit 10.

As used in the specification and the appended claims, the singular forms "a", "an", and "the" included plural referents unless the context clearly dictates otherwise.

All patents, patent applications, and other references cited herein are incorporated by reference in their entireties.

It is noted that the foregoing disclosure has been provided merely for the purpose of explanation and is in no way to be construed as limiting of the present disclosure. Although the present disclosure has been shown and described with respect to several preferred embodiments thereof, various changes, omissions, and additions to the form and detail thereof, may be made therein, without departing from the spirit and scope of the disclosure. It is understood that the words which have been used herein are words of description and illustration, rather than words of limitation. Changes may be made, within the purview of the appended claims, as presently stated and as amended, without departing from the scope and spirit of the present disclosure in its aspects.

Other embodiments and modifications of the present disclosure may occur to those of ordinary skill in the art in view of these teachings. Accordingly, the disclosure is to be limited only by the following claims which include all other such embodiments and modifications when viewed in conjunction with the above specifications and accompanying drawings.

What is claimed is:

1. An immersive digital advertising system for providing one or more local merchants the ability to expand their advertising outreach to local and nearby consumers and pedestrians via digitally displayed advertisements, the system comprising:
    an electric pod cargo trailer having a storage compartment, a local advertisement server contained within the storage compartment for receiving, storing and processing digital media advertisement data provided by the one or more local merchants, a hinged lid coupled to the storage compartment by a lid hinge assembly, an advertisement display unit coupled to the local advertisement server for displaying the digital media advertisement data along a predetermined pedestrian Ad route, and a digital image and GPS capturing device for capturing and storing geotagged data along the predetermined pedestrian Ad route traveled by the electric pod cargo trailer;
    an electric tow bicycle coupled to the electric pod cargo trailer by a tow hitch assembly for hauling the electric pod cargo trailer along the predetermined pedestrian Ad route; and
    a base station for receiving and processing the geotagged data and generating an interactive pedestrian Ad route map from the geotagged data, providing the one or more local merchants private access to a merchant Ad status viewer interface having Ad route data, Ad feedback information, and the interactive pedestrian Ad route map along the predetermined pedestrian Ad route.

2. The system of claim 1, wherein the electric tow bicycle includes a display and touchscreen controller device coupled to the local advertisement server for displaying and controlling the digital media advertisement data which is simultaneously displayed on the display and touchscreen controller device and the advertisement display unit.

3. The system of claim 2, wherein an HMDI cable provides a wired connection between the display and touchscreen controller device and the local advertisement server.

4. The system of claim 1, wherein the digital image and GPS capturing device is coupled to a rear facing side of the hinged lid.

5. The system of claim 1, wherein the digital image and GPS capturing device captures and stores foot traffic images, excluding faces of people, in a database managed by the base station.

6. The system of claim 1, wherein the Ad route data includes an Ad Route ID and an Ad Zone Area.

7. The system of claim 1, wherein the Ad feedback information includes a Quick Response Code Ad Effectiveness rating.

8. The system of claim 7, wherein the Quick Response Code Ad Effectiveness rating is based on a total QR Code scan count or a frequency of QR Code scans per unit time, providing the one or more local merchants quantitative feedback of their digital media advertisement data when displayed on the advertisement display unit along the predetermined pedestrian Ad route.

9. The system of claim 1, wherein the advertisement display unit is mounted to an upper display panel rack which is coupled to the hinged lid by a display rack hinge assembly, wherein the upper display panel rack has multiple adjustable tilt position settings, allowing the upper display panel rack to pivot along the display rack hinge assembly between 0 and 90 degrees.

10. The system of claim 1, wherein the immersive digital advertising system has three modes of operation, including an active Ad operating mode, an inactive Ad travel mode, and a stand-alone mode.

11. A mobile digital advertising unit traveling along a predetermined pedestrian Ad route for visually promoting digitally displayed advertisements to consumers and pedestrians via digital media advertisement data provided by one or more local merchants, the mobile digital advertising unit comprising:
    an electric tow bicycle; and
    an electric pod cargo trailer coupled to the electric tow bicycle by a tow hitch assembly for hauling the electric pod cargo trailer along a predetermined pedestrian Ad route by the electric tow bicycle;
    wherein the electric pod cargo trailer includes a storage compartment, a local advertisement server contained within the storage compartment for receiving, storing and processing the digital media advertisement data provided by the one or more local merchants, a hinged lid coupled to the storage compartment by a lid hinge assembly, an advertisement display unit coupled to the local advertisement server for displaying the digital media advertisement data along the predetermined pedestrian Ad route, and a digital image and GPS capturing device for capturing and storing geotagged data along the predetermined pedestrian Ad route traveled by the mobile digital advertising unit.

12. The electric pod cargo trailer of claim 11, wherein the electric tow bicycle includes a display and touchscreen controller device coupled to the local advertisement server for displaying and controlling the digital media advertisement data which is simultaneously displayed on the display and touchscreen controller device and the advertisement display unit.

13. The mobile digital advertising unit of claim 11, wherein an HMDI cable provides a wired connection between the display and touchscreen controller device and the local advertisement server.

14. The mobile digital advertising unit of claim 11, wherein the digital image and GPS capturing device is coupled to a rear facing side of the hinged lid.

15. The mobile digital advertising unit of claim 11, wherein the digital image and GPS capturing device captures and stores foot traffic images, excluding faces of people, in a local database managed by the digital image and GPS capturing device.

* * * * *